United States Patent
Osada

(10) Patent No.: US 11,967,831 B2
(45) Date of Patent: *Apr. 23, 2024

(54) SEMICONDUCTOR DEVICE, CHARGING METHOD THEREOF, AND ELECTRONIC DEVICE

(71) Applicant: SEMICONDUCTOR ENERGY LABORATORY CO., LTD., Atsugi (JP)

(72) Inventor: Takeshi Osada, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/697,296

(22) Filed: Mar. 17, 2022

(65) Prior Publication Data

US 2022/0209568 A1 Jun. 30, 2022

Related U.S. Application Data

(63) Continuation of application No. 16/608,894, filed as application No. PCT/IB2018/052795 on Apr. 23, 2018, now Pat. No. 11,316,361.

(30) Foreign Application Priority Data

May 3, 2017 (JP) .................................. 2017-092025

(51) Int. Cl.
*H02J 7/00* (2006.01)
*G06N 3/08* (2023.01)
(Continued)

(52) U.S. Cl.
CPC ................ *H02J 50/12* (2016.02); *G06N 3/08* (2013.01); *H02J 7/00034* (2020.01);
(Continued)

(58) Field of Classification Search
CPC .... H02J 7/02; H02J 50/12; H02J 50/40; H02J 7/00302; H02J 7/00034; H02J 50/80; G06N 3/08; G06N 3/02
See application file for complete search history.

(56) References Cited

U.S. PATENT DOCUMENTS 7,764,046 B2 7/2010 Osada
7,830,113 B2 11/2010 Sato et al.
(Continued)

FOREIGN PATENT DOCUMENTS

CN 105453383 A 3/2016
EP 2278683 A 1/2011
(Continued)

OTHER PUBLICATIONS

Taiwanese Office Action (Application No. 107114573) dated Jun. 20, 2022.
(Continued)

*Primary Examiner* — Nghia M Doan
(74) *Attorney, Agent, or Firm* — NIXON PEABODY LLP; Jeffrey L. Costellia

(57) ABSTRACT

A novel semiconductor device or a semiconductor device capable of preventing overcharging is provided. A power receiving portion has a function of generating a signal for canceling a wireless signal transmitted from a power feeding portion when the charging is completed. Specifically, when the remaining battery capacity of the power receiving portion is one hundred percent or higher than or equal to a predetermined reference value, the power receiving portion has a function of generating an electromagnetic wave for canceling an electromagnetic wave transmitted from the power feeding portion. Thus, a magnetic field for canceling a magnetic field formed of the electromagnetic wave trans-
(Continued)

mitted from the power feeding portion is formed, so that overcurrent in the power receiving portion can be prevented.

10 Claims, 23 Drawing Sheets

(51) Int. Cl.
*H02J 7/02* (2016.01)
*H02J 50/12* (2016.01)
*H02J 50/80* (2016.01)

(52) U.S. Cl.
CPC ............ *H02J 7/00302* (2020.01); *H02J 7/02* (2013.01); *H02J 50/80* (2016.02)

(56) References Cited

U.S. PATENT DOCUMENTS

| | | | |
|---|---|---|---|
| 7,944,172 B2 | 5/2011 | Osada | |
| 8,030,885 B2 | 10/2011 | Sato et al. | |
| 8,339,096 B2 | 12/2012 | Osada | |
| 8,811,901 B2 | 8/2014 | Shionoiri et al. | |
| 8,847,556 B2 | 9/2014 | Osada | |
| 8,862,053 B2 | 10/2014 | Sato et al. | |
| 9,270,229 B2 | 2/2016 | Osada | |
| 9,343,921 B2 | 5/2016 | Tanabe | |
| 9,620,988 B2 | 4/2017 | Osada | |
| 9,819,228 B2 | 11/2017 | Von Novak | |
| 9,985,464 B2 | 5/2018 | Osada | |
| 10,110,068 B2 | 10/2018 | Shionoiri et al. | |
| 10,666,093 B2 | 5/2020 | Osada | |
| 11,070,089 B2 | 7/2021 | Mita | |
| 11,316,361 B2* | 4/2022 | Osada | ............... H02J 50/12 |
| 2008/0252254 A1* | 10/2008 | Osada | ............... H02J 7/35 |
| | | | 320/108 |
| 2009/0308933 A1* | 12/2009 | Osada | ............... G06K 19/07749 |
| | | | 235/492 |
| 2011/0018494 A1 | 1/2011 | Mita | |
| 2012/0293119 A1 | 11/2012 | Park et al. | |
| 2013/0214730 A1 | 8/2013 | Lu et al. | |
| 2014/0159653 A1* | 6/2014 | Von Novak | .......... H04B 5/0031 |
| | | | 320/108 |
| 2016/0197487 A1 | 7/2016 | Koizumi et al. | |
| 2019/0027970 A1* | 1/2019 | Kawamae | ............... H02J 50/12 |
| 2020/0227948 A1 | 7/2020 | Osada | |

FOREIGN PATENT DOCUMENTS

| | | |
|---|---|---|
| EP | 3046219 A | 7/2016 |
| EP | 3407462 A | 11/2018 |
| JP | 2008-086192 A | 4/2008 |
| JP | 2008-154222 A | 7/2008 |
| JP | 2008-161045 A | 7/2008 |
| JP | 2011-030293 A | 2/2011 |
| JP | 2012-125115 A | 6/2012 |
| JP | 2013-070581 A | 4/2013 |
| JP | 2014-200137 A | 10/2014 |
| JP | 2015-050808 A | 3/2015 |
| JP | 2015-061468 A | 3/2015 |
| JP | 2016-005393 A | 1/2016 |
| KR | 2015-0122692 A | 11/2015 |
| TW | 201110501 | 3/2011 |
| TW | 201618426 | 5/2016 |
| WO | WO-2014/133886 | 9/2014 |

OTHER PUBLICATIONS

International Search Report (Application No. PCT/IB2018/052795) dated Jul. 31, 2018.
Written Opinion (Application No. PCT/IB2018/052795) dated Jul. 31, 2018.

* cited by examiner

FIG. 1A
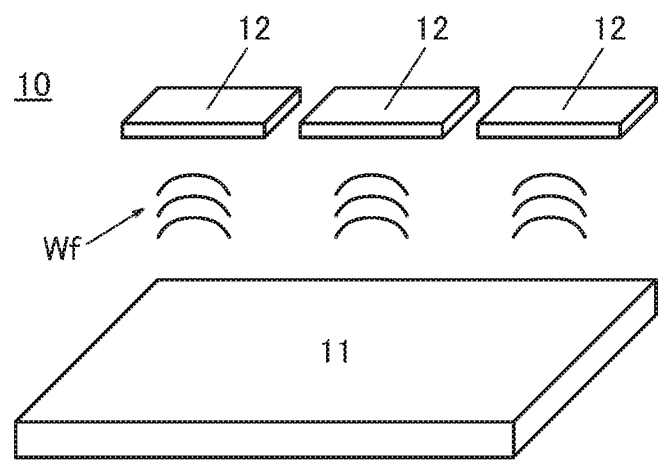
FIG. 1B1
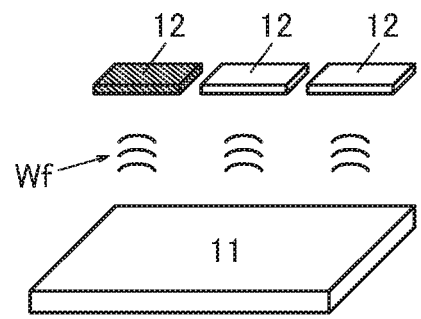
FIG. 1B2
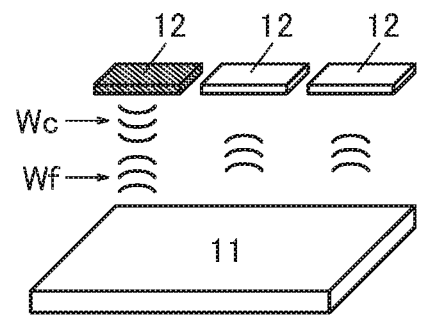
FIG. 1C
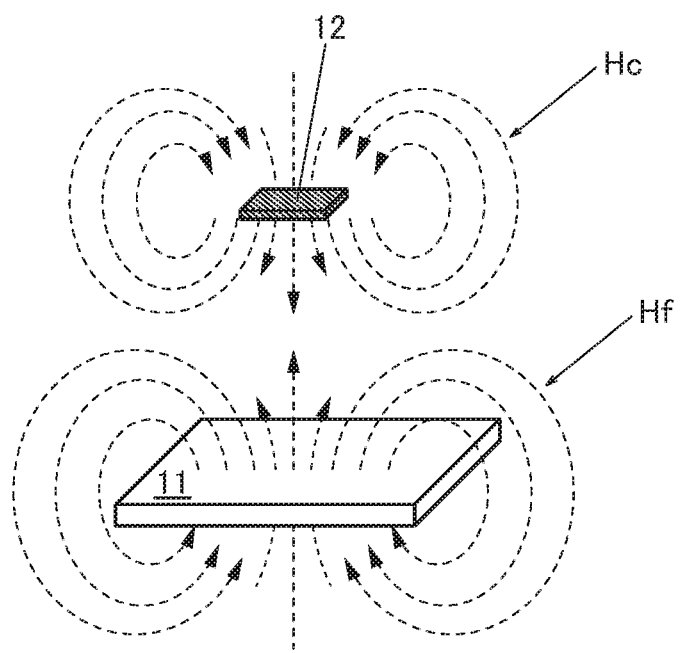

FIG. 4A1
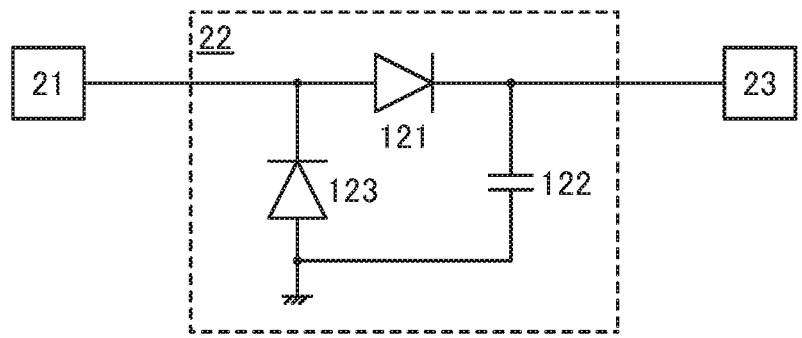
FIG. 4A2
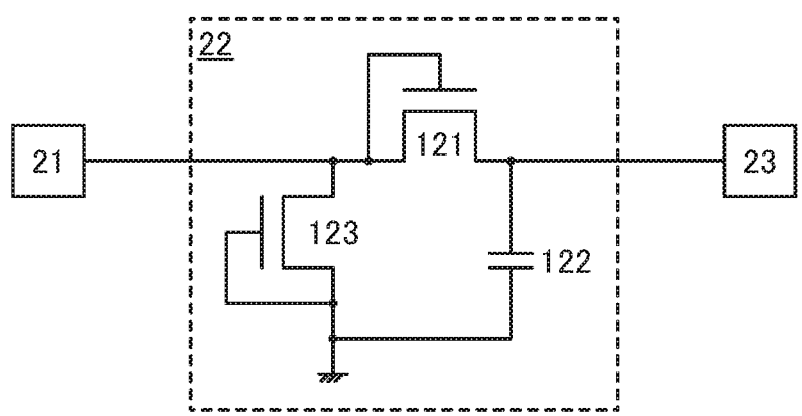
FIG. 4B1
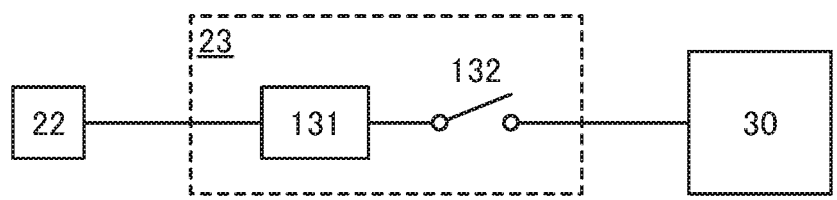
FIG. 4B2
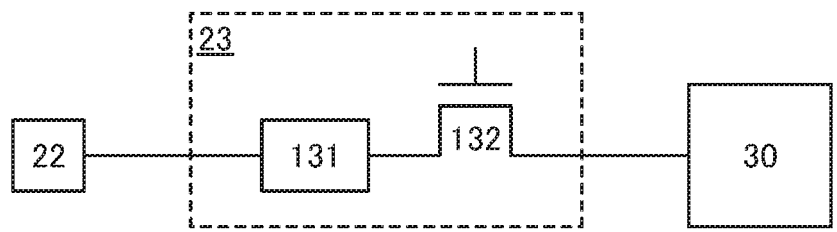

FIG. 18A
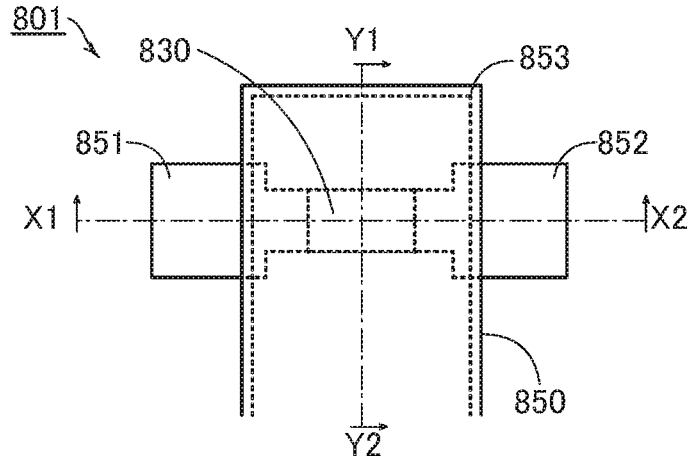
FIG. 18B
FIG. 18C
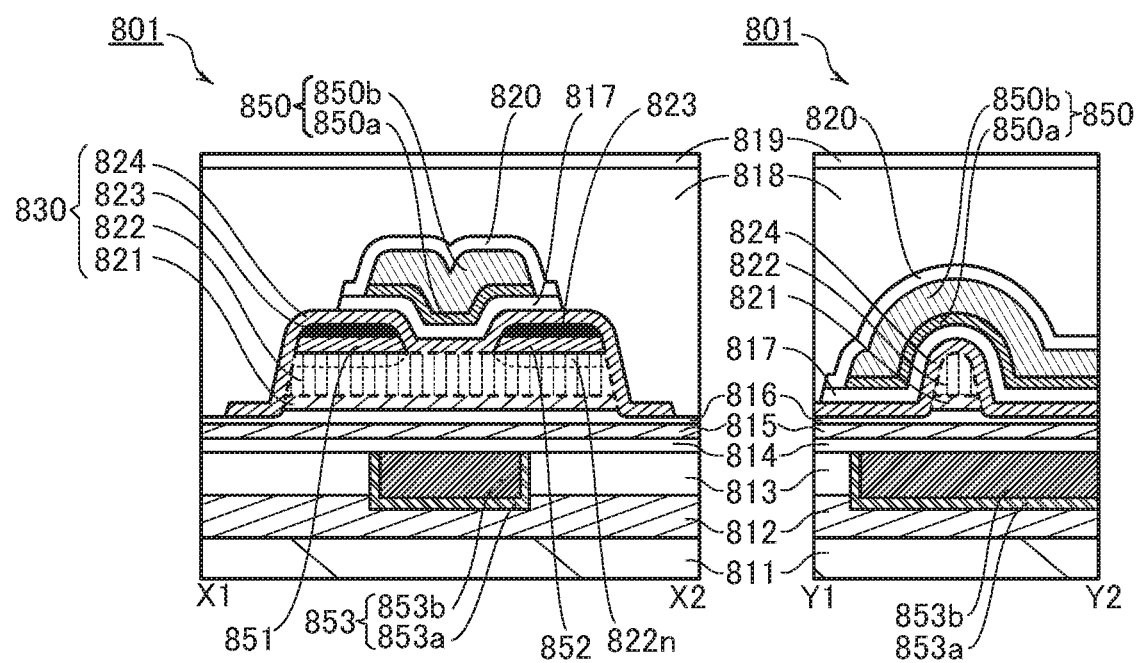

SEMICONDUCTOR DEVICE, CHARGING METHOD THEREOF, AND ELECTRONIC DEVICE

TECHNICAL FIELD

One embodiment of the present invention relates to a semiconductor device and an electronic device.

Note that one embodiment of the present invention is not limited to the above technical field. Examples of the technical field of one embodiment of the present invention disclosed in this specification and the like include a semiconductor device, a display device, a light-emitting device, a power storage device, a memory device, a power storage system, an electronic device, a lighting device, an input device, an input/output device, a driving method thereof, and a manufacturing method thereof.

In this specification and the like, a semiconductor device generally means a device that can function by utilizing semiconductor characteristics. A transistor, a semiconductor circuit, an arithmetic device, a memory device, and the like are each an embodiment of the semiconductor device. In addition, a display device, an imaging device, an electro-optical device, a power generation device (e.g., a thin film solar cell and an organic thin film solar cell), and an electronic device may each include a semiconductor device.

BACKGROUND ART

In recent years, a variety of electronic devices, such as portable information terminals (typified by smartphones), electric power tools, and electric vehicles, are equipped with batteries. A secondary battery, such as a lithium ion battery, which can be repeatedly used by accumulation of electricity by charging, is widely used. The electronic device equipped with a battery is connected to a power feeding device, whereby the battery can be charged.

Moreover, power is wirelessly supplied from the power feeding device to the electronic device equipped with a battery, whereby the battery can be charged without physical connection to the power feeding device. For example, Patent Document 1 discloses an electromagnetic induction power feeding method and a magnetic field resonance power feeding method.

REFERENCE

Patent Document

[Patent Document 1] Japanese Published Patent Application No. 2012-125115

DISCLOSURE OF INVENTION

An object of one embodiment of the present invention is to provide a novel semiconductor device. Another object of one embodiment of the present invention is to provide a semiconductor device capable of preventing overcharging. Another object of one embodiment of the present invention is to provide a highly reliable semiconductor device. Another object of one embodiment of the present invention is to provide a semiconductor device capable of high-speed charging. Another object of one embodiment of the present invention is to provide a semiconductor device with high versatility. Another object of one embodiment of the present invention is to provide a semiconductor device with low power consumption. Another object of one embodiment of the present invention is to provide a semiconductor device with a small area.

Note that one embodiment of the present invention does not necessarily achieve all the objects listed above and only needs to achieve at least one of the objects. The description of the above objects does not preclude the existence of other objects. Other objects will be apparent from and can be derived from the description of the specification, the claims, the drawings, and the like.

A semiconductor device according to one embodiment of the present invention includes a transmitting and receiving circuit and a battery. The transmitting and receiving circuit is configured to supply power to the battery by receiving a first electromagnetic wave transmitted from a power feeding portion and to generate a second electromagnetic wave using the power of the battery. The second electromagnetic wave is generated using the power of the battery when charging of the battery is completed. The second electromagnetic wave is configured to cancel the first electromagnetic wave.

In the semiconductor device according to one embodiment of the present invention, the transmitting and receiving circuit includes an antenna circuit and a control circuit. The antenna circuit is configured to receive the first electromagnetic wave and transmit the second electromagnetic wave. The control circuit may be configured to determine whether to generate the second electromagnetic wave on the basis of information on overcharging. The control circuit may be configured to supply an alternating-current signal for generating the second electromagnetic wave to the antenna circuit when determining to generate the second electromagnetic wave.

In the semiconductor device according to one embodiment of the present invention, the transmitting and receiving circuit includes an antenna circuit and a control circuit. The control circuit includes a determination circuit and a signal generation circuit. The antenna circuit is configured to receive the first electromagnetic wave and transmit the second electromagnetic wave. The determination circuit is configured to determine whether to generate the second electromagnetic wave on the basis of information on overcharging. The signal generation circuit may be configured to supply a second alternating-current signal for generating the second electromagnetic wave to the antenna circuit using a first alternating-current signal generated on the basis of the first electromagnetic wave and power supplied from the battery.

In the semiconductor device according to one embodiment of the present invention, the information on overcharging may include information on temperature measured by a sensor or information on receiving time of the first electromagnetic wave.

In the semiconductor device according to one embodiment of the present invention, the transmitting and receiving circuit includes a neural network. Data corresponding to the information on overcharging may be input to an input layer of the neural network. Data corresponding to a result that determines whether to generate the second electromagnetic wave may be output from an output layer of the neural network.

The semiconductor device according to any one embodiment of the present invention may be configured to transmit a third electromagnetic wave for strengthening the first electromagnetic wave when charging of the battery is completed.

One embodiment of the present invention is an electronic device including the above semiconductor device.

According to one embodiment of the present invention, a novel semiconductor device can be provided. According to one embodiment of the present invention, a semiconductor device capable of preventing overcharging can be provided. According to one embodiment of the present invention, a highly reliable semiconductor device can be provided. According to one embodiment of the present invention, a semiconductor device capable of high-speed charging can be provided. According to one embodiment of the present invention, a semiconductor device with high versatility can be provided. According to one embodiment of the present invention, a semiconductor device with low power consumption can be provided. According to one embodiment of the present invention, a semiconductor device with a small area can be provided.

Note that the description of these effects does not preclude the existence of other effects. One embodiment of the present invention does not necessarily have all of these effects. Other effects will be apparent from and can be derived from the description of the specification, the claims, the drawings, and the like.

BRIEF DESCRIPTION OF DRAWINGS

FIGS. 1A, 1B1, 1B2, and 1C illustrate configuration examples a power feeding system.

FIG. 2 illustrates a configuration example of a power receiving portion.

FIGS. 4A1, 4A2, 4B1, and 4B2 illustrate configuration examples of a rectifier circuit and a charging circuit.

FIGS. 18A, 18B, and 18C illustrate a structure example of a transistor.

BEST MODE FOR CARRYING OUT THE INVENTION

Figure 2:
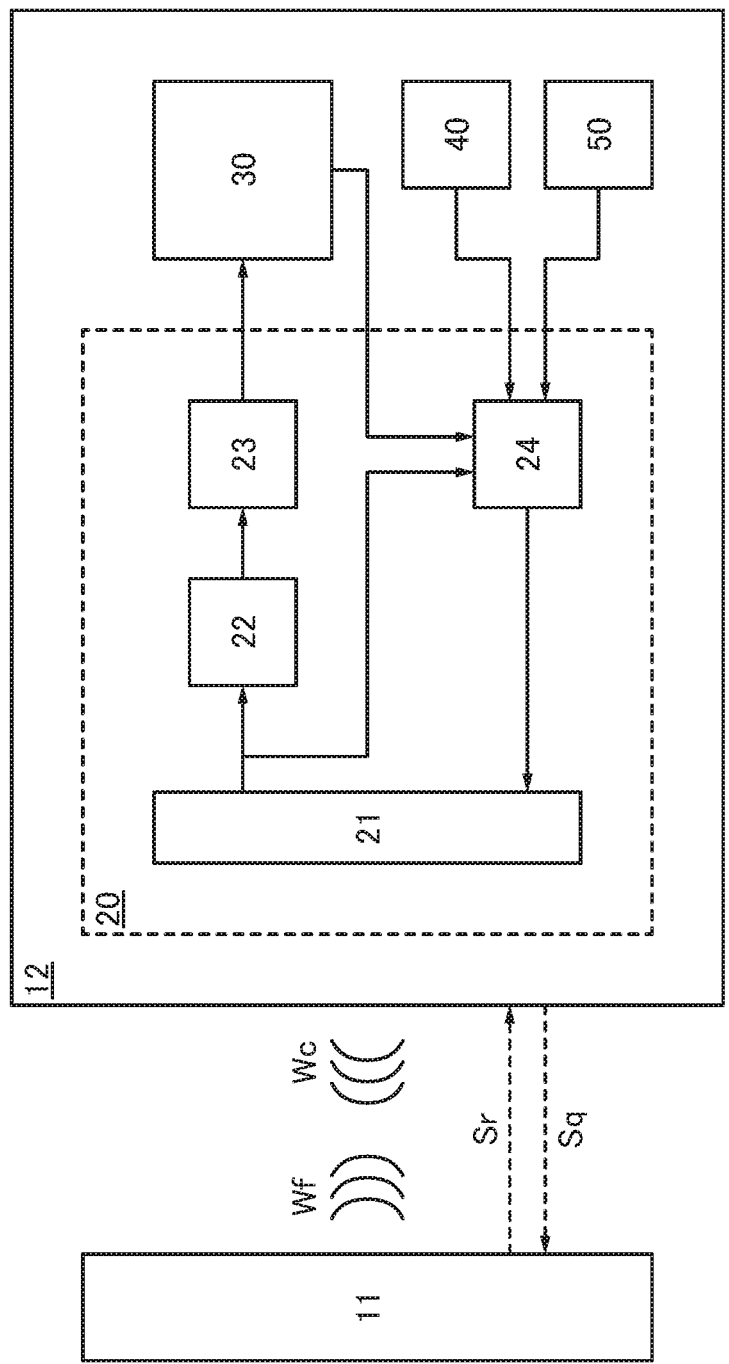

Embodiments of the present invention will be described below in detail with reference to the drawings. However, the present invention is not limited to the following description and it is easily understood by those skilled in the art that the modes and details can be changed in various ways without departing from the spirit and scope of the present invention. Therefore, the present invention should not be interpreted as being limited to the description of the embodiments below.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a channel formation region of a transistor is called an oxide semiconductor in some cases. That is to say, a metal oxide that has at least one of an amplifying function, a rectifying function, and a switching function can be called a metal oxide semiconductor, or OS for short. In the following description, a transistor including a metal oxide in a channel formation region is also referred to as an OS transistor.

In this specification and the like, a metal oxide including nitrogen is also called a metal oxide in some cases. Moreover, a metal oxide including nitrogen may be called a metal oxynitride. The details of a metal oxide will be described later.

In this specification and the like, an explicit description "X and Y are connected" means that X and Y are electrically connected, X and Y are functionally connected, and X and Y are directly connected. Accordingly, without limitation to a predetermined connection relation, for example, a connection relation shown in drawings or text, another connection relation is included in the drawings or the text. Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that allow an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is turned on or off to determine whether current flows therethrough or not. Alternatively, the switch has a function of selecting and changing a current path. Note that the case where X and Y are electrically connected includes the case where X and Y are directly connected.

In the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power source circuit (e.g., a step-up converter or a step-down converter) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y, for example. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

Even when independent components are electrically connected to each other in the drawing, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

Embodiment 1

In this embodiment, a semiconductor device and a power feeding system, each of which is one embodiment of the present invention, are described.

<Configuration Example of Power Feeding System>

FIG. 1A illustrates a configuration example of a power feeding system 10. The power feeding system 10 includes a power feeding portion 11 and a power receiving portion 12. The power feeding system 10 has a function of charging the power receiving portion 12 in response to a wireless signal transmitted from the power feeding portion 11. Hereinafter, power feeding using a wireless signal is also referred to as wireless power feeding or radio frequency (RF) power feeding.

Note that each of the power feeding portion 11 and the power receiving portion 12 can be formed using a semiconductor device. Therefore, each of the power feeding portion 11 and the power receiving portion 12 can also be referred to as semiconductor device.

The power feeding portion 11 has a function of supplying power to the power receiving portion 12 in response to a wireless signal. Specifically, the power feeding portion 11 has a function of generating an electromagnetic wave Wf used for charging the power receiving portion 12. As the power feeding portion 11, a power feeding appliance for performing noncontact wireless power feeding on the power receiving portion 12, a power feeding appliance for performing wireless power feeding on the power receiving portion 12 which is put on a power feeding pad, or the like can be used.

The power receiving portion 12 has a function of being charged in response to a wireless signal transmitted from the power feeding portion 11. Specifically, the power receiving portion 12 includes a battery and has a function of charging the battery by supplying the battery with power that is generated with the use of the electromagnetic wave Wf received from the power feeding portion 11. For the power receiving portion 12, an electronic device such as a mobile information terminal (e.g., a mobile phone, a smartphone, a tablet, a laptop computer, and an e-book reader), a digital camera, a portable game console, a portable music player, an electric power tool, a home appliance, and a medical appliance, a vehicle, or the like can be used.

A transmission system of the electromagnetic wave Wf between the power feeding portion 11 and the power receiving portion 12 can be appropriately determined depending on specifications and the like. For example, as the transmission system, an electromagnetic coupling system, an electromagnetic induction system, a microwave system, or the like can be used. The frequency of the electromagnetic wave Wf generated by the power feeding portion 11 is not particularly limited. For example, a sub-millimeter wave of 300 GHz or more and less than 3 THz, an extremely-high-frequency wave of 30 GHz or more and less than 300 GHz, a microwave of 3 GHz or more and less than 30 GHz, an ultra-high-frequency wave of 300 MHz or more and less than 3 GHz, a very-high-frequency wave of 30 MHz or more and less than 300 MHz, a high-frequency wave of 3 MHz or more and less than 30 MHz, a medium-frequency wave of 300 kHz or more and less than 3 MHz, a long-frequency wave of 30 kHz or more and less than 300 kHz, or a very-long frequency wave of 3 kHz or more and less than 30 kHz may be used.

As shown in FIG. 1A, the power feeding portion 11 can transmit the electromagnetic power Wf to a plurality of the power receiving portions 12. Thus, the plurality of power receiving portions 12 can be charged at the same time.

However, the timing of charging completion does not always coincide among the plurality of power receiving portions 12. Thus, as shown in FIG. 1B1, a charged power receiving portion 12 (a hatched receiving portion 12 in the drawing) and an uncharged power receiving portion 12 can be mixed. The power feeding portion 11 continues to transmit the electromagnetic wave Wf as long as an uncharged receiving portion 12 remains. Thus, the charged power receiving portion 12 continues to be exposed to the electromagnetic wave Wf and is overcharged, so that overcurrent is generated in the power receiving portion 12. This causes heat generation in a metal part or the like of the power receiving portion 12, and degradation or ignition might be caused in components (e.g., elements or a battery) of the power receiving portion 12. In general, degradation by a temperature increase is pronounced particularly when the remaining battery capacity is 100%. Thus, if the power receiving portion 12 continues to receive the electromagnetic wave Wf after the charging has been completed, the battery degradation by heat generation occurs more easily.

Here, the power receiving portion 12 of one embodiment of the present invention has a function of generating a signal for canceling a wireless signal transmitted from the power feeding portion 11 when the charging is completed. Specifically, when the remaining battery capacity of the power receiving portion 12 is 100% or higher than or equal to a predetermined reference value, the power receiving portion 12 has a function of generating an electromagnetic wave Wc for canceling the electromagnetic wave Wf transmitted from the power feeding portion 11 as shown in FIG. 1B2. Thus, as shown in FIG. 1C, a magnetic field Hc for canceling a magnetic field Hf formed of the electromagnetic wave Wf transmitted from the power feeding portion 11 is formed, so that overcurrent in the power receiving portion 12 can be prevented. This can prevent degradation and ignition of the power receiving portion 12, leading to a reliable power receiving portion 12.

Note that any electromagnetic wave can be used as the electromagnetic wave Wc as long as it can cancel the electromagnetic wave Wf. For example, an electromagnetic wave whose frequency is synchronized with the frequency of the electromagnetic wave Wf and which is emitted to the power feeding portion 11 can be used as the electromagnetic wave Wc. Specifically, the frequency of the electromagnetic wave Wc is an integral multiple of that of the electromagnetic wave Wf.

Furthermore, the power receiving portion 12 of one embodiment of the present invention has a function of generation the electromagnetic wave Wc using power stored in the battery in which charging is completed. This can keep the remaining battery capacity at lower than 100% (e.g., approximately 95%) and prevent battery degradation due to a temperature change.

Note that in this specification, "canceling the electromagnetic wave Wf" includes not only totally canceling the electromagnetic wave Wf received by the power receiving portion 12 but also weakening the electromagnetic wave Wf received by the power receiving portion 12. In other words, one embodiment of the present invention includes not only a mode in which the electromagnetic wave Wf prevents the power receiving portion 12 from receiving the electromagnetic wave Wc but also a mode in which the electromagnetic wave Wc weakens the electromagnetic wave Wf the power receiving portion 12 receives.

<Structure Example of Power Receiving Portion>

A specific structure example of the power receiving portion 12 having the above-mentioned functions is illustrated in FIG. 2. The power receiving portion 12 illustrated in FIG. 2 includes a transmitting and receiving circuit 20, a battery 30, a sensor 40, and a timer 50.

The transmitting and receiving circuit 20 has a function of receiving the electromagnetic wave Wf and supplying power to the battery 30 and a function of generating the electromagnetic wave Wc using the power of the battery 30. The transmitting and receiving circuit 20 includes an antenna circuit 21, a rectifier circuit 22, a charging circuit 23, and a control circuit 24.

The antenna circuit 21 has a function of receiving the electromagnetic wave Wf generated by the power feeding portion 11, converting the electromagnetic wave Wf into an alternating-current signal, and supplying the alternating-current signal to the rectifier circuit 22 and the control circuit 24. In addition, the antenna circuit 21 has a function of converting the alternating-current signal supplied from the control circuit 24 into the electromagnetic wave Wc and transmitting it to the outside of the power receiving portion 12.

An antenna can be used for receiving the electromagnetic wave Wf and transmitting the electromagnetic wave Wc. The shape of the antenna can be determined depending on the transmission method. For example, when an electromagnetic coupling method or an electromagnetic induction method (for example, a 13.56 MHz band) is used as the transmission method, electromagnetic induction caused by a change in magnetic field density is used. Thus, a conductive film having an annular shape (for example, a loop antenna) or a conductive film having a spiral shape (for example, a spiral antenna) is preferably used as an antenna. When a microwave method (for example, UHF band (860 MHz to 960 MHz band), 2.45 GHz band, or the like) is used, the length or shape of a conductive film functioning as an antenna, such as the length, may be appropriately set in consideration of the wavelength of an electromagnetic wave. For example, a conductive film having a linear shape (for example, a dipole antenna) or a conductive film having a flat shape (for example, a patch antenna) can be used as an antenna. Note that the shape of the conductive film serving as an antenna is not limited thereto. For example, a curved and/or meandered shape may be used in consideration of the wavelength of the electromagnetic wave. Alternatively, a plurality of shapes is combined and an antenna compatible with a plurality of frequency bands of electromagnetic waves can be used.

Figure 3:
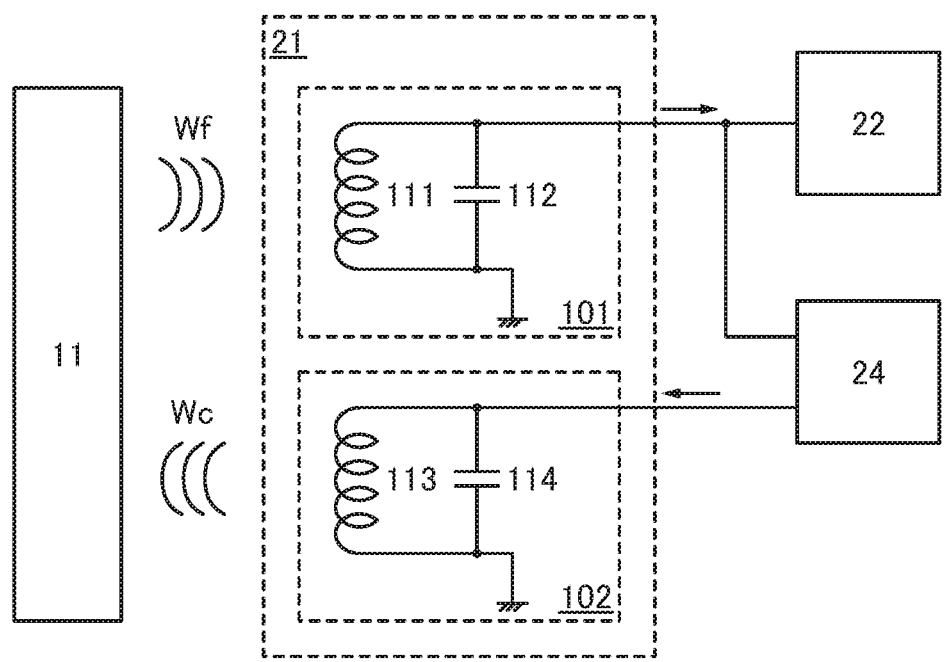
FIG. 3 illustrates a configuration example of an antenna circuit.

FIG. 3 shows a structure example of the antenna circuit 21. The antenna circuit 21 includes a receiving circuit 101 and a transmitting circuit 102. The receiving circuit 101 has a function of converting the electromagnetic wave Wf into an alternating-current signal and supplying the alternating-current signal to the rectifier circuit 22 and the control circuit 24. The transmitting circuit 102 has a function of converting the alternating-current signal supplied from the control circuit 24 into the electromagnetic wave Wc and transmitting it to the outside.

The receiving circuit 101 includes an antenna coil 111 and a capacitor 112. The capacitor 112 has a function of a resonance capacitor. A variable capacitor is used as the capacitor 112 and the capacitance value is controlled, so that the frequency of an electromagnetic wave to be received can be controlled. The transmitting circuit 102 includes an antenna coil 113 and a capacitor 114. The capacitor 114 has a function of a resonance capacitor. The frequency of the electromagnetic wave Wc generated by the transmitting circuit 102 can be controlled in accordance with the frequency of the alternating-current signal input from the control circuit 24. Note that a resonance circuit is preferably used as each of the receiving circuit 101 and the transmitting circuit 102.

Although the receiving circuit 101 and the transmitting circuit 102 are separately provided in FIG. 3, a shared circuit may be provided. For example, in FIG. 3, the transmitting circuit 102 may be omitted and the receiving circuit 101 may have a function of the transmitting circuit 102.

The rectifier circuit 22 has a function of rectifying an alternating-current signal supplied from the antenna circuit 21 and converting the alternating-current signal into a direct-current signal. FIG. 4A1 shows a structure example of the rectifier circuit 22. The rectifier circuit 22 includes a diode 121, a capacitor 122, and a diode 123. The capacitor 122 serves as a smoothing capacitor. A direct-current signal generated by the rectifier circuit 22 is supplied to the charging circuit 23.

Note that each of the diode 121 and the diode 123 may be a diode-connected transistor. FIG. 4A2 shows a structure example in which transistors are used as the diode 121 and the diode 123.

The off-state current of a transistor used as the diodes 121 and 123 is desirably extremely small for preventing the backflow of current. For this reason, an OS transistor is preferable as the transistor. The off-state current of an OS transistor normalized on the channel width can be, for example, smaller than or equal to $10 \times 10^{-21}$ A/μm (10 zA/μm) with a source-drain voltage of 10 V at room temperature (approximately 25° C.). Thus, the OS transistor can effectively prevent the backflow of current. The OS transistor will be described in detail in Embodiment 5.

The charging circuit 23 has a function of controlling the voltage level of a direct-current signal supplied from the rectifier circuit 22 and supplying the voltage to the battery 30. Thus, a predetermined voltage is applied to the battery 30, whereby the battery 30 can be charged.

FIG. 4B1 shows a structure example of the charging circuit 23. The charging circuit 23 includes a regulator 131 and a switch 132. The regulator 131 has a function of controlling voltage input from the rectifier circuit 22. Voltage converted by the regulator 131 is supplied to the battery 30 through the switch 132.

The switch 132 has a function of controlling power supply to the battery 30. The switch 132 is on while the battery 30 is charged, whereas the switch 132 is off while the battery 30 is not charged.

Note that a transistor can be used as the switch 132 as shown in FIG. 4B2. In that case, the gate voltage of the transistor is controlled, whereby on/off of the switch 132 can be controlled. The transistor used as the switch 132 may have a backgate.

The off-state current of a transistor used as the switch 132 is preferably small for preventing power leakage from the battery 30. For this reason, an OS transistor is preferable as the switch 132.

The battery 30 has a function of supplying power to other circuits included in the power receiving portion 12. Note that the type of the battery 30 is not particularly limited. Examples of the battery 30 include secondary batteries such as a lithium-ion secondary battery, a lead storage battery, a lithium-ion polymer secondary battery, a nickel-hydrogen storage battery, a nickel-cadmium storage battery, a nickel-iron storage battery, a nickel-zinc storage battery, and a silver oxide-zinc storage battery; secondary flow batteries such as a redox flow battery, a zinc-chlorine battery, and a zinc-bromine battery; mechanically rechargeable secondary batteries such as an aluminum-air battery, a zinc-air battery, and an iron-air battery; and high-operating-temperature secondary batteries such as a sodium-sulfur battery and a lithium-iron sulfide battery.

The control circuit 24 has a function of controlling generation of the electromagnetic wave Wc. Specifically, the control circuit 24 has a function of determining whether to generate the electromagnetic wave Wc on the basis of information on overcharging that is input from the outside (hereinafter also referred to as overcharging information). When determining to generate the electromagnetic wave Wc, the control circuit 24 supplies an alternating-current signal to the antenna circuit 21. FIG. 2 shows a structure example in which overcharging information is input from the sensor 40 and the timer 50 to the control circuit 24.

The sensor 40 has a function of measuring the temperature of the power receiving portion 12. Note that the measurement point is not particularly limited. For example, when the power receiving portion 12 is an electronic device, the sensor 40 may measure the temperature of a housing of the electronic device or the temperature of any point in the electronic device. The sensor 40 may measure the temperature of the surface of the battery 30. The temperature measured by the sensor 40 is converted into a signal and input to the control circuit 24.

The timer 50 has a function of measuring the time of wireless power supply. For example, the timer 50 can measure the total time when the power receiving portion 12 continuously receives the electromagnetic wave Wf or the time when the power receiving portion 12 continuously receives the electromagnetic wave Wf after the charging of the battery 30 is completed. The time measured by the timer 50 is converted into a signal and input to the control circuit 24.

The information on temperature obtained by the sensor 40 and the information on time of wireless power supply obtained by the timer 50 are supplied as overcharging information to the control circuit 24. The control circuit 24 has a function of determining whether to generate the electromagnetic wave Wc on the basis of the overcharging information. For example, when the temperature of the power receiving portion 12 reaches or exceeds a predetermined value or when the total time when the power receiving portion 12 continuously receives the electromagnetic wave Wf reaches or exceeds a predetermined value, the control circuit 24 can generate the electromagnetic wave Wc to stop wireless power supply.

Note that one of the sensor 40 and the timer 50, which are shown in the structure example, can be omitted. A circuit for measuring other overcharging information (e.g., the distance between the power feeding portion 11 and the power receiving portion 12, the magnetic flux density, or the remaining battery capacity) can be provided instead of one or both of the sensor 40 and the timer 50.

Figure 5A:
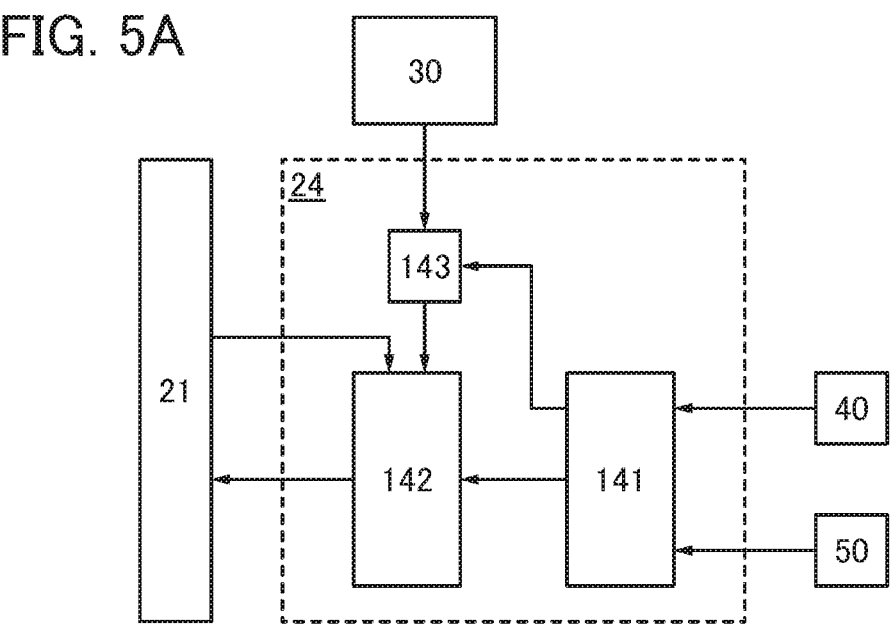
FIGS. 5A, 5B, and 5C illustrate configuration examples of a control circuit.

FIG. 5A shows a structure example of the control circuit 24. The control circuit 24 includes a determination circuit 141, a signal generation circuit 142, and a switch circuit 143. The overcharging information output from the sensor 40, the timer 50, and the like is input to the determination circuit 141.

The determination circuit 141 has a function of determining whether to generate the electromagnetic wave Wc on the basis of the overcharging information. For example, the determination circuit 141 can determine to generate the electromagnetic wave Wc when the temperature of the power receiving portion 12 reaches or exceeds a predetermined value or when the total time when the power receiving portion 12 continuously receives the electromagnetic wave Wf reaches or exceeds a predetermined value. When determining that the electromagnetic wave Wc should be generated, the determination circuit 141 has a function of supplying a signal for directing the generation of the electromagnetic wave Wc to the signal generation circuit 142.

In addition, the determination circuit 141 has a function of outputting a control signal in response to the determination results to the switch circuit 143. Specifically, the determination circuit 141 has a function of controlling the on/off of the switch circuit 143 so that power is supplied from the battery 30 to the signal generation circuit 142 when determining that the electromagnetic wave Wc should be generated. Thus, the signal generation circuit 142 can generate the electromagnetic wave Wc using the power from the battery 30.

The signal generation circuit 142 has a function of generating a signal for generating the electromagnetic wave Wc on the basis of the determination results of the determination circuit 141. Specifically, when the determination circuit 141 determines that the electromagnetic wave Wc should be generated, the signal generation circuit 142 has a function of generating an alternating-current signal using the alternating-current signal supplied from the antenna circuit 21 and the power supplied from the battery 30. When the determination circuit 141 determines that there is no need to generate the electromagnetic wave Wc, power is not supplied from the battery 30 to the signal generation circuit 142 and the signal generation circuit 142 does not generate an alternating-current signal.

Figure 5B:
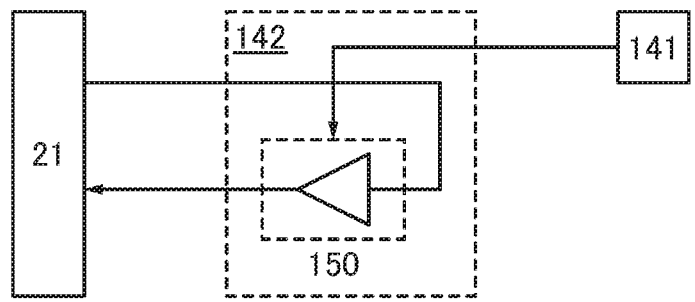

FIG. 5B illustrates a structure example of the signal generation circuit 142. The signal generation circuit 142 includes a buffer circuit 150. The buffer circuit 150 has a function of controlling output of an alternating-current signal that is input from the antenna circuit 21 in response to the signal input from the determination circuit 141. Specifically, the alternating-current signal input to the buffer circuit 150 is generated in response to the electromagnetic wave Wf the antenna circuit 21 receives from the power feeding portion 11. A signal corresponding to the necessity of generation of the electromagnetic wave Wc is input from the determination circuit 141 to the buffer circuit 150. Then, when the determination circuit 141 determines that the electromagnetic wave Wc should be generated, the buffer circuit 150 outputs the alternating-current signal to the antenna circuit 21. Thus, the alternating-current signal whose frequency is synchronized with the frequency of the electromagnetic wave Wf is supplied to the antenna circuit 21. Then, the antenna circuit 21 converts the alternating-current signal supplied from the signal generation circuit 142 into the electromagnetic wave Wc and transmits it to the outside.

Figure 5C:
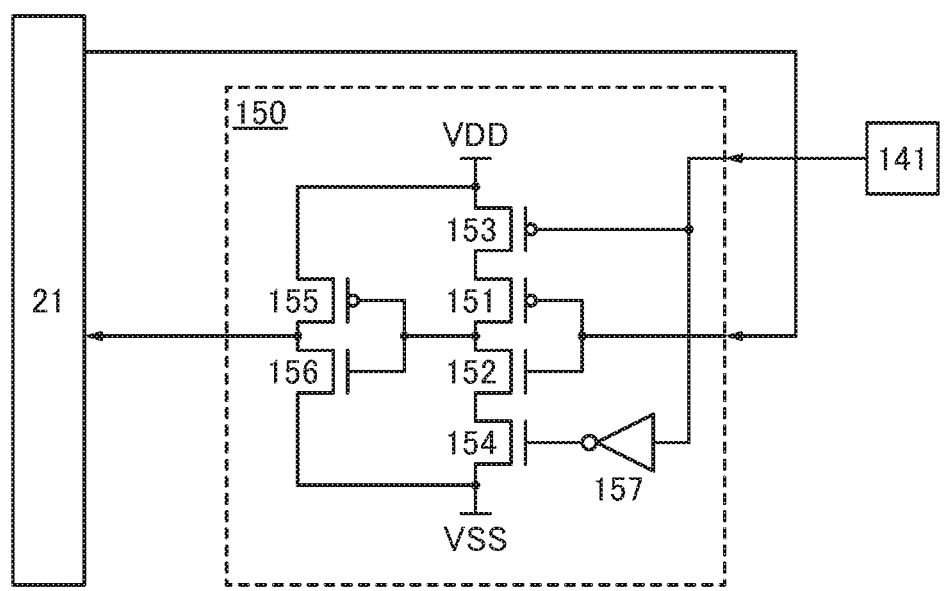

FIG. 5C illustrates a specific structure example of the buffer circuit 150. The buffer circuit 150 includes transistors 151 to 156 and an inverter 157. A first inverter is composed of the transistors 151 to 154. A second inverter is composed of the transistors 155 and 156. Note that the operating state of the first inverter can be controlled by signals input to the transistors 153 and 154.

The alternating-current signal output from the antenna circuit 21 is input to each gate of the transistors 151 and 152. Each one of a source and drain of the transistors 151 and 152 is connected to the gates of the transistors 155 and 156. Each one of a source and drain of the transistors 155 and 156 is connected to the antenna circuit 21.

A signal corresponding to the necessity of generation of the electromagnetic wave Wc is input from the determination circuit 141 to the gate of the transistor 153. The signal input from the determination circuit 141 is inverted by the inverter 157 and is input to the gate of the transistor 154. A high power supply potential VDD is supplied to the transistors 153 and 155. A low power supply potential VSS is supplied to the transistors 154 and 156. Note that the high power supply potential VDD and the low power supply potential VSS can be supplied to the buffer circuit 150 from the battery 30 through the switch circuit 143.

When the electromagnetic wave Wc is generated, the transistors 153 and 154 are turned on in response to a signal supplied from the determination circuit 141. Thus, the alternating-current signal whose frequency is synchronized with that of the electromagnetic wave Wf is supplied from each one of the source and drain of the transistors 155 and 156 to the antenna circuit 21. When there is no need to generate the electromagnetic wave Wc, the transistors 153 and 154 are turned off in response to a signal supplied from the determination circuit 141. Thus, generation of an alternating-current signal by the buffer circuit 150 is stopped.

As described above, the power receiving portion 12 of one embodiment of the present invention can control power feeding to the power receiving portion 12 by generating the electromagnetic wave Wc in response to the charging state. Note that as shown in FIG. 2, the power feeding portion 11 may have a function of outputting a signal Sr for requiring information on whether charging of the battery 30 is completed, information on the remaining capacity of the battery 30, information on charging time, and the like to the power receiving portion 12. The signal Sr is output from the power feeding portion 11, whereby the power receiving portion 12 outputs a signal Sq corresponding to required information to the power feeding portion 11. Thus, the power feeding portion 11 can monitor the charging state of the power receiving portion 12 to select whether to transmit the electromagnetic wave Wf.

<Operation Example of Power Feeding System>

Figure 6:
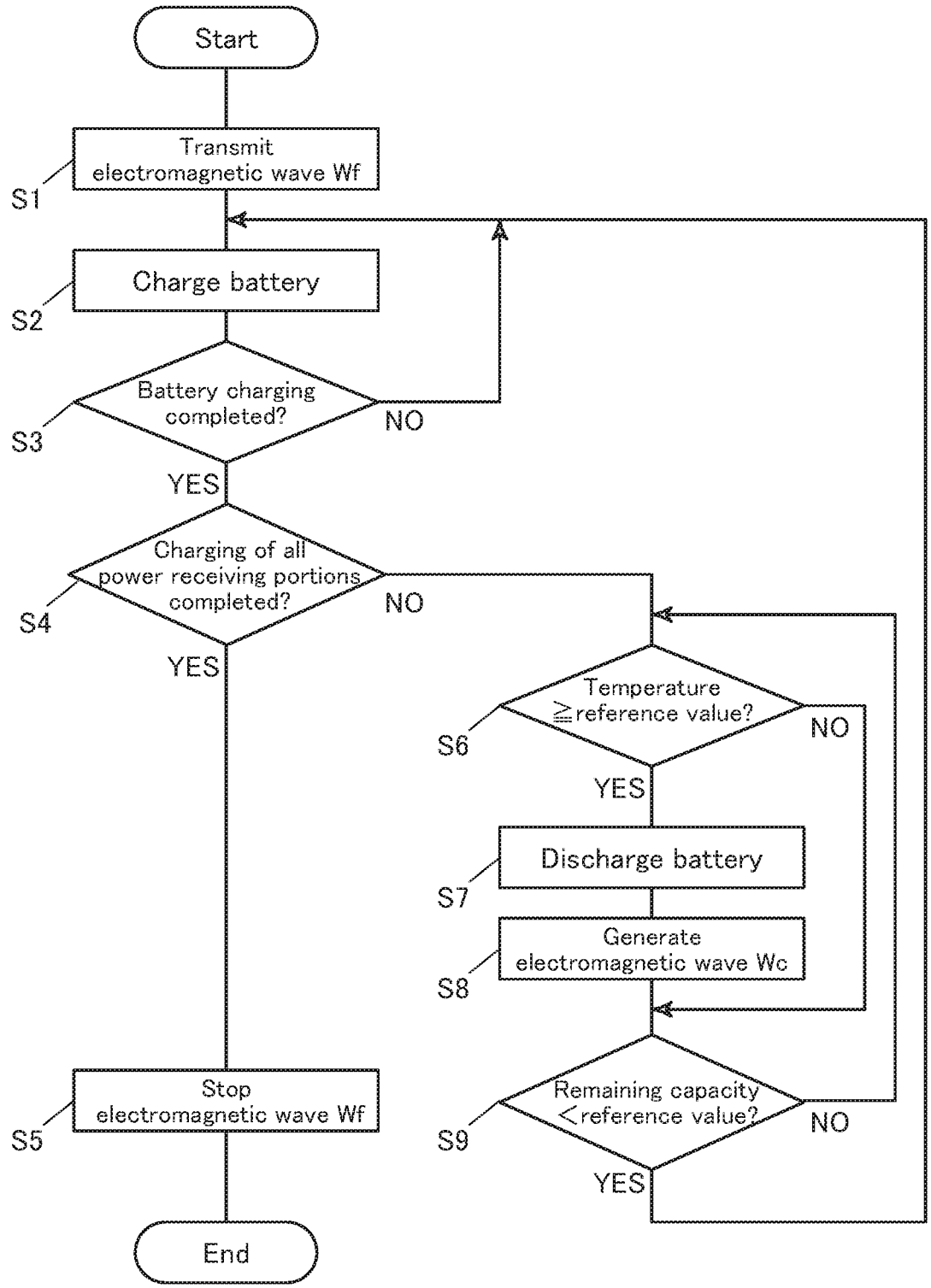
FIG. 6 is a flow chart.

Next, an operation example of the power feeding system 10 is described with reference to FIG. 6. FIG. 6 is a flow chart showing the operation example of the power feeding system 10. Note that in the example described here, the plurality of power receiving portions 12 is charged by the electromagnetic wave Wf transmitted from the power feeding portion 11. Here, the temperature of the power receiving portion 12 is used as overcharging information, and the necessity of generation of the electromagnetic wave Wc is determined on the basis of the temperature of the power receiving portion 12.

First, the power feeding portion 11 transmits the electromagnetic wave Wf to the power receiving portion 12 which is placed so as to be wirelessly charged (a step S1). Then, the electromagnetic wave Wf is supplied to the battery 30 through the antenna circuit 21, the rectifier circuit 22, and the charging circuit 23, thereby charging the battery 30 (a step S2).

When the charging of the battery 30 is completed (YES in a step S3), whether the charging of all of the other power receiving portions 12 is completed is checked (a step S4). The step S4 can be executed as follows: the power feeding portion 11 transmits the signal Sr to all of the power receiving portions 12 and receives the signal Sq from each of the power receiving portions 12 (see FIG. 2). When the charging of all of the power receiving portions 12 is completed (YES in the step S4), the power feeding portion 11 stops transmitting the electromagnetic wave Wf (a step S5).

Note that a criterion of charging completion of the battery 30 can be freely determined. For example, the criterion can be whether the remaining battery capacity reaches a predetermined value (e.g., 100%) or not. The power feeding portion 11 can monitor the charging state of the power receiving portion 12 by transmitting the signal Sr with a predetermined frequency.

In contrast, when charging has not yet completed in any of the power receiving portions 12 (NO in the step S4), the transmission of the electromagnetic wave Wf continues. The temperature of the power receiving portion 12 in which the charging is completed is measured by the sensor 40. When the temperature of the power receiving portion 12 is higher than or equal to the reference value (YES in a step S6), power is supplied to the control circuit 24 by discharge of the battery 30 (a step S7), so that the electromagnetic wave Wc is generated (a step S8). As a result, the electromagnetic wave Wf is canceled and the charging of the power receiving portion 12 is stopped, thereby preventing overcharging. The remaining amount of the battery 30 becomes lower than 100% due to the discharge, thereby preventing deterioration of the battery 30.

After that, when the remaining amount of the battery 30 stays at the reference value or higher (NO in a step S9), the operation from the steps S6 to S8 is repeated. Note that when the temperature of the power receiving portion 12 is lower than the reference value, the power receiving portion 12 may determine that the influence of heat generation is small and there is no need to generate the electromagnetic wave Wc (NO in the step S6).

When the remaining amount of the battery 30 falls below the reference value due to generation of the electromagnetic wave Wc (YES in the step S9), charging of the battery 30 resumes (the step S2). Then, the operation of the step S3 or later continues until charging of all of the power receiving portions 12 is completed.

Through the above-mentioned operation, all of the power receiving portions 12 can be charged while preventing overcharging. Note that the reference value of the temperature at the step S6 and the reference value of the remaining amount of the battery 30 at the step S9 can be freely determined depending on the characteristics of the battery 30 or the like. For example, when the maximum allowable temperature of the battery 30 is T ° C., the reference value of the temperature can be higher than or equal to (T−20) ° C. and lower than or equal to T ° C., higher than or equal to (T−15) ° C. and lower than or equal to T ° C. higher than or equal to (T−10) ° C. and lower than or equal to T ° C., higher than or equal to (T−5) ° C. and lower than or equal to T ° C., or the like. The reference value of the remaining amount of the battery 30 can be 95%, 90%, 85%, 80%, or the like.

[Additional Operation 1]

Figure 7A:
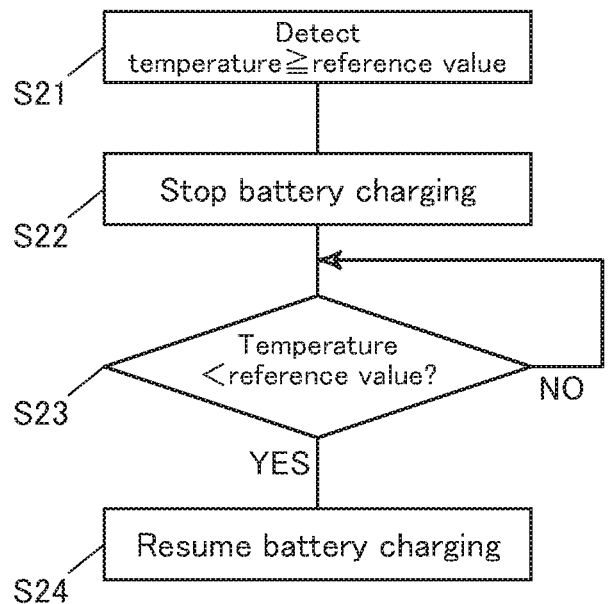
FIGS. 7A and 7B are flow charts.

The operation of the power feeding system 10 is not limited to that in FIG. 6, and another operation can be added as appropriate. For example, although the temperature of the power receiving portion 12 in which charging is completed is measured in FIG. 6 (the step S6), charging can be stopped when the temperature of the power receiving portion 12 becomes higher than or equal to the reference value even during charging of the power receiving portion 12 in order to prevent heat generation. FIG. 7A illustrates an operation example in which charging is temporarily stopped depending on the temperature of the power receiving portion 12.

If the temperature of the power receiving portion 12 is detected to be higher than or equal to the reference value (a step S21), charging is stopped regardless of whether charging of the battery 30 is completed or not (a step S22). After that, the charging stop state is maintained. When the temperature of the power receiving portion 12 falls below the reference value (YES in a step S23), charging of the battery 30 resumes (a step S24). Such operation can reduce heat generation during charging.

[Additional Operation 2]

Figure 7B:
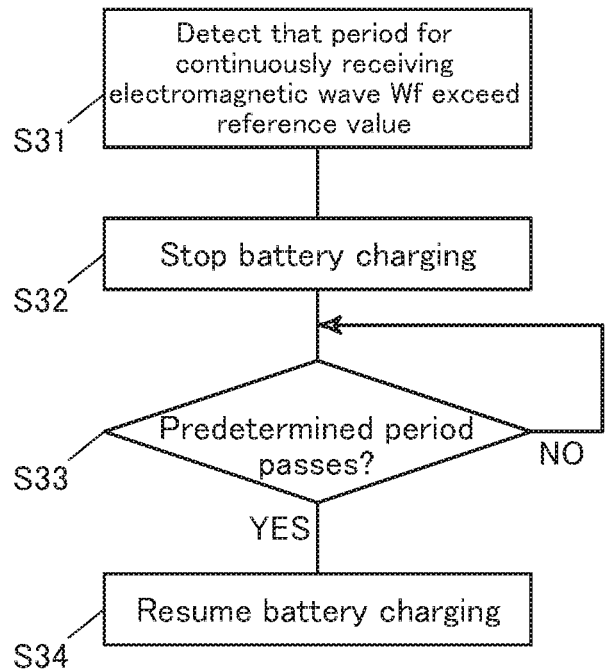

Although FIG. 6 and FIG. 7A illustrate the operation in which stop of charging is determined on the basis of the temperature of the power receiving portion 12, stop of charging may be determined on the basis of other overcharging information. FIG. 7B illustrates an operation example in which charging is temporarily stopped depending on the receiving time of the electromagnetic wave Wf.

First, the period during which the power receiving portion 12 continuously receives an electromagnetic wave is detected to exceed the reference value (a step S31); then, charging is stopped regardless of whether charging of the battery 30 is completed or not (a step S32). When a predetermined period passes in the charging stop state (YES in a step S33), charging of the battery 30 resumes (a step S34). Such operation can prevent heat generation of the power receiving portion 12.

Note that the method for stopping charging at the steps S22 and S32 is not particularly limited. For example, charging can be stopped by generating the electromagnetic wave Wc, turning off the switch 132 shown in FIGS. 4B1 and 4B2, or the like.

The operation shown in FIGS. 7A and 7B can be added as appropriate to the operation shown in FIG. 6 as an interrupt operation.

As described above, in one embodiment of the present invention, an electromagnetic wave generated by the power feeding portion 11 is canceled when the remaining amount of the battery 30 stays at a predetermined value or higher, whereby deterioration and ignition of the power receiving portion 12 can be prevented. In addition, with the use of power of the battery 30 for canceling the electromagnetic wave, the remaining capacity of the battery 30 can be maintained at higher than or equal to the reference value and lower than 100% and battery deterioration can be prevented.

This embodiment can be combined with any of the other embodiments as appropriate.

Embodiment 2

In this embodiment, modification examples of the power feeding system described in the above embodiment are described.

Figure 8A:
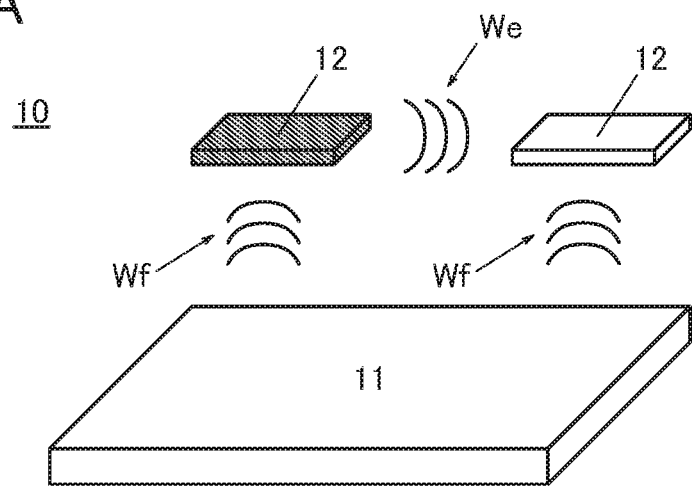
FIGS. 8A and 8B illustrate configuration examples of a power feeding system.

FIG. 8A illustrates another configuration example of the power feeding system 10. The power feeding system 10 illustrated in FIG. 8A is different from that in FIGS. 1A to 1C in that the power receiving portion 12 has a function of generating an electromagnetic wave We. The description of Embodiment 1 can be referred to for the other configuration.

Figure 8B:
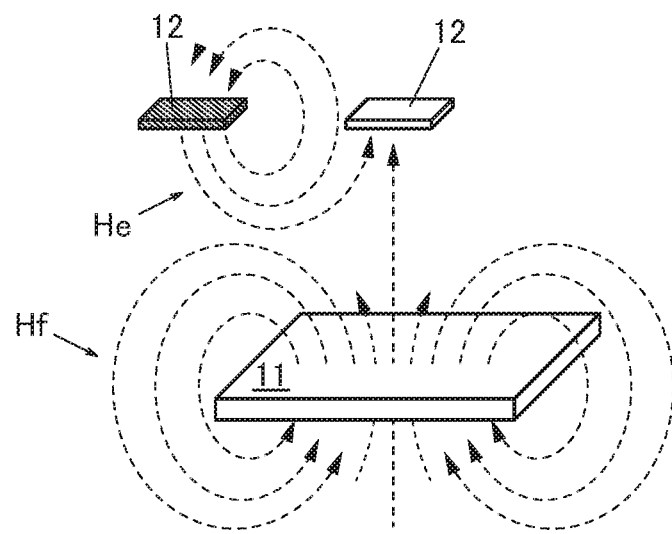

As illustrated in FIG. 8A, the power receiving portion 12 in which charging is completed (the hatched power receiving portion 12 in the drawing) has a function of transmitting the electromagnetic wave We to other power receiving portions 12 in which charging is not completed with the use of the electromagnetic wave Wf. The electromagnetic wave We is an electromagnetic wave which strengthens the electromagnetic wave Wf the power receiving portions 12 in which charging is not completed. As illustrated in FIG. 8B, a magnetic field He is formed by the electromagnetic wave We and strengthens a magnetic field Hf which is formed by the electromagnetic wave Wf, thereby strengthening the electromagnetic wave Wf the power receiving portions 12 in which charging is not completed receive. Thus, the charging efficiency of the power receiving portions 12 in which charging is not completed is increased and the charging speed can be increased.

Any electromagnetic wave can be used as the electromagnetic wave We as long as it can strengthen the electromagnetic wave Wf. For example, an electromagnetic wave whose frequency and phase are synchronized with those of the electromagnetic wave Wf can be used as the electromagnetic wave We. Note that the phases of the electromagnetic waves Wf and We are not necessarily the same totally and only need to be matched to the extent allowing charging of the power receiving portion 12 in which charging is not completed to be accelerated.

Note that the power receiving portion 12 may have a function of transmitting not only the electromagnetic wave We but also the electromagnetic wave Wf described in Embodiment 1.

Figure 9:
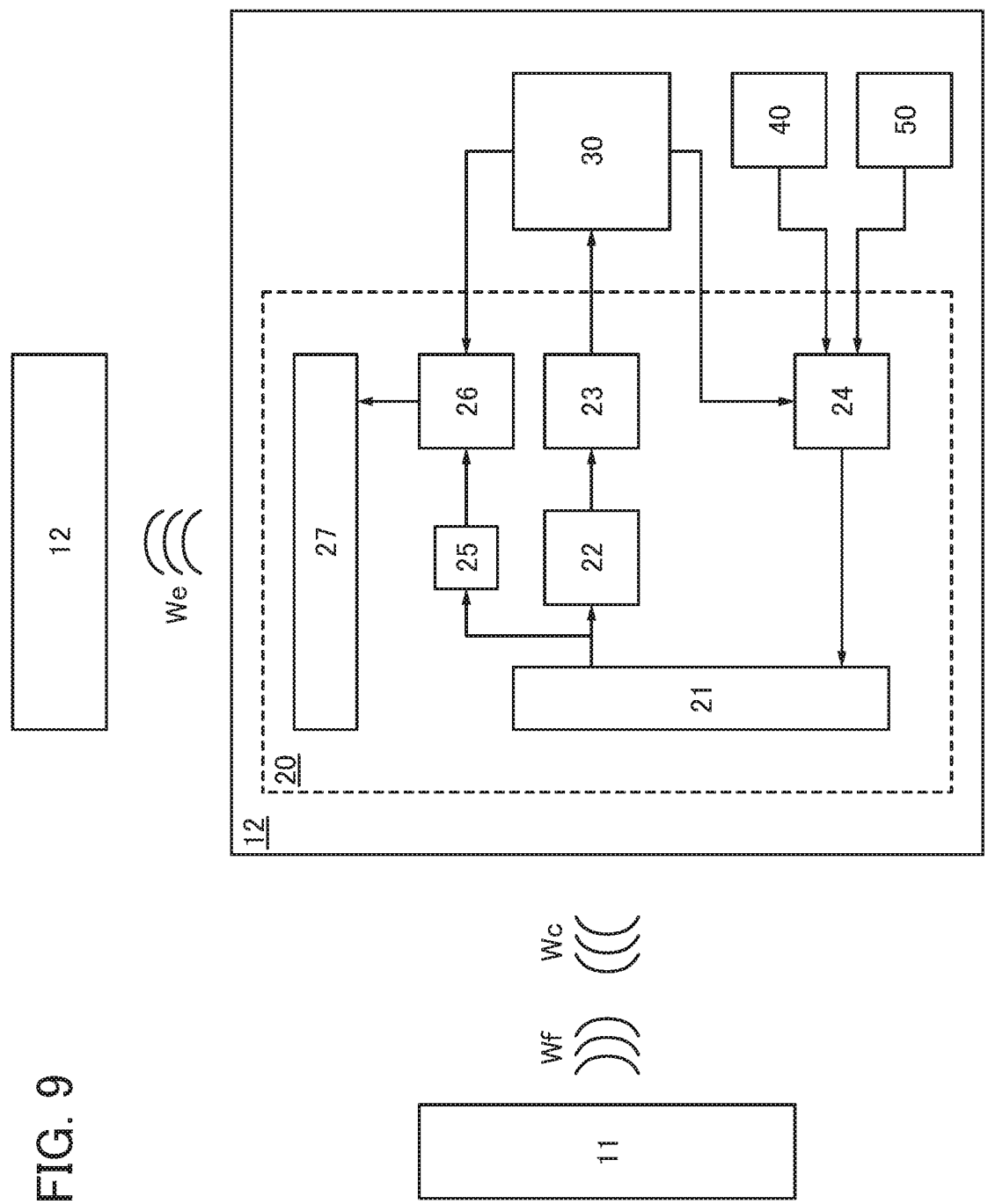
FIG. 9 illustrates a configuration example of a power receiving portion.

FIG. 9 illustrates a specific structure example of the power receiving portion 12 having a function of transmitting the electromagnetic wave We. The power receiving portion 12 illustrated in FIG. 9 is different from that in FIG. 2 in including a switch circuit 25, a delay circuit 26, and an antenna circuit 27. The description of FIG. 2 can be referred to for the other configuration.

The switch circuit 25 has a function of controlling supply of an alternating-current signal that is supplied from the antenna circuit 21 to the delay circuit 26. When the electromagnetic wave We is generated, the switch circuit 25 is turned on and the alternating-current signal is supplied from the antenna circuit 21 to the delay circuit 26.

The criterion of supplying the alternating-current signal from the antenna circuit 21 to the delay circuit 26 can be freely determined. For example, the criterion can be charging completion of the battery 30.

The delay circuit 26 has a function of delaying the alternating-current signal supplied from the antenna circuit 21 via the switch circuit 25. As a result, the phase of the alternating-current signal generated in response to the electromagnetic wave Wf is shifted so that the signal is supplied to the antenna circuit 27. That is, the delay circuit 26 can control the phase of an alternating-current signal supplied to the antenna circuit 27.

Figure 10A:
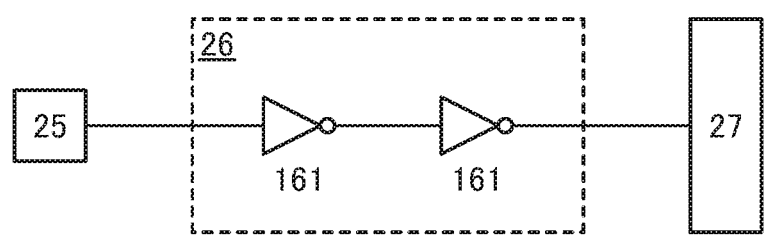
FIGS. 10A and 10B illustrate configuration examples of a delay circuit and an antenna circuit.

FIG. 10A illustrates a configuration example of the delay circuit 26. The delay circuit 26 includes a plurality of inverters 161. The plurality of inverters 161 is connected in series to delay a signal output from the rectifier circuit 22 and shift the phase. Note that the number of inverters 161 connected in series is not particularly limited and can be selected as appropriate depending on a desired amount of phase shift. A resistor or a capacitor can be provided as appropriate between the inverters 161.

Note that the delay circuit 26 may use power of the battery 30. In that case, the power of the battery 30 is supplied to the delay circuit 26 in a period during which the electromagnetic wave Wc is generated.

Figure 10B:
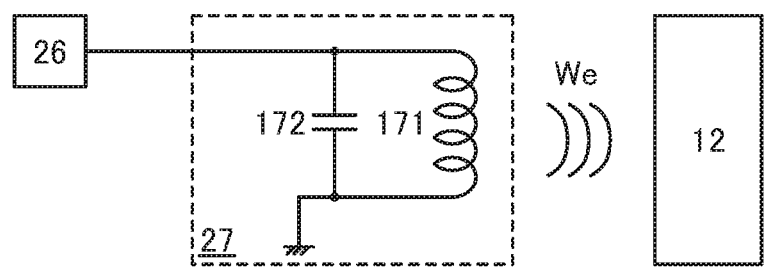

The antenna circuit 27 has a function of converting a signal generated by the delay circuit 26 into the electromagnetic wave Wc and outputting it to the outside. FIG. 10B illustrates a configuration example of the antenna circuit 27. The antenna circuit 27 includes an antenna coil 171 and a capacitor 172. The capacitor 172 has a function of a resonance capacitor. Note that a resonance circuit is preferably used as the antenna circuit 27.

Although the antenna circuit 27 and the antennal circuit 21 are separately provided in this structure, the antenna circuit 27 can be omitted when the antenna circuit 21 has a function of the antennal circuit 27.

As described above, the power receiving portion 12 in which charging is completed transmits the electromagnetic wave Wc to the power receiving portion 12 in which charging is not completed, so that the power receiving portion 12 in which charging is not completed can be efficiently charged. As a result, charging speed can be increased.

This embodiment can be combined with any of the other embodiments as appropriate.

Embodiment 3

This embodiment describes a configuration example in which artificial intelligence (AI) is used for the power feeding system described in the above embodiment.

Note that artificial intelligence is a general term of computers that imitate the intelligence of human beings. In this specification and the like, artificial intelligence includes an artificial neural network (ANN). The artificial neural network is a circuit that resembles a neural network composed of neurons and synapses. In this specification and the like, the term "neural network" particularly refers to artificial neural network.

<Configuration Example of Control Circuit>

Figure 11:
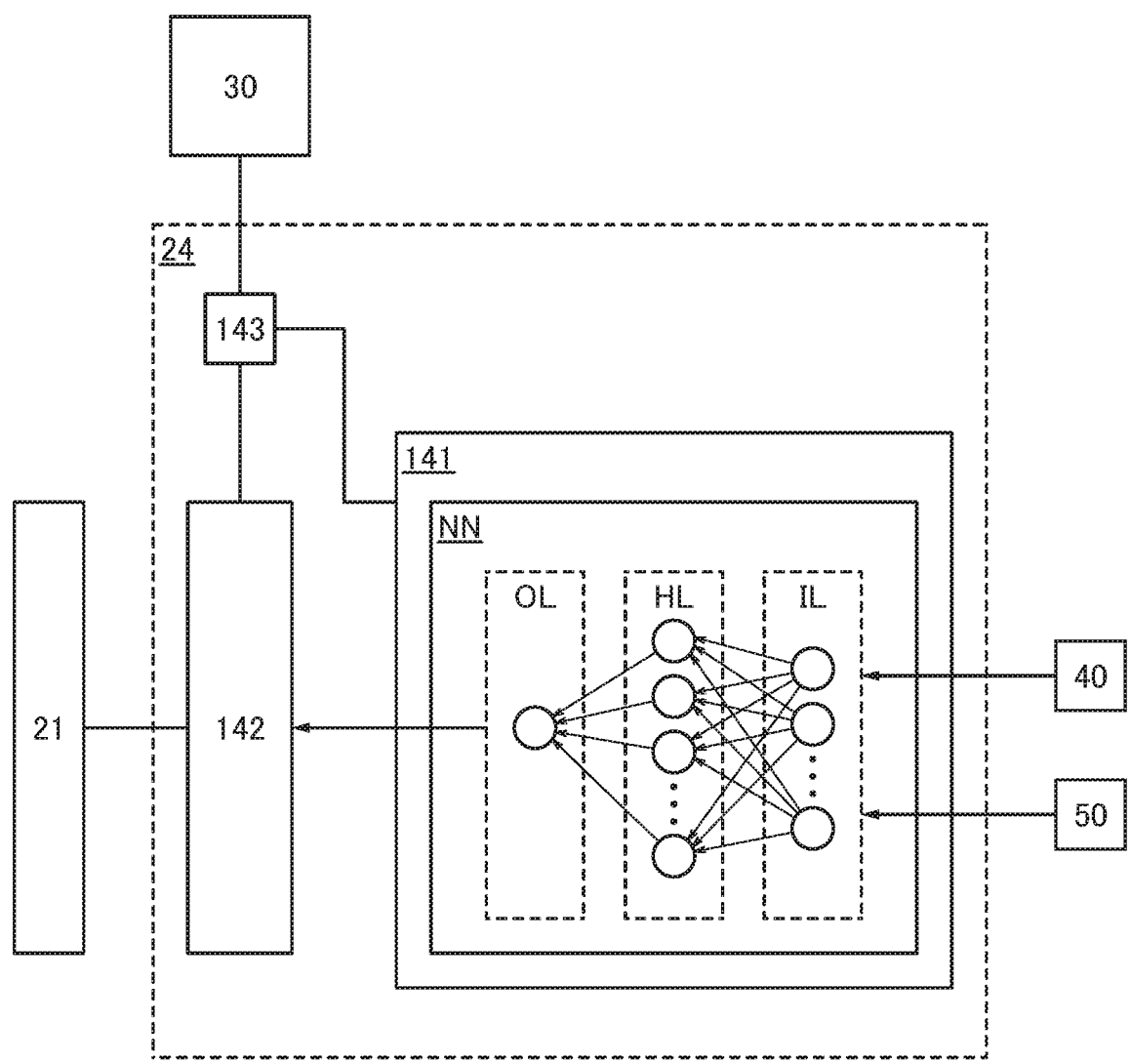
FIG. 11 illustrates a configuration example of a control circuit.

FIG. 11 illustrates a configuration example of the control circuit 24. The control circuit 24 illustrated in FIG. 11 is different from that in FIG. 5A in that the determination circuit 141 includes a neural network NN. The description of FIG. 5A can be referred to for the other configuration.

The neural network NN includes an input layer IL, an output layer OL, and a hidden layer (middle layer) HL. Data corresponding to the overcharging information obtained by the sensor 40, the timer 50, and the like is input to the input layer IL.

The output layer OL, the input layer IL, and the hidden layer HL each include one or a plurality of units (neuron circuits), and output of each unit is multiplied by weights (connection strength), and then is supplied to units provided in different layers. Note that the number of units in each layer can be freely set. The neural network NN may be a network including a plurality of hidden layers HL (deep neural network (DNN)). Learning in the deep neural network is referred to as deep learning in some cases.

The neural network NN acquires a function of selecting the necessity of generation of the electromagnetic wave Wc on the basis of overcharging information (e.g., temperature obtained by the sensor 40, time obtained by the timer 50, and the like). When data corresponding to the overcharging information is input to the input layer of the neural network NN, arithmetic processing is performed in each layer. The arithmetic processing in each layer is performed by, for example, product-sum operation of data output from the units of the previous layer and weight coefficients. Note that connection between the layers may be full connection in which all the units are connected to each other or partial connection in which some of the units are connected to each other. Then, data corresponding to the results that determine whether to generate the electromagnetic wave Wc is output from the output layer OL.

In this manner, the determination circuit 141 using the neural network NN can appropriately determine whether to generate the electromagnetic wave Wc on the basis of a variety of information on overcharging. Therefore, the control circuit 24 can have higher versatility.

<Configuration Example of Neural Network>

Figure 12A:
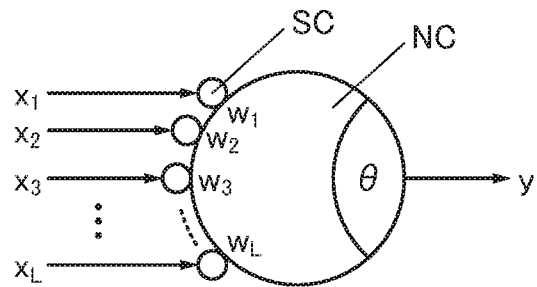
FIGS. 12A, 12B, and 12C each illustrate a configuration example of a neural network.
Figure 12B:
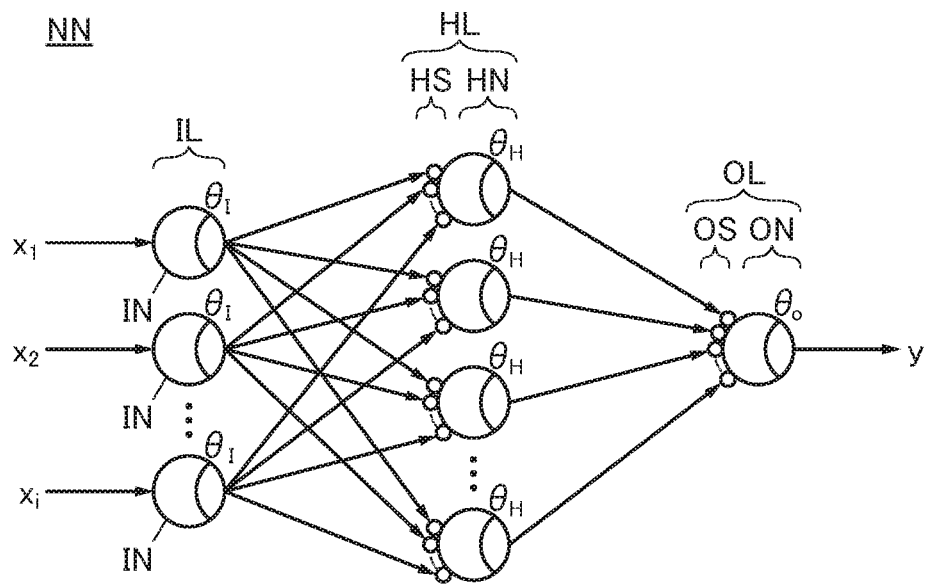
Figure 12C:
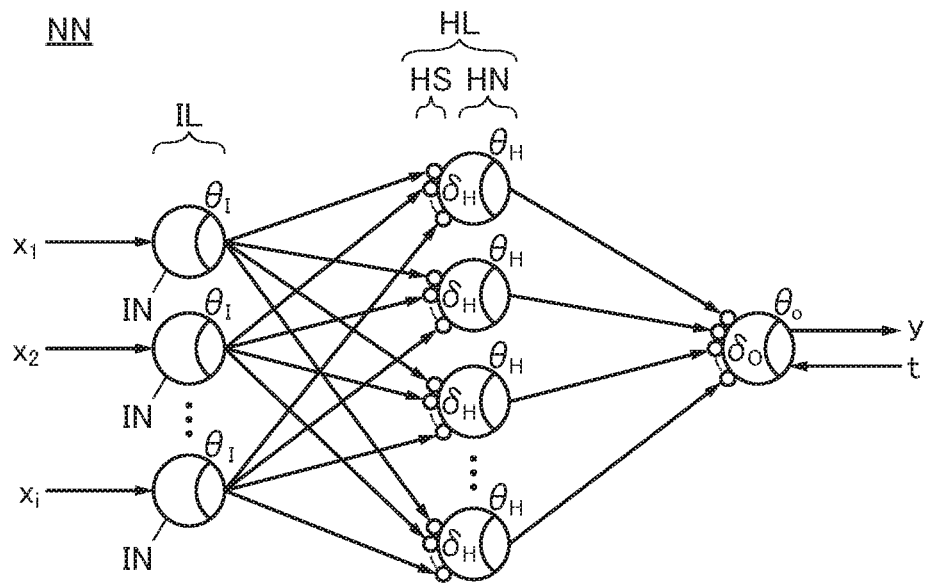

Next, more specific configuration examples of the neural network NN are described. FIGS. 12A to 12C illustrate configuration examples of the neural network. The neural network includes neuron circuits NC and synapse circuits SC provided between the neuron circuits.

FIG. 12A illustrates a configuration example of the neuron circuit NC and the synapse circuit SC. Input data $x_1$ to $x_L$ (L is a natural number) are input to the synapse circuits SC. In addition, the synapse circuits SC each have a function of storing a weight coefficient $w_k$ (k is an integer of 1 to L inclusive). The weight coefficient $w_k$ corresponds to the connection strength between the neuron circuits NC.

When the input data $x_1$ to $x_L$ are input to the synapse circuits SC, the sum of the products $(x_k w_k)$ for k=1 to L (i.e., $x_1 w_1 + x_2 w_2 + \ldots + x_L w_L$) of input data $x_k$ input to the synapse circuit SC and the weight coefficient $w_k$ stored in the synapse circuit SC, that is, a value obtained by the product-sum operation of $x_k$ and $w_k$ is supplied to the neuron circuit NC. When the value is larger than the threshold θ of the neuron circuit NC, the neuron circuit NC outputs a high-level signal y. This phenomenon is referred to as firing of the neuron circuit NC.

FIG. 12B shows a model of a hierarchical neural network using the neuron circuits NC and the synapse circuits SC. The neural network includes the input layer IL, the hidden layer HL, and the output layer OL. The input layer IL includes input neuron circuits IN. The hidden layer HL includes hidden synapse circuits HS and hidden neuron circuits HN. The output layer OL includes output synapse circuits OS and output neuron circuits ON. The thresholds θ of the input neuron circuit IN, the hidden neuron circuit HN, and the output neuron circuit ON are referred to as $θ_I$, $θ_H$, and $θ_O$, respectively.

Data $x_1$ to $x_i$ (i is a natural number) corresponding to overcharging information is supplied to the input layer IL, and output of the input layer IL is supplied to the hidden layer HL. Then, a value obtained by the product-sum operation using the data output from the input layer IL and the weight coefficients w that are held in the hidden synapse circuits HS is supplied to the hidden neuron circuits HN. A value obtained by the product-sum operation using the output of the hidden neuron circuit HN and the weight coefficients w that are held in the output synapse circuits OS is supplied to the output neuron circuits ON. Then, data y corresponding to the necessity of generation of the electromagnetic wave Wc is output from the output neuron circuit ON.

As described above, the neural network illustrated in FIG. 12B has a function of determining the necessity of generation of the electromagnetic wave Wc on the basis of overcharging information.

A gradient descent method or the like can be used for learning in the neural network, and a backpropagation method can be used for calculation of a gradient. FIG. 12C shows a model of the neural network which performs supervised learning using a backpropagation method.

A backpropagation method is one of methods for changing a weight coefficient of a synapse circuit so that the error between output data from a neural network and teacher data is reduced. Specifically, a weight coefficient w of the hidden synapse circuit HS is changed in accordance with an error $\delta_O$ that is determined on the basis of the output data (data y) and the teacher data (data t). In addition, a weight coefficient w of a synapse circuit SC in the previous stage is changed in accordance with the amount of change in the weight coefficient w of the hidden synapse circuit HS. In this manner, weight coefficients of the synapse circuits SC are sequentially changed on the basis of the teacher data, so that the neural network NN can perform learning.

Note that the number of the hidden layers HL is one in each of FIGS. 12B and 12C but may be two or more. Thus, deep learning can be performed.

This embodiment can be combined with any of the other embodiments as appropriate.

Embodiment 4

In this embodiment, configuration examples of semiconductor devices that can be used in the neural networks described in the above embodiment will be described.

In the case where a neural network is composed of hardware, product-sum operations in the neural network can be performed with the use of product-sum operation elements. In this embodiment, configuration examples of semiconductor devices that can be used as product-sum operation elements in the neural network NN will be described.
<Configuration Example of Semiconductor Device>

Figure 13:
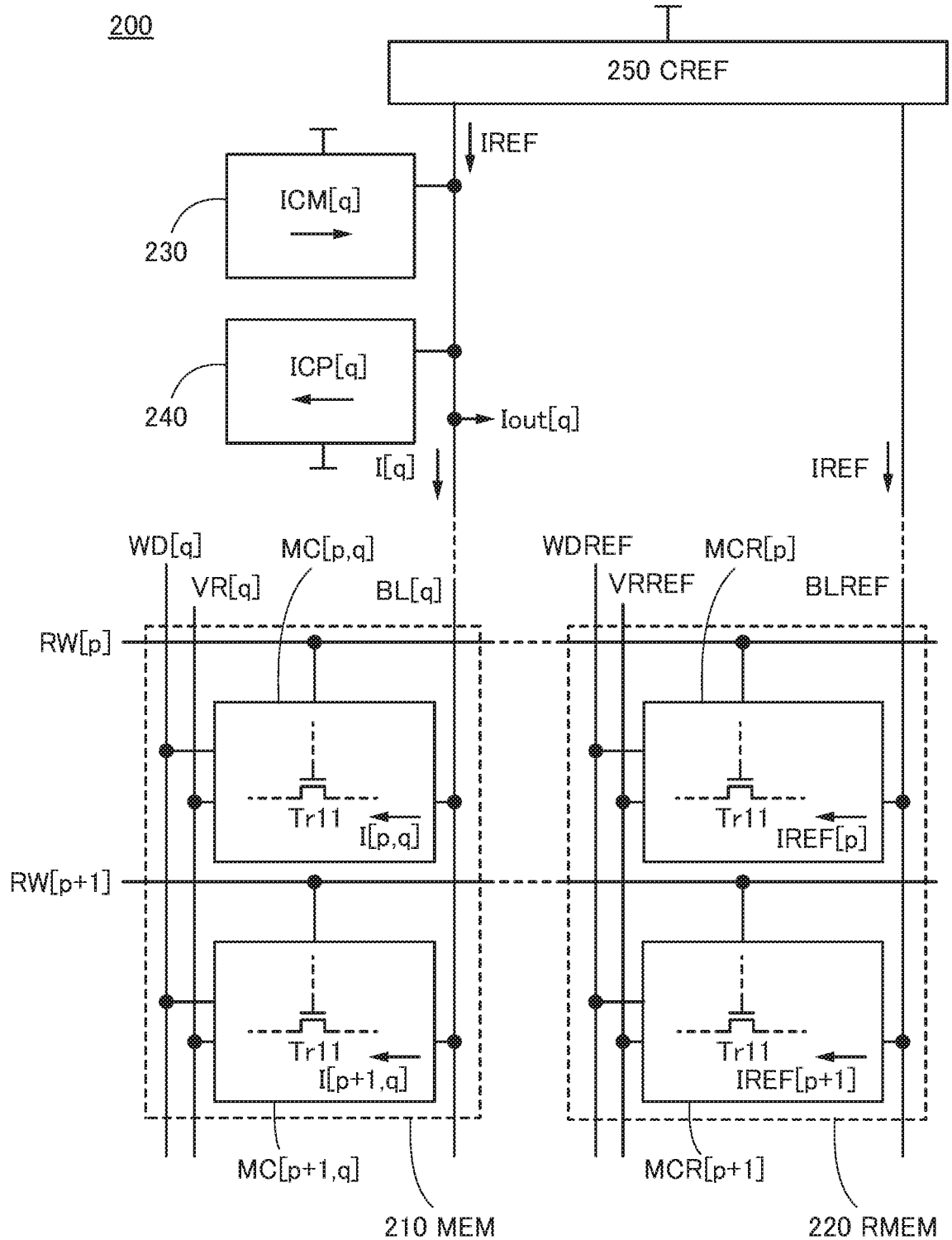
FIG. 13 illustrates a configuration example of a semiconductor device.

FIG. 13 illustrates a configuration example of a semiconductor device 200. The semiconductor device 200 illustrated in FIG. 13 includes a memory circuit 210 (MEM), a reference memory circuit 220 (RMEM), a circuit 230, and a circuit 240. The semiconductor device 200 may further include a current supply circuit 250 (CREF).

The memory circuit 210 (MEM) includes a memory cell MC such as a memory cell MC[p, q] and a memory cell MC[p+1, q]. The memory cell MC includes an element that has a function of converting an input potential into current. As the element having such a function, an active element such as a transistor can be used, for example. FIG. 13 illustrates an example where the memory cell MC includes a transistor Tr11.

A first analog potential is input to the memory cell MC through a wiring WD such as a wiring WD[q]. The first analog potential corresponds to first analog data. The memory cell MC has a function of generating a first analog current corresponding to the first analog potential. Specifically, drain current of the transistor Tr11, which is obtained when the first analog potential is supplied to a gate of the transistor Tr11, can be used as the first analog current. Hereinafter, current flowing in the memory cell MC[p, q] is denoted by I[p, q], and current flowing in the memory cell MC[p+1, q] is denoted by I[p+1, q].

Note that the drain current of the transistor Tr11 operating in a saturation region is not dependent on voltage between a source and a drain and is controlled by the difference between its gate voltage and threshold voltage. Thus, the transistor Tr11 desirably operates in a saturation region. The gate voltage and the voltage between the source and the drain of the transistor Tr11 are each appropriately set to a voltage at which the transistor Tr11 operates in a saturation region.

Specifically, in the semiconductor device 200 illustrated in FIG. 13, a first analog potential Vx[p, q] or a potential corresponding to the first analog potential Vx[p, q] is input to the memory cell MC[p, q] through the wiring WD[q]. The memory cell MC[p, q] has a function of generating a first analog current corresponding to the first analog potential Vx[p, q]. This means that the current I[p, q] flowing in the memory cell MC[p, q] corresponds to the first analog current, in this case.

Furthermore, in the semiconductor device 200 illustrated in FIG. 13, a first analog potential Vx[p+1, q] or a potential corresponding to the first analog potential Vx[p+1, q] is input to the memory cell MC[p+1, q] through the wiring WD[q]. The memory cell MC[p+1, q] has a function of generating a first analog current corresponding to the first analog potential Vx[p+1, q]. This means that the current I[p+1, q] flowing in the memory cell MC[p+1, q] corresponds to the first analog current, in this case.

The memory cell MC has a function of holding the first analog potential. In other words, the memory cell MC has a function of holding the first analog current corresponding to the first analog potential.

Moreover, a second analog potential is input to the memory cell MC through a wiring RW such as a wiring RW[p] and a wiring RW[p+1]. The second analog potential corresponds to second analog data. The memory cell MC has a function of adding the second analog potential or a potential corresponding to the second analog potential to the first analog potential that is held and a function of holding a third analog potential obtained by the addition. The memory cell MC also has a function of generating a second analog current corresponding to the third analog potential. In other words, the memory cell MC has a function of holding the second analog current corresponding to the third analog potential.

Specifically, in the semiconductor device 200 illustrated in FIG. 13, a second analog potential Vw[p, q] is input to the memory cell MC[p, q] through the wiring RW[p]. The memory cell MC[p, q] has a function of holding a third analog potential corresponding to the first analog potential Vx[p, q] and the second analog potential Vw[p, q]. The memory cell MC[p, q] also has a function of generating a second analog current corresponding to the third analog potential. This means that the current I[p, q] flowing in the memory cell MC[p, q] corresponds to the second analog current, in this case.

Furthermore, in the semiconductor device 200 illustrated in FIG. 13, a second analog potential Vw[p+1, q] is input to the memory cell MC[p+1, q] through the wiring RW[p+1]. The memory cell MC[p+1, q] has a function of holding the first analog potential Vx[p+1, q] and a third analog potential corresponding to the second analog potential Vw[p+1, q]. The memory cell MC[p+1, q] also has a function of generating a second analog current corresponding to the third analog potential. This means that the current I[p+1, q] flowing in the memory cell MC[p+1, q] corresponds to the second analog current, in this case.

The current I[p, q] flows between a wiring BL[q] and a wiring VR[q] through the memory cell MC[p, q]. The current I[p+1, q] flows between the wiring BL[q] and the wiring VR[q] through the memory cell MC[p+1, q]. Accordingly, a current I[q], which corresponds to the sum of the current I[p, q] and the current I[p+1, q], flows between the wiring BL[q] and the wiring VR[q] through the memory cell MC[p, q] and the memory cell MC[p+1, q].

The reference memory circuit 220 (RMEM) includes a memory cell MCR such as a memory cell MCR[p] and a memory cell MCR[p+1]. Note that a first reference potential VPR is input to the memory cell MCR through a wiring WDREF. The memory cell MCR has a function of generating a first reference current corresponding to the first reference potential VPR. Hereinafter, current flowing in the memory cell MCR[p] is denoted by IREF[p], and current flowing in the memory cell MCR[p+1] is denoted by IREF[p+1].

Specifically, in the semiconductor device 200 illustrated in FIG. 13, the first reference potential VPR is input to the memory cell MCR[p] through the wiring WDREF. The memory cell MCR[p] has a function of generating the first reference current corresponding to the first reference potential VPR. This means that the current IREF[p] flowing in the memory cell MCR[p] corresponds to the first reference current, in this case.

Furthermore, in the semiconductor device 200 illustrated in FIG. 13, the first reference potential VPR is input to the memory cell MCR[p+1] through the wiring WDREF. The memory cell MCR[p+1] has a function of generating the first reference current corresponding to the first reference potential VPR. This means that the current IREF[p+1] flowing in the memory cell MCR[p+1] corresponds to the first reference current, in this case.

The memory cell MCR has a function of holding the first reference potential VPR. In other words, the memory cell MCR has a function of holding the first reference current corresponding to the first reference potential VPR.

Moreover, the second analog potential is input to the memory cell MCR through the wiring RW such as the wiring RW[p] and the wiring RW[p+1]. The memory cell MCR has a function of adding the second analog potential or a potential corresponding to the second analog potential to the first reference potential VPR that is held and a function of holding a second reference potential obtained by the addition. The memory cell MCR also has a function of generating a second reference current corresponding to the second reference potential. In other words, the memory cell MCR has a function of holding the second reference current corresponding to the second reference potential.

Specifically, in the semiconductor device 200 illustrated in FIG. 13, the second analog potential Vw[p, q] is input to the memory cell MCR[p] through the wiring RW[p]. The memory cell MCR[p] has a function of holding a second reference potential corresponding to the first reference potential VPR and the second analog potential Vw[p, q]. The memory cell MCR[p] also has a function of generating the second reference current corresponding to the second reference potential. This means that the current IREF[p] flowing in the memory cell MCR[p] corresponds to the second reference current, in this case.

Furthermore, in the semiconductor device 200 illustrated in FIG. 13, the second analog potential Vw[p+1, q] is input to the memory cell MCR[p+1] through the wiring RW[p+1]. The memory cell MCR[p+1] has a function of holding the first reference potential VPR and a second reference potential corresponding to the second analog potential Vw[p+1, q]. The memory cell MCR[p+1] also has a function of generating the second reference current corresponding to the second reference potential. This means that the current IREF[p+1] flowing in the memory cell MCR[p+1] corresponds to the second reference current, in this case.

The current IREF[p] flows between a wiring BLREF and a wiring VRREF through the memory cell MCR[p]. The current IREF[p+1] flows between the wiring BLREF and the wiring VRREF through the memory cell MCR[p+1]. Accordingly, a current IREF, which corresponds to the sum of the current IREF[p] and the current IREF[p+1], flows between the wiring BLREF and the wiring VRREF through the memory cell MCR[p] and the memory cell MCR[p+1].

The current supply circuit 250 has a function of supplying current with the same value as the current IREF that flows through the wiring BLREF or supplying current corresponding to the current IREF to the wiring BL. In the case where the current I[q] that flows between the wiring BL[q] and the wiring VR[q] through the memory cell MC[p, q] and the memory cell MC[p+1, q] is different from the current IREF that flows between the wiring BLREF and the wiring VRREF through the memory cell MCR[p] and the memory cell MCR[p+1] and thus offset current is set as described later, current corresponding to the difference flows in the circuit 230 or the circuit 240. The circuit 230 serves as a current source circuit, and the circuit 240 serves as a current sink circuit.

Specifically, in the case where the current I[q] is higher than the current IREF, the circuit 230 has a function of generating a current ΔI[q] that corresponds to the difference between the current I[q] and the current IREF. The circuit 230 also has a function of supplying the generated current ΔI[q] to the wiring BL[q]. This means that the circuit 230 has a function of holding the current ΔI[q].

In the case where the current I[q] is lower than the current IREF, the circuit 240 has a function of generating the current ΔI[q] that corresponds the difference between the current I[q] and the current IREF. The circuit 240 also has a function of drawing the generated current ΔI[q] from the wiring BL[q]. This means that the circuit 240 has a function of holding the current ΔI[q].

Next, an operation example of the semiconductor device 200 illustrated in FIG. 13 will be described.

First, a potential corresponding to the first analog potential is stored in the memory cell MC[p, q]. Specifically, a potential VPR−Vx[p, q], which is obtained by subtracting the first analog potential Vx[p, q] from the first reference potential VPR, is input to the memory cell MC[p, q] through the wiring WD[q]. The memory cell MC[p, q] holds the potential VPR−Vx[p, q]. In addition, the memory cell MC[p, q] generates the current I[p, q] that corresponds to the potential VPR−Vx[p, q]. The first reference potential VPR is, for example, a potential that is higher than a ground potential. Specifically, the first reference potential VPR is desirably higher than a ground potential and as high as or lower than a high-level potential VDD that is supplied to the current supply circuit 250.

Furthermore, the first reference potential VPR is stored in the memory cell MCR[p]. Specifically, the first reference potential VPR is input to the memory cell MCR[p] through the wiring WDREF. The memory cell MCR[p] holds the first reference potential VPR. In addition, the memory cell MCR[p] generates the current IREF[p] that corresponds to the first reference potential VPR.

Moreover, a potential corresponding to the first analog potential is stored in the memory cell MC[p+1, q]. Specifically, a potential VPR−Vx[p+1, q], which is obtained by subtracting the first analog potential Vx[p+1, q] from the first reference potential VPR, is input to the memory cell MC[p+1, q] through the wiring WD[q]. The memory cell MC[p+1, q] holds the potential VPR−Vx[p+1, q]. In addition, the memory cell MC[p+1, q] generates the current I[p+1, q] that corresponds to the potential VPR−Vx[p+1, q].

Furthermore, the first reference potential VPR is stored in the memory cell MCR[p+1]. Specifically, the first reference potential VPR is input to the memory cell MCR[p+1] through the wiring WDREF. The memory cell MCR[p+1] holds the first reference potential VPR. In addition, the memory cell MCR[p+1] generates the current IREF[p+1] that corresponds to the first reference potential VPR.

During the above operation, the wiring RW[p] and the wiring RW[p+1] are each set to a base potential. As a base potential, for example, a ground potential or a low-level potential VSS that is lower than a ground potential can be used. Alternatively, a potential between the potential VSS and the potential VDD may be used as a ground potential. This is preferable because the potential of the wiring RW can be higher than the base potential regardless of whether the second analog potential Vw is positive or negative, which enables easy generation of signals and multiplication of either positive or negative analog data.

As a result of the above operation, current corresponding to the sum of currents generated in the memory cells MC connected to the wiring BL[q] flows through the wiring BL[q]. Specifically, in FIG. 13, the current I[q], which is the sum of the current I[p, q]generated in the memory cell MC[p, q] and the current I[p+1, q] generated in the memory cell MC[p+1, q], flows through the wiring BL[q]. In addition, as a result of the above operation, current corresponding to the sum of currents generated in the memory cells MCR connected to the wiring BLREF flows through the wiring BLREF. Specifically, in FIG. 13, the current IREF, which is the sum of the current IREF[p] generated in the memory cell MCR[p] and the current IREF[p+1] generated in the memory cell MCR[p+1], flows through the wiring BLREF.

Next, an offset current Ioffset[q], which is the difference between the current I[q] obtained by inputting the first analog potential and the current IREF obtained by inputting the first reference potential, is held in the circuit 230 or the circuit 240 while the wiring RW[p] and the wiring RW[p+1] are kept at base potentials.

Specifically, when the current I[q] is higher than the current IREF, the circuit 230 supplies the current Ioffset[q] to the wiring BL[q]. This means that a current ICM[q] that flows in the circuit 230 corresponds to the current Ioffset[q]. The current ICM[q] is held in the circuit 230. When the current I[q] is lower than the current IREF, the circuit 240 draws the current Ioffset[q] from the wiring BL[q]. This means that a current ICP[q] that flows in the circuit 240 corresponds to the current Ioffset[q]. The current ICP[q] is held in the circuit 240.

Then, the second analog potential or a potential corresponding to the second analog potential is stored in the memory cell MC[p, q] so as to be added to the first analog potential or a potential corresponding to the first analog potential held in the memory cell MC[p, q]. Specifically, when the potential of the wiring RW[p] is set to a potential that is higher than a base potential by Vw[p], a second analog potential Vw[p] is input to the memory cell MC[p, q] through the wiring RW[p]. The memory cell MC[p, q] holds a potential VPR−Vx[p, q]+Vw[p]. Furthermore, the memory cell MC[p, q] generates the current I[p, q] corresponding to the potential VPR−Vx[p, q]+Vw[p].

In addition, the second analog potential or the potential corresponding to the second analog potential is stored in the memory cell MC[p+1, q] so as to be added to the first analog potential or a potential corresponding to the first analog potential held in the memory cell MC[p+1, q]. Specifically, when the potential of the wiring RW[p+1] is set to a potential that is higher than a base potential by Vw[p+1], a second analog potential Vw[p+1] is input to the memory cell MC[p+1, q] through the wiring RW[p+1]. The memory cell MC[p+, q] holds a potential VPR−Vx[p+1, q]+Vw[p+1]. Furthermore, the memory cell MC[p+1, q] generates the current I[p+1, q] corresponding to the potential VPR−Vx[p+1, q]+Vw[p+1].

In the case where the transistor Tr11 that operates in a saturation region is used as an element for converting a potential into current, since the drain current of the transistor Tr11 included in the memory cell MC[p, q] corresponds to the current I[p, q], the second analog current is expressed by Formula 1 below. Note that Vw[p] is the potential of the wiring RW[p], Vw[p+1] is the potential of the wiring RW[p+1], k is a coefficient, and Vth is the threshold voltage of the transistor Tr11.

$$I[p, q] = k(Vw[p] - Vth + VPR - Vx[p, q])^2 \quad \text{(Formula 1)}$$

Furthermore, since the drain current of the transistor Tr11 included in the memory cell MCR[p] corresponds to the current IREF[p], the second reference current is expressed by Formula 2 below.

$$IREF[p] = k(Vw[p] - Vth + VPR)^2 \quad \text{(Formula 2)}$$

The current I[q], which corresponds to the sum of the current I[p, q] flowing in the memory cell MC[p, q] and the current I[p+1, q] flowing in the memory cell MC[p+1, q], can be expressed as ΣI[p, q]. The current IREF, which corresponds to the sum of the current IREF[p] flowing in the memory cell MCR[p] and the current IREF[p+1] flowing in the memory cell MCR[p+1], can be expressed as ΣiIREF[p]. Accordingly, the current ΔI[q] that correspond to the difference between the current I[q] and the current IREF is expressed by Formula 3 below.

$$\Delta I[q] = IREF - I[q] = \Sigma iIREF[p] - \Sigma iI[p, q] \quad \text{(Formula 3)}$$

The current ΔI[q] can be obtained from Formulae 1 to 3, as expressed by Formula 4 below.

$$\Delta I[q] = \Sigma i \{k(Vw[p] - Vth + VPR)^2 -$$ (Formula 4)
$$k(Vw[p] - Vth + VPR - Vx[p, q])^2\} = 2k\Sigma i(Vw[p] \cdot Vx[p, q]) -$$
$$2k\Sigma i(Vth - VPR) \cdot Vx[p, q] - k\Sigma i Vx[p, q]^2$$

The term $2k\Sigma i(Vw[p] \cdot Vx[p, q])$ in Formula 4 corresponds to the sum of the product of the first analog potential Vx[p, q] and the second analog potential Vw[p] and the product of the first analog potential Vx[p+1, q] and the second analog potential Vw[p+1].

Furthermore, if the current Ioffset[q] is defined as the current ΔI[q] at the time when the potential of the wiring RW[p] is all set to a base potential, that is, when the second analog potential Vw[p] and the second analog potential Vw[p+1] are both 0. Formula 5 below can be obtained from Formula 4.

$$Ioffset[q] = -2k\Sigma i(Vth - VPR) \cdot Vx[p, q] - k\Sigma i Vx[p, q]^2$$ (Formula 5)

It is found from Formulae 3 to 5 that $2k\Sigma i(Vw[p] \cdot Vx[p, q])$ that corresponds to the product-sum of the first analog data and the second analog data is expressed by Formula 6 below.

$$2k\Sigma i(Vw[p] \cdot Vx[p, q]) = IREF - I[q] - Ioffset[q]$$ (Formula 6)

When the potential of the wiring RW[p] is Vw[p] and the potential of the wiring RW[p+1] is Vw[p+1], a current Iout[q] that flows from the wiring BL[q] is expressed by IREF−I[q]−Ioffset[q], where I[q] is the sum of currents flowing in the memory cells MC, IREF is the sum of currents flowing in the memory cells MCR, and Ioffset[q] is current flowing in the circuit 230 or the circuit 240. According to Formula 6, the current Iout[q] equals to $2k\Sigma i(Vw[p] \cdot Vx[p, q])$, which corresponds to the sum of the product of the first analog potential Vx[p, q] and the second analog potential Vw[p] and the product of the first analog potential Vx[p+1, q] and the second analog potential Vw[p+1].

The transistor Tr11 desirably operates in a saturation region. However, even if the operation region of the transistor Tr11 deviates from an ideal saturation region, the transistor Tr11 is regarded as operating in a saturation region as long as there is no problem in obtaining current that corresponds to the sum of the product of the first analog potential Vx[p, q] and the second analog potential Vw[p] and the product of the first analog potential Vx[p+1, q] and the second analog potential Vw[p+1] with an accuracy within a desired range.

According to one embodiment of the present invention, analog data can be subjected to arithmetic processing without being converted into digital data; thus, the circuit scale of a semiconductor device can be reduced or the time required for the arithmetic processing of analog data can be shortened. Alternatively, according to one embodiment of the present invention, power consumption of a semiconductor device can be reduced while the time required for arithmetic processing of analog data is shortened.

<Configuration Example of Memory Circuit>

Next, a specific configuration example of the memory circuit 210 (MEM) and the reference memory circuit 220 (RMEM) will be described with reference to FIG. 14.

Figure 14:
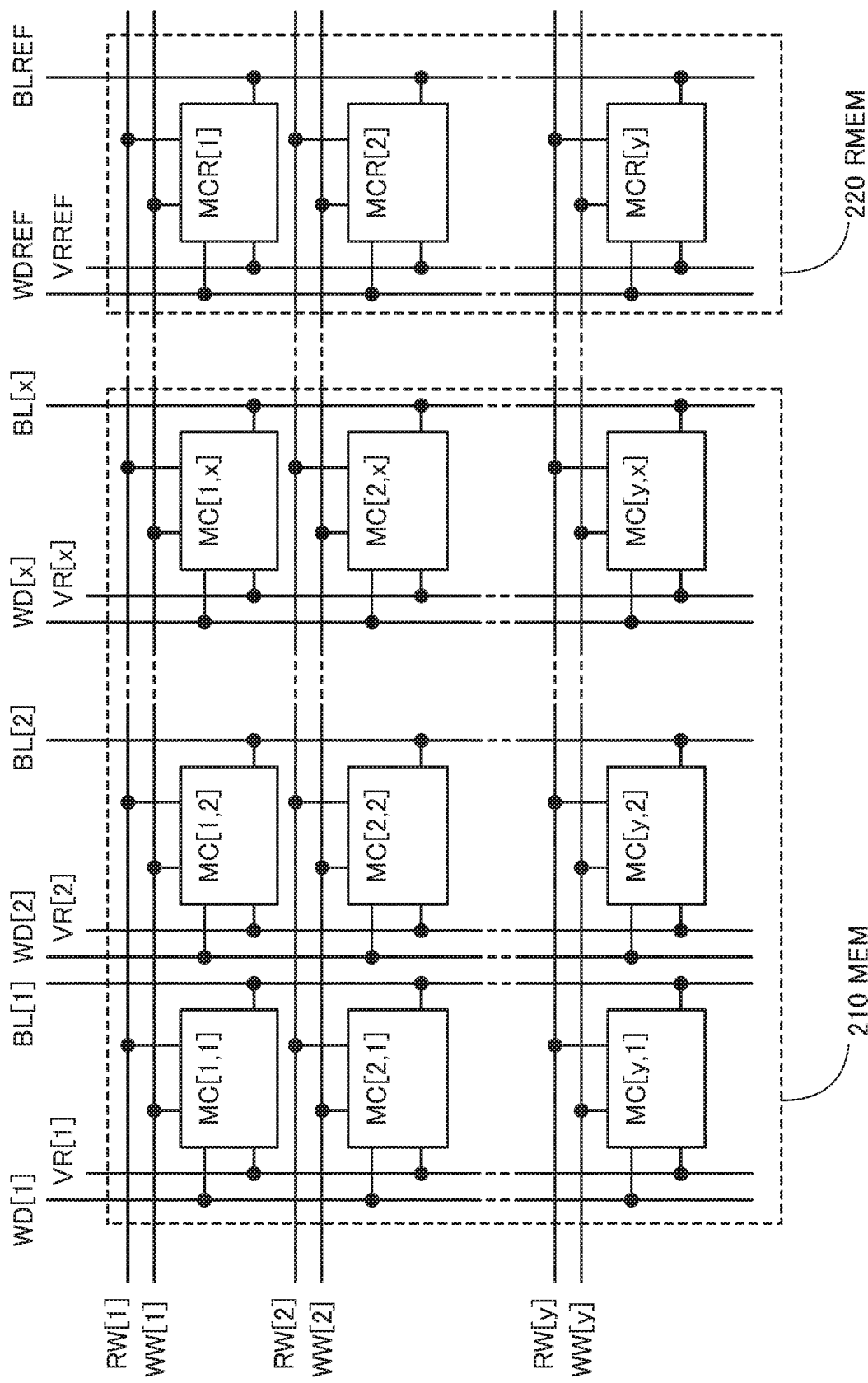
FIG. 14 illustrates a configuration example of a memory circuit.

FIG. 14 illustrates an example where the memory circuit 210 (MEM) includes the memory cells MC in y rows and x columns (x and y are natural numbers) and the reference memory circuit 220 (RMEM) includes the memory cells MCR in y rows and one column.

Note that a source of a transistor in this specification and the like means a source region that is part of a semiconductor layer functioning as a channel formation region, a source electrode connected to the semiconductor layer, or the like. Similarly, a drain of a transistor means a drain region that is part of the semiconductor layer, a drain electrode connected to the semiconductor layer, or the like. A gate of a transistor means a gate electrode or the like.

The terms "source" and "drain" of a transistor interchange with each other depending on the conductivity type of the transistor or levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although the connection relationship of a transistor is described assuming that the source and the drain are fixed in some cases for convenience, actually, the names of the source and the drain interchange with each other depending on the relationship of the potentials.

The memory circuit 210 is connected to the wiring RW, a wiring WW, the wiring WD, the wiring VR, and the wiring BL. In the example illustrated in FIG. 14, wirings RW[1] to RW[y] and wirings WW[1] to WW[y] are connected to the memory cells MC in the respective rows. Moreover, wirings WD[1] to WD[x], wirings BL[1] to BL[x], and wirings VR[1] to VR[x] are connected to the memory cells MC in the respective columns. Note that the wirings VR[1] to VR[x] may be connected to each other.

The reference memory circuit 220 is connected to the wiring RW, the wiring WW, the wiring WDREF, the wiring VRREF, and the wiring BLREF. In the example illustrated in FIG. 14, the wirings RW[1] to RW[y] and the wirings WW[1] to WW[y] are connected to the memory cells MCR in the respective rows. Moreover, the wiring WDREF, the wiring BLREF, and the wiring VRREF are connected to the memory cells MCR in the one column. Note that the wiring VRREF may be connected to the wirings VR[1] to VR[x].

Figure 15:
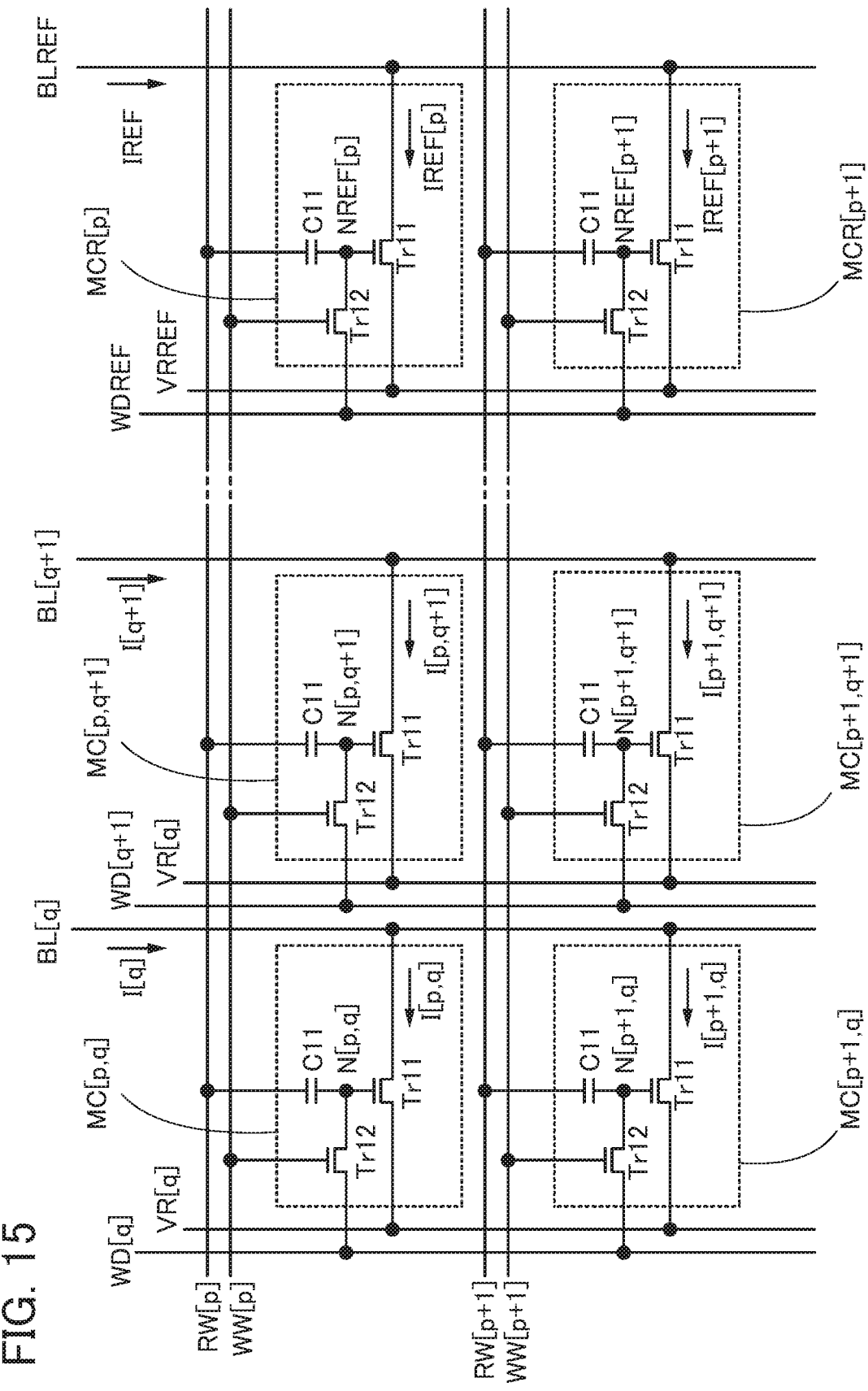
FIG. 15 illustrates a configuration example of a memory cell.

FIG. 15 illustrates, as an example, a specific circuit configuration and a specific connection relationship of the memory cells MC in any two rows and two columns among the memory cells MC illustrated in FIG. 14 and the memory cells MCR in any two rows and one column among the memory cells MCR illustrated in FIG. 14.

Specifically, FIG. 15 illustrates the memory cell MC[p, q] in the p-th row and the q-th column, the memory cell MC[p+1, q] in the p+1-th row and the q-th column, a memory cell MC[p, q+1] in the p-th row and the q+1-th column, and a memory cell MC[p+1, q+1] in the p+1-th row and the q+1-th column. FIG. 15 also illustrates the memory cell MCR[p] in the p-th row and the memory cell MCR[p+1] in the q+1-th row. Note that p and p+1 are each any number from 1 toy, and q and q+1 are each any number from 1 to x.

The memory cell MC[p, q], the memory cell MC[p, q+1], and the memory cell MCR[p] in the p-th row are connected to the wiring RW[p] and a wiring WW[p]. The memory cell MC[p+1, q], the memory cell MC[p+1, q+1], and the memory cell MCR[p+1] in the p+1-th row are connected to the wiring RW[p+1] and a wiring WW[p+1].

The memory cell MC[p, q] and the memory cell MC[p+1, q] in the q-th column are connected to the wiring WD[q], the wiring VR[q], and the wiring BL[q]. The memory cell MC[p, q+1] and the memory cell MC[p+1, q+1] in the q+1-th column are connected to a wiring WD[q+1], a wiring VR[q+1], and a wiring BL[q+1]. The memory cell MCR[p] in the p-th row and the memory cell MCR[p+1] in the p+1-th row are connected to the wiring WDREF, the wiring VRREF, and the wiring BLREF.

The memory cells MC and MCR each include the transistor Tr11, a transistor Tr12, and a capacitor C11. The transistor Tr12 has a function of controlling the input of the first analog potential to the memory cell MC or the memory cell MCR. The transistor Tr11 has a function of generating analog current in accordance with a potential input to its gate. The capacitor C11 has a function of adding the second analog potential or a potential corresponding to the second analog potential to the first analog potential or a potential corresponding to the first analog potential that is held in the memory cell MC or the memory cell MCR Specifically, in the memory cell MC illustrated in FIG. 15, a gate of the transistor Tr12 is connected to the wiring WW, one of a source and a drain of the transistor Tr12 is connected to the wiring WD, and the other of the source and the drain of the transistor Tr12 is connected to the gate of the transistor Tr11. Furthermore, one of a source and a drain of the transistor Tr11 is connected to the wiring VR, and the other of the source and the drain of the transistor Tr11 is connected to the wiring BL. A first electrode of the capacitor C11 is connected to the wiring RW, and a second electrode of the capacitor C11 is connected to the gate of the transistor Tr11.

In addition, in the memory cell MCR illustrated in FIG. 15, a gate of the transistor Tr12 is connected to the wiring WW, one of a source and a drain of the transistor Tr12 is connected to the wiring WDREF, and the other of the source and the drain of the transistor Tr12 is connected to the gate of the transistor Tr11. Furthermore, one of a source and a drain of the transistor Tr11 is connected to the wiring VRREF, and the other of the source and the drain of the transistor Tr11 is connected to the wiring BLREF. A first electrode of the capacitor C11 is connected to the wiring RW, and a second electrode of the capacitor C11 is connected to the gate of the transistor Tr11.

The gate of the transistor Tr11 in the memory cell MC is called a node N here. In the memory cell MC, the first analog potential is input to the node N through the transistor Tr12. Then, when the transistor Tr12 is turned off, the node N is brought into a floating state and the first analog potential or the potential corresponding to the first analog potential is held at the node N. In the memory cell MC, when the node N is brought into a floating state, the second analog potential input to the first electrode of the capacitor C11 is applied to the node N. As a result of the above operation, the node N can have a potential obtained by adding the second analog potential or the potential corresponding to the second analog potential to the first analog potential or the potential corresponding to the first analog potential.

Because the potential of the first electrode of the capacitor C11 is applied to the node N through the capacitor C11, the amount of change in the potential of the first electrode is not exactly the same as the amount of change in the potential of the node N, actually. Specifically, the accurate amount of change in the potential of the node N can be calculated in the following manner: a coupling coefficient uniquely determined by the capacitance value of the capacitor C11, the value of the gate capacitance of the transistor Tr11, and the value of parasitic capacitance is multiplied by the amount of change in the potential of the first electrode. In the following description, the amount of change in the potential of the first electrode is assumed to be substantially the same as the amount of change in the potential of the node N, for easy understanding.

The drain current of the transistor Tr11 is determined in accordance with the potential of the node N. Thus, when the transistor Tr12 is turned off, the value of the drain current of the transistor Tr11 as well as the potential of the node N is held. The drain current is affected by the first analog potential and the second analog potential.

The gate of the transistor Tr11 in the memory cell MCR is called a node NREF here. In the memory cell MCR, the first reference potential or a potential corresponding to the first reference potential is input to the node NREF through the transistor Tr12. Then, when the transistor Tr12 is turned off, the node NREF is brought into a floating state and the first reference potential or the potential corresponding to the first reference potential is held at the node NREF. In the memory cell MCR, when the node NREF is brought into a floating state, the second analog potential input to the first electrode of the capacitor C11 is applied to the node NREF. As a result of the above operation, the node NREF can have a potential obtained by adding the second analog potential or the potential corresponding to the second analog potential to the first reference potential or the potential corresponding to the first reference potential.

The drain current of the transistor Tr11 is determined in accordance with the potential of the node NREF. Thus, when the transistor Tr12 is turned off, the value the drain current of the transistor Tr11 as well as the potential of the node NREF is held. The drain current is affected by the first reference potential and the second analog potential.

When the drain current of the transistor Tr11 in the memory cell MC[p, q] is the current I[p, q] and the drain current of the transistor Tr11 in the memory cell MC[p+1 q] is the current I[p+1, q], the sum of currents supplied to the memory cell MC[p, q] and the memory cell MC[p+1, q] through the wiring BL[q] is the current I[q]. When the drain current of the transistor Tr11 in the memory cell MC[p, q+1] is a current I[p, q+1] and the drain current of the transistor Tr11 in the memory cell MC[p+1, q+1] is a current I[p+1, q+1], the sum of currents supplied to the memory cell MC[p, q+1] and the memory cell MC[p+1, q+1] through the wiring BL[q+1] is a current I[q+1]. When the drain current of the transistor Tr11 in the memory cell MCR[p] is the current IREF[p] and the drain current of the transistor Tr11 in the memory cell MCR[p+1] is the current IREF[p+1], the sum of currents supplied to the memory cell MCR[p] and the memory cell MCR[p+1] through the wiring BLREF is the current IREF.

<Configuration Example of Circuit 230, Circuit 240, and Current Supply Circuit>

Then, a specific configuration example of the circuit 230, the circuit 240, and the current supply circuit 250 (CREF) will be described with reference to FIG. 16.

Figure 16:
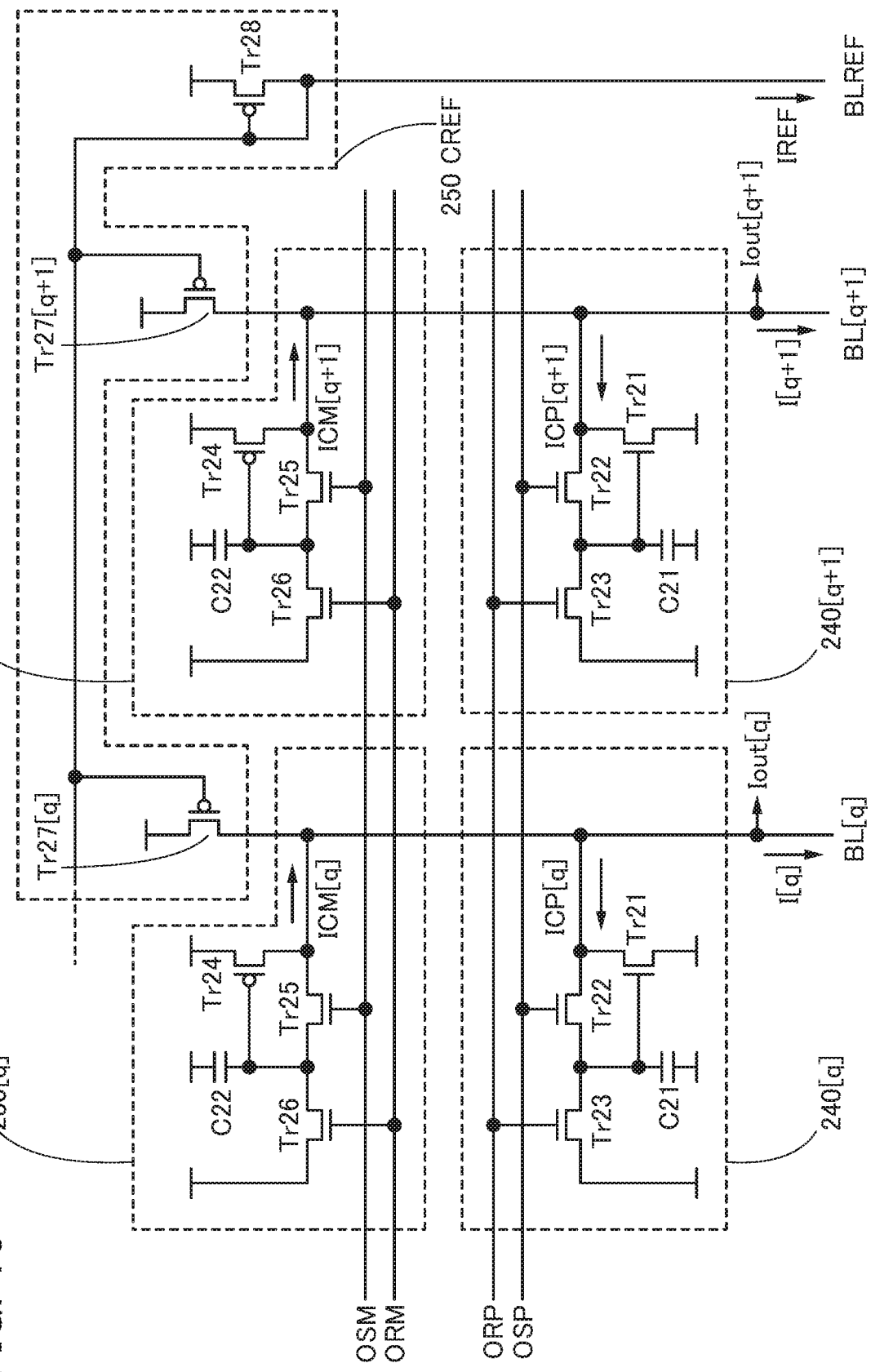
FIG. 16 illustrates a configuration example a circuit.

FIG. 16 illustrates a configuration example of the circuit 230, the circuit 240, and the current supply circuit 250 for the memory cell MC and the memory cell MCR illustrated in FIG. 15. Specifically, FIG. 16 illustrates a circuit 230[q] for the memory cells MC in the q-th column and a circuit 230[q+1] for the memory cells MC in the q+1-th column, as the circuit 230. FIG. 16 illustrates a circuit 240[q] for the memory cells MC in the q-th column and a circuit 240[*q*+1] for the memory cells MC in the q+1-th column, as the circuit 240.

The circuit 230[*q*] and the circuit 240[*q*] are connected to the wiring BL[q]. The circuit 230[*q*+1] and the circuit 240[*q*+1] are connected to the wiring BL[q+1].

The current supply circuit 250 is connected to the wiring BL[q], the wiring BL[q+1], and the wiring BLREF. The current supply circuit 250 has a function of supplying the current IREF to the wiring BLREF and a function of supplying current that is the same as the current IREF or current that corresponds to the current IREF to each of the wiring BL[q] and the wiring BL[q+1].

Specifically, the circuit 230[*q*] and the circuit 230[*q*+1] each include a transistor Tr24, a transistor Tr25, a transistor Tr26, and a capacitor C22. The transistor Tr24 in the circuit 230[*q*] has a function of generating the current ICM[q] that corresponds to the difference between the current I[q] and the current IREF, when the current I[q] is higher than the current IREF and offset current is set. Furthermore, the transistor Tr24 in the circuit 230[*q*+1] has a function of generating a current ICM[q+1] that corresponds to the difference between the current I[q+1] and the current IREF, when the current I[q+1] is higher than the current IREF. The current ICM[q] and the current ICM[q+1] are supplied from the circuit 230[*q*] and the circuit 230[*q*+1] to the wiring BL[q] and the wiring BL[q+1], respectively.

In each of the circuit 230[*q*] and the circuit 230[*q*+1], one of a source and a drain of the transistor Tr24 is connected to the corresponding wiring BL, and the other of the source and the drain is connected to a wiring through which a predetermined potential is supplied. One of a source and a drain of the transistor Tr25 is connected to the corresponding wiring BL, and the other of the source and the drain is connected to a gate of the transistor Tr24. One of a source and a drain of the transistor Tr26 is connected to the gate of the transistor Tr24, and the other of the source and the drain is connected to a wiring through which a predetermined potential is supplied. A first electrode of the capacitor C22 is connected to the gate of the transistor Tr24, and a second electrode of the capacitor C22 is connected to a wiring through which a predetermined potential is supplied.

A gate of the transistor Tr25 is connected to a wiring OSM, and a gate of the transistor Tr26 is connected to a wiring ORM.

Note that FIG. 16 illustrates an example where the transistor Tr24 is a p-channel transistor and the transistors Tr25 and Tr26 are n-channel transistors.

The circuit 240[*q*] and the circuit 240[*q*+1] each include a transistor Tr21, a transistor Tr22, a transistor Tr23, and a capacitor C21. The transistor Tr21 in the circuit 240[*q*] has a function of generating the current ICP[q] that corresponds to the difference between the current I[q] and the current IREF, when the current I[q] is lower than the current IREF and offset current is set. Furthermore, the transistor Tr21 in the circuit 240[*q*+1] has a function of generating a current ICP[q+1] that corresponds to the difference between the current I[q+1] and the current IREF, when the current I[q+1] is lower than the current IREF. The current ICP[q] and the current ICP[q+1] are drawn from the wiring BL[q] and the wiring BL[q+1] into the circuit 240[*q*] and the circuit 240[*q*+1], respectively.

Note that the current ICM[q] and the current ICP[q] each correspond to the current Ioffset[q], and the current ICM[q+1] and the current ICP[q+1] each correspond to a current Ioffset[q+1].

In each of the circuit 240[*q*] and the circuit 240[*q*+1], one of a source and a drain of the transistor Tr21 is connected to the corresponding wiring BL, and the other of the source and the drain is connected to a wiring through which a predetermined potential is supplied. One of a source and a drain of the transistor Tr22 is connected to the corresponding wiring BL, and the other of the source and the drain is connected to a gate of the transistor Tr21. One of a source and a drain of the transistor Tr23 is connected to the gate of the transistor Tr21, and the other of the source and the drain is connected to a wiring through which a predetermined potential is supplied. A first electrode of the capacitor C21 is connected to the gate of the transistor Tr21, and a second electrode of the capacitor C21 is connected to a wiring through which a predetermined potential is supplied.

A gate of the transistor Tr22 is connected to a wiring OSP, and a gate of the transistor Tr23 is connected to a wiring ORP.

Note that FIG. 16 illustrates an example where the transistors Tr21 to Tr23 are n-channel transistors.

The current supply circuit 250 includes a transistor Tr27 for the wiring BL and a transistor Tr28 for the wiring BLREF. Specifically, FIG. 16 illustrates an example where the current supply circuit 250 includes, as the transistor Tr27, a transistor Tr27[*q*] for the wiring BL[q] and a transistor Tr27[*q*+1] for the wiring BL[q+1].

A gate of the transistor Tr27 is connected to a gate of the transistor Tr28. One of a source and a drain of the transistor Tr27 is connected to the corresponding wiring BL, and the other of the source and the drain is connected to a wiring through which a predetermined potential is supplied. One of a source and a drain of the transistor Tr28 is connected to the wiring BLREF, and the other of the source and the drain is connected to a wiring through which a predetermined potential is supplied.

The transistors Tr27 and Tr28 have the same polarity. FIG. 16 illustrates an example where the transistors Tr27 and Tr28 are p-channel transistors.

The drain current of the transistor Tr28 corresponds to the current IREF. The transistor Tr27 and the transistor Tr28 collectively serve as a current mirror circuit; thus, the drain current of the transistor Tr27 is substantially the same as the drain current of the transistor Tr28 or corresponds to the drain current of the transistor Tr28.

<Operation Example of Semiconductor Device>

Next, a specific operation example of the semiconductor device 200 of one embodiment of the present invention will be described with reference to FIG. 15, FIG. 16, and FIG. 17.

Figure 17:
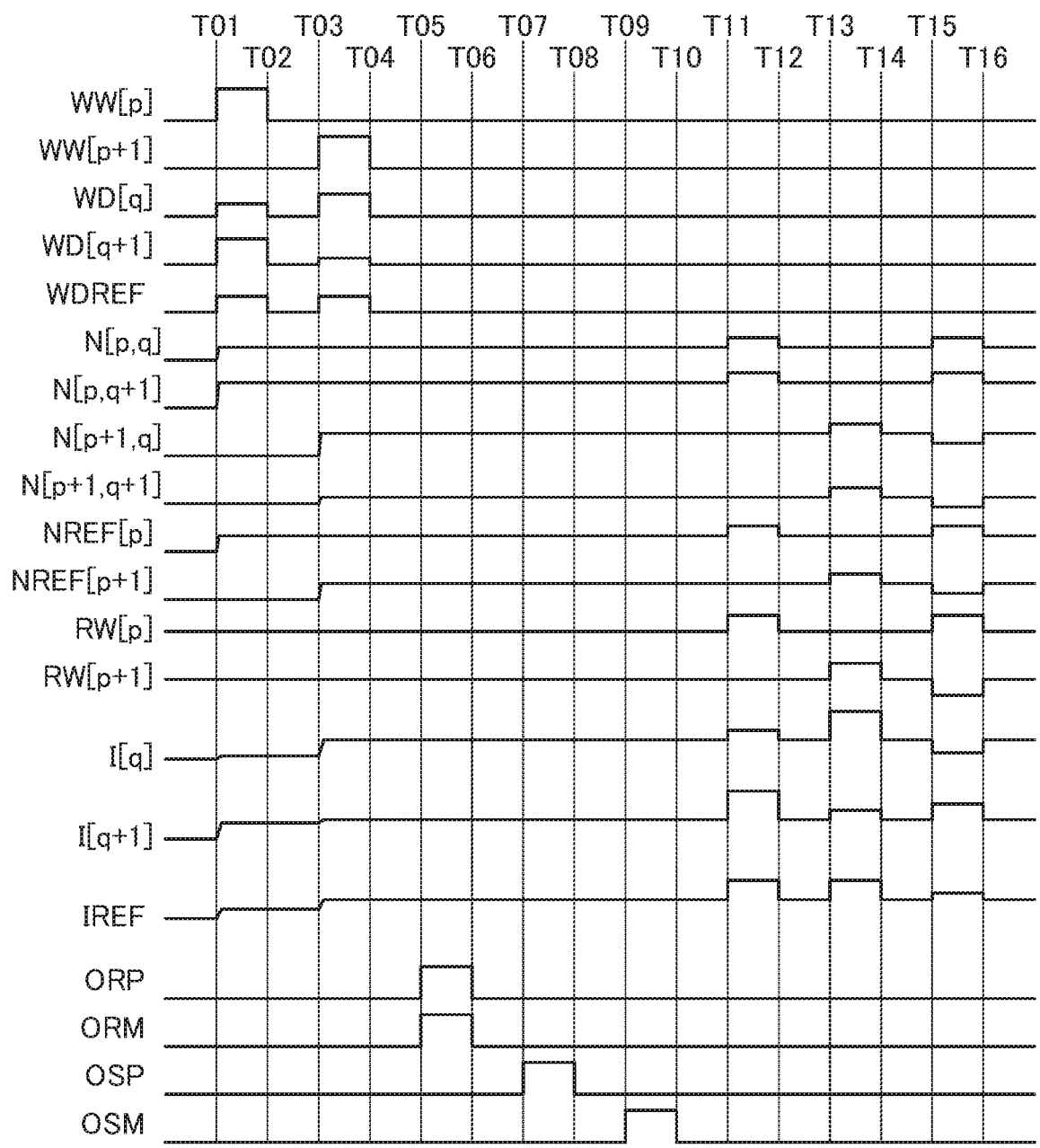
FIG. 17 is a timing diagram.

FIG. 17 is an example of a timing chart showing the operations of the memory cell MC and the memory cell MCR illustrated in FIG. 15 and the circuit 230, the circuit 240, and the current supply circuit 250 illustrated in FIG. 16. From Time T01 to Time T04 in FIG. 17, the first analog data is stored in the memory cell MC and the memory cell MCR. From Time T05 to Time T10, the value of the offset current Ioffset that is supplied from the circuit 230 and the circuit 240 is set. From Time T11 to Time T16, data corresponding to the product-sum of the first analog data and the second analog data is acquired.

Note that a low-level potential VSS is supplied to the wiring VR[q] and the wiring VR[q+1]. The high-level potential VDD is supplied to all wirings having a predetermined potential that are connected to the circuit 230. The low-level potential VSS is supplied to all wirings having a predetermined potential that are connected to the circuit 240. Furthermore, the high-level potential VDD is supplied to all wirings having a predetermined potential that are connected to the current supply circuit 250.

The transistors Tr11, Tr21, Tr24, Tr27[$q$], Tr27[$q$+1], and Tr28 each operate in a saturation region.

First, a high-level potential is applied to the wiring WW[p] and a low-level potential is applied to the wiring WW[p+1] from Time T01 to Time T02. Accordingly, the transistors Tr12 in the memory cell MC[p, q], the memory cell MC[p, q+1], and the memory cell MCR[p] illustrated in FIG. 15 are turned on. The transistors Tr12 in the memory cell MC[p+1, q], the memory cell MC[p+1, q+1], and the memory cell MCR[p+1] remain off.

In addition, from Time T01 to Time T02, a potential obtained by subtracting the first analog potential from the first reference potential VPR is applied to each of the wiring WD[q] and the wiring WD[q+1] illustrated in FIG. 15. Specifically, the potential VPR−Vx[p, q] is applied to the wiring WD[q], and a potential VPR−Vx[p, q+1] is applied to the wiring WD[q+1]. The first reference potential VPR is applied to the wiring WDREF, and a potential between the potential VSS and the potential VDD, e.g., a potential (VDD+VSS)/2, is applied as a base potential to the wiring RW[p] and the wiring RW[p+1].

Accordingly, the potential VPR−Vx[p, q] is applied to a node N[p, q] through the transistor Tr12 in the memory cell MC[p, q] illustrated in FIG. 15, the potential VPR−Vx[p, q+1] is applied to a node N[p, q+1] through the transistor Tr12 in the memory cell MC[p, q+1], and the first reference potential VPR is applied to a node NREF[p] through the transistor Tr12 in the memory cell MCR[p].

After Time T02, the potential applied to the wiring WW[p] illustrated in FIG. 15 changes from a high-level potential to a low-level potential, so that the transistors Tr12 in the memory cell MC[p, q], the memory cell MC[p, q+1], and the memory cell MCR[p] are turned off. Accordingly, the potential VPR−Vx[p, q] is held at the node N[p, q], the potential VPR−Vx[p, q+1] is held at the node N[p, q+1], and the first reference potential VPR is held at the node NREF [p].

Then, from Time T03 to Time T04, the potential of the wiring WW[p] illustrated in FIG. 15 remains at a low level and a high-level potential is applied to the wiring WW[p+1]. Accordingly, the transistors Tr12 in the memory cell MC[p+1, q], the memory cell MC[p+1, q+1], and the memory cell MCR[p+1] illustrated in FIG. 15 are turned on. The transistors Tr12 in the memory cell MC[p, q], the memory cell MC[p, q+1], and the memory cell MCR[p] remain off.

In addition, from Time T03 to Time T04, a potential obtained by subtracting the first analog potential from the first reference potential VPR is applied to each of the wiring WD[q] and the wiring WD[q+1] illustrated in FIG. 15. Specifically, the potential VPR−Vx[p+1, q] is applied to the wiring WD[q], and a potential VPR−Vx[p+1, q+1] is applied to the wiring WD[q+1]. The first reference potential VPR is applied to the wiring WDREF, and a potential between the potential VSS and the potential VDD, e.g., the potential (VDD+VSS)/2, is applied as a base potential to the wiring RW[p] and the wiring RW[p+1].

Accordingly, the potential VPR−Vx[p+1, q] is applied to a node N[p+1, q] through the transistor Tr12 in the memory cell MC[p+1, q] illustrated in FIG. 15, the potential VPR−Vx[p+1 q+1] is applied to a node N[p+1, q+1] through the transistor Tr12 in the memory cell MC[p+1, q+1], and the first reference potential VPR is applied to anode NREF[p+1] through the transistor Tr12 in the memory cell MCR[p+1].

After Time T04, the potential applied to the wiring WW[p+1] illustrated in FIG. 15 changes from a high-level potential to a low-level potential, so that the transistors Tr12 in the memory cell MC[p+1, q], the memory cell MC[p+1, q+1], and the memory cell MCR[p+1] are turned off. Accordingly, the potential VPR−Vx[p+1, q] is held at the node N[p+1, q], the potential VPR−Vx[p+1, q+1] is held at the node N[p+1, q+1], and the first reference potential VPR is held at the node NREF[p+1].

Next, a high-level potential is applied to the wiring ORP and the wiring ORM illustrated in FIG. 16 from Time T05 to Time T06. When a high-level potential is applied to the wiring ORM, the transistors Tr26 in the circuit 230[$q$] and the circuit 230[$q$+1] illustrated in FIG. 16 are turned on, so that the gates of the transistors Tr24 are reset by the potential VDD applied thereto. Furthermore, when a high-level potential is applied to the wiring ORP, the transistors Tr23 in the circuit 240[$q$] and the circuit 240[$q$+1] illustrated in FIG. 16 are turned on, so that the gates of the transistors Tr21 are reset by the potential VSS applied thereto.

After Time T06, the potential applied to the wiring ORP and the wiring ORM illustrated in FIG. 15 changes from a high-level potential to a low-level potential, so that the transistors Tr26 in the circuit 230[$q$] and the circuit 230[$q$+1] and the transistors Tr23 in the circuit 240[$q$] and the circuit 240[$q$+1] are turned off. Accordingly, the potential VDD is held at the gate of the transistor Tr24 in each of the circuit 230[$q$] and the circuit 230[$q$+1], and the potential VSS is held at the gate of the transistor Tr21 in each of the circuit 240[$q$] and the circuit 240[$q$+1].

From Time T07 to Time T08, a high-level potential is applied to the wiring OSP illustrated in FIG. 16. Furthermore, a potential between the potential VSS and the potential VDD, e.g., the potential (VDD+VSS)/2, is applied as a base potential to the wiring RW[p] and the wiring RW[p+1] illustrated in FIG. 15. Since a high-level potential is applied to the wiring OSP, the transistors Tr22 in the circuit 240[$q$] and the circuit 240[$q$+1] are turned on.

If the current I[q] flowing through the wiring BL[q] is lower than the current IREF flowing through the wiring BLREF, that is, if the current ΔI[q] has a positive value, it means that the sum of current that can be drawn by the transistor Tr28 in the memory cell MC[p, q] illustrated in FIG. 15 and current that can be drawn by the transistor Tr28 in the memory cell MC[p+1, q] is smaller than the value of the drain current of the transistor Tr27[$q$]. Thus, if the current ΔI[q] has a positive value, part of the drain current of the transistor Tr27[$q$] flows to the gate of the transistor Tr21 when the transistor Tr22 is turned on in the circuit 240[$q$], and the potential of the gate starts to rise. When the drain current of the transistor Tr21 becomes substantially equal to the current ΔI[q], the potential of the gate of the transistor Tr21 converges on a certain value. The potential of the gate of the transistor Tr21 at this time corresponds to a potential at which the drain current of the transistor Tr21 becomes the current ΔI[q], i.e., the current Ioffset[q] (=ICP [q]). This means that the transistor Tr21 in the circuit 240[$q$] is in a state of serving as a current source that can supply the current ICP[q].

Similarly, if the current I[q+1] flowing through the wiring BL[q+1] is lower than the current IREF flowing through the wiring BLREF, that is, if a current ΔI[q+1] has a positive value, part of the drain current of the transistor Tr27[$q$+1] flows to the gate of the transistor Tr21 when the transistor Tr22 is turned on in the circuit 240[$q$+1], and the potential of the gate starts to rise. When the drain current of the transistor Tr21 becomes substantially equal to the current ΔI[q+1], the potential of the gate of the transistor Tr21 converges on a certain value. The potential of the gate of the transistor Tr21 at this time corresponds to a potential at which the drain current of the transistor Tr21 becomes the current ΔI[q+1], i.e., the current Ioffset[q+1] (=ICP[q+1]). This means that the transistor Tr21 in the circuit 240[q+1] is in a state of serving as a current source that can supply the current ICP[q+1].

After Time T08, the potential applied to the wiring OSP illustrated in FIG. 16 changes from a high-level potential to a low-level potential, so that the transistors Tr22 in the circuit 240[q] and the circuit 240[q+1] are turned off. Accordingly, the potentials of the gates of the transistors Tr21 are held. Thus, the circuit 240[q] remains in a state of serving as the current source that can supply the current ICP[q], and the circuit 240[q+1] remains in a state of serving as the current source that can supply the current ICP[q+1].

From Time T09 to Time T10, a high-level potential is applied to the wiring OSM illustrated in FIG. 16. Furthermore, a potential between the potential VSS and the potential VDD, e.g., the potential (VDD+VSS)/2, is applied as a base potential to each of the wiring RW[p] and the wiring RW[p+1] illustrated in FIG. 15. Since a high-level potential is applied to the wiring OSM, the transistors Tr25 in the circuit 230[q] and the circuit 230[q+1] are turned on.

If the current I[q] flowing through the wiring BL[q] is higher than the current IREF flowing through the wiring BLREF, that is, if the current ΔI[q] has a negative value, it means that the sum of current that can be drawn by the transistor Tr28 in the memory cell MC[p, q] illustrated in FIG. 15 and current that can be drawn by the transistor Tr28 in the memory cell MC[p+1, q] is larger than the value of the drain current of the transistor Tr27[q]. Thus, if the current ΔI[q] has a negative value, current flows from the gate of the transistor Tr24 to the wiring BL[q] when the transistor Tr25 is turned on in the circuit 230[q], and the potential of the gate starts to decrease. When the drain current of the transistor Tr24 becomes substantially equal to the current ΔI[q], the potential of the gate of the transistor Tr24 converges on a certain value. The potential of the gate of the transistor Tr24 at this time corresponds to a potential at which the drain current of the transistor Tr24 becomes the current ΔI[q], i.e., the current Ioffset[q] (=ICM[q]). This means that the transistor Tr24 in the circuit 230[q] is in a state of serving as a current source that can supply the current ICM[q].

Similarly, if the current I[q+1] flowing through the wiring BL[q+1] is higher than the current IREF flowing through the wiring BLREF, that is, if the current ΔI[q+1] has a negative value, current flows from the gate of the transistor Tr24 in the circuit 230[q+1] to the wiring BL[q+1] when the transistor Tr25 is turned on, and the potential of the gate starts to decrease. When the drain current of the transistor Tr24 becomes substantially equal to the absolute value of the current ΔI[q+1], the potential of the gate of the transistor Tr24 converges on a certain value. The potential of the gate of the transistor Tr24 at this time corresponds to a potential at which the drain current of the transistor Tr24 becomes equal to the absolute value of the current ΔI[q+1], i.e., the current Ioffset[q+1] (=ICM[q+1]). This means that the transistor Tr24 in the circuit 230[q+1] is in a state of serving as a current source that can supply the current ICM[q+1].

After Time T08, the potential applied to the wiring OSM illustrated in FIG. 16 changes from a high-level potential to a low-level potential, so that the transistors Tr25 in the circuit 230[q] and the circuit 230[q+1] are turned off. Accordingly, the potentials of the gates of the transistors Tr24 are held. Thus, the circuit 230[q] remains in a state of serving as the current source that can supply the current ICM[q], and the circuit 230[q+1] remains in a state of serving as the current source that can supply the current ICM[q+1].

In each of the circuit 240[q] and the circuit 240[q+1], the transistor Tr21 has a function of drawing current. Thus, from Time T07 to Time T08, when the current I[q] flowing through the wiring BL[q] is higher than the current IREF flowing through the wiring BLREF and the current ΔI[q] has a negative value, or when the current I[q+1] flowing through the wiring BL[q+1] is higher than the current IREF flowing through the wiring BLREF and the current ΔI[q+1] has a negative value, it might be difficult to supply current from the circuit 240[q] or the circuit 240[q+1] to the wiring BL[q] or the wiring BL[q+1] without excess or deficiency. In that case, it might be difficult for the transistor Tr11 in the memory cell MC, the transistor Tr21 in the circuit 240[q] or the circuit 240[q+1], and the transistor Tr27[q] or Tr27[q+1] to concurrently operate in a saturation region because a balance between the current flowing through the wiring BLREF and the current flowing through the wiring BL[q] or the wiring BL[q+1] is struck.

To ensure the operations of the transistor Tr11, the transistor Tr21, and the transistor Tr27[q] or Tr27[q+1] in a saturation region from Time T07 to Time T08 even when the current ΔI[q] has a negative value, the potential of the gate of the transistor Tr24 may be set to a potential that is high enough to obtain a predetermined drain current, instead of resetting the potential of the gate of the transistor Tr24 to the potential VDD, from Time T05 to Time T06. In the above configuration, the amount of current that cannot be drawn by the transistor Tr11 can be drawn by the transistor Tr21 to some extent because current from the transistor Tr24, as well as the drain current of the transistor Tr27[q] or Tr27[q+1], is supplied; thus, the operations of the transistor Tr11, the transistor Tr21, and the transistor Tr27[q] or Tr27[q+1] in a saturation region are feasible.

Note that if the current I[q] flowing through the wiring BL[q] is lower than the current IREF flowing through the wiring BLREF, that is, if the current ΔI[q] has a positive value, from Time T09 to Time T10, since the circuit 240[q] has been set as the current source that can supply the current ICP[q] from Time T07 to Time T08, the potential of the gate of the transistor Tr24 in the circuit 230[q] keeps a value substantially the same as that of the potential VDD. Similarly, if the current I[q+1] flowing through the wiring BL[q+1] is lower than the current IREF flowing through the wiring BLREF, that is, if the current ΔI[q+1] has a positive value, since the circuit 240[q+1] has been set as the current source that can supply the current ICP[q+1] from Time T07 to Time T08, the potential of the gate of the transistor Tr24 in the circuit 230[q+1] keeps a value substantially the same as that of the potential VDD.

Then, from Time T11 to Time T12, the second analog potential Vw[p] is applied to the wiring RW[p] illustrated in FIG. 15. Furthermore, a potential between the potential VSS and the potential VDD, e.g., the potential (VDD+VSS)/2, is still applied as a base potential to the wiring RW[p+1]. In practice, the potential of the wiring RW[p] is a potential higher than the potential between the potential VSS and the potential VDD (e.g., the potential (VDD+VSS)/2), which is a base potential, by Vw[p]; for the simplicity of the following description, however, the potential of the wiring RW[p] is assumed to be the second analog potential Vw[p].

When the potential of the wiring RW[p] becomes the second analog potential Vw[p], with the assumption that the amount of change in the potential of the first electrode of the capacitor C11 is substantially the same as the amount of change in the potential of the node N, the potential of the node N in the memory cell MC[p, q] illustrated in FIG. 15 becomes VPR−Vx[p, q]+Vw[p] and the potential of the node N in the memory cell MC[p, q+1] becomes VPR−Vx[p, q+1]+Vw[p]. According to Formula 6, the product-sum of the first analog data and the second analog data for the memory cell MC[p, q] affects current obtained by subtracting the current Ioffset[q] from the current ΔI[q], that is, the current Iout[q] flowing from the wiring BL[q]. Furthermore, the product-sum of the first analog data and the second analog data for the memory cell MC[p, q+1] affects current obtained by subtracting the current Ioffset[q+1] from the current ΔI[q+1], that is, a current Iout[q+1] flowing from the wiring BL[q+1].

After Time T12, a potential between the potential VSS and the potential VDD (e.g., the potential (VDD+VSS)/2), which is a base potential, is applied again to the wiring RW[p].

Then, from Time T13 to Time T14, the second analog potential Vw[p+1] is applied to the wiring RW[p+1] illustrated in FIG. 15. Furthermore, a potential between the potential VSS and the potential VDD, e.g., the potential (VDD+VSS)/2, is still applied as a base potential to the wiring RW[p]. In practice, the potential of the wiring RW[p+1] is a potential higher than the potential between the potential VSS and the potential VDD (e.g., the potential (VDD+VSS)/2), which is a base potential, by Vw[p+1]; for the simplicity of the following description, however, the potential of the wiring RW[p+1] is assumed to be the second analog potential Vw[p+1].

When the potential of the wiring RW[p+1] becomes the second analog potential Vw[p+1], with the assumption that the amount of change in the potential of the first electrode of the capacitor C11 is substantially the same as the amount of change in the potential of the node N, the potential of the node N in the memory cell MC[p+1, q] illustrated in FIG. 15 becomes VPR−Vx[p+1, q]+Vw[p+1] and the potential of the node N in the memory cell MC[p+1, q+1] becomes VPR−Vx[p+1, q+1]+Vw[p+1]. According to Formula 6, the product-sum of the first analog data and the second analog data for the memory cell MC[p+1, q] affects current obtained by subtracting the current Ioffset[q] from the current ΔI[q], that is, the current Iout[q]. Furthermore, the product-sum of the first analog data and the second analog data for the memory cell MC[p+1, q+1] affects current obtained by subtracting the current Ioffset[q+1] from the current ΔI[q+1], that is, a current Iout[q+1].

After Time T12, a potential between the potential VSS and the potential VDD (e.g., the potential (VDD+VSS)/2), which is a base potential, is applied again to the wiring RW[p+1].

Then, from Time T15 to Time T16, the second analog potential Vw[p] is applied to the wiring RW[p] illustrated in FIG. 15 and the second analog potential Vw[p+1] is applied to the wiring RW[p+1]. In practice, the potential of the wiring RW[p] is a potential higher than the potential between the potential VSS and the potential VDD (e.g., the potential (VDD+VSS)/2), which is a base potential, by Vw[p], and the potential of the wiring RW[p+1] is a potential higher than the potential between the potential VSS and the potential VDD (e.g., the potential (VDD+VSS)/2), which is a base potential, by Vw[p+1]; for the simplicity of the following description, however, the potential of the wiring RW[p] is assumed to be the second analog potential Vw[p] and the potential of the wiring RW[p+1] is assumed to be the second analog potential Vw[p+1].

When the potential of the wiring RW[p] becomes the second analog potential Vw[p], with the assumption that the amount of change in the potential of the first electrode of the capacitor C11 is substantially the same as the amount of change in the potential of the node N, the potential of the node N in the memory cell MC[p, q] illustrated in FIG. 15 becomes VPR−Vx[p, q]+Vw[p] and the potential of the node N in the memory cell MC[p, q+1] becomes VPR−Vx[p, q+1]+Vw[p]. Furthermore, when the potential of the wiring RW[p+1] becomes the second analog potential Vw[p+1], with the assumption that the amount of change in the potential of the first electrode of the capacitor C11 is substantially the same as the amount of change in the potential of the node N, the potential of the node N in the memory cell MC[p+1, q] illustrated in FIG. 15 becomes VPR−Vx[p+1, q]+Vw[p+1] and the potential of the node N in the memory cell MC[p+1, q+1] becomes VPR−Vx[p+1, q+1]+Vw[p+1].

According to Formula 6, the product-sum of the first analog data and the second analog data for the memory cell MC[p, q] and the memory cell MC[p+1, q] affects current obtained by subtracting the current Ioffset[q] from the current ΔI[q], that is, the current Iout[q]. Furthermore, the product-sum of the first analog data and the second analog data for the memory cell MC[p, q+1] and the memory cell MC[p+1, q+1] affects current obtained by subtracting the current Ioffset[q+1] from the current ΔI[q+1], that is, a current Iout[q+1].

After Time T16, a potential between the potential VSS and the potential VDD (e.g., the potential (VDD+VSS)/2), which is a base potential, is applied again to the wiring RW[p] and the wiring RW[p+1].

With the above configuration, the product-sum operation can be performed with a small circuit scale. With the above configuration, the product-sum operation can be performed at high speed. With the above configuration, the product-sum operation can be performed with low power.

Note that a transistor with an extremely low off-state current is desirably used as the transistor Tr12. Tr22, Tr23, Tr25, or Tr26. When a transistor with an extremely low off-state current is used as the transistor Tr12, the potential of the node N can be held for a long time. When a transistor with an extremely low off-state current is used as the transistors Tr22 and Tr23, the potential of the gate of the transistor Tr21 can be held for a long time. When a transistor with an extremely low off-state current is used as the transistors Tr25 and Tr26, the potential of the gate of the transistor Tr24 can be held for a long time.

As a transistor with an extremely low off-state current, an OS transistor may be used. The leakage current of an OS transistor normalized by channel width can be lower than or equal to $10 \times 10^{-21}$ A/μm (10 zA/μm) with a source-drain voltage of 10 V at room temperature (approximately 25° C.).

With the use of the semiconductor device described above, the product-sum operation in the neural network NN can be performed.

This embodiment can be combined with any of the other embodiments as appropriate.

Embodiment 5

In this embodiment, a structure example of an OS transistor that can be used in the above embodiment will be described.

<Structure Example of Transistor>

FIG. 18A is a top view illustrating a structure example of a transistor. FIG. 18B is a cross-sectional view taken along line X1-X2 in FIG. 18A. FIG. 18C is a cross-sectional view taken along line Y1-Y2 in FIG. 18A. In some cases, the direction of line X1-X2 is referred to as a channel length direction, and the direction of line Y1-Y2 is referred to as a channel width direction. FIG. 18B illustrates a cross-sectional structure of the transistor in the channel length direction, and FIG. 18C illustrates a cross-sectional structure of the transistor in the channel width direction. Note that to clarify the device structure, FIG. 18A does not illustrate some components.

The semiconductor device of one embodiment of the present invention includes insulating layers 812 to 820, metal oxide films 821 to 824, and conductive layers 850 to 853. A transistor 801 is formed over an insulating surface. FIGS. 18A to 18C illustrate the case where the transistor 801 is formed over an insulating layer 811. The transistor 801 is covered with the insulating layers 818 and 819.

Note that the insulating layers, the metal oxide films, the conductive layers, and the like that constitute the transistor 801 may each be a single film, or a stack including a plurality of films. They can be formed by any of a variety of deposition methods such as a sputtering method, a molecular beam epitaxy (MBE) method, a pulsed laser ablation (PLA) method, a CVD method, an atomic layer deposition (ALD) method, and the like. Note that examples of CVD methods include a plasma-enhanced CVD method, a thermal CVD method, and a metal organic CVD method.

The conductive layer 850 includes a region that serves as a gate electrode of the transistor 801. A conductive layer 851 and a conductive layer 852 include regions that serve as a source electrode and a drain electrode. The conductive layer 853 includes a region that serves as a back gate electrode. The insulating layer 817 includes a region that serves as a gate insulating layer on the gate electrode (front gate electrode) side, and an insulating layer that is a stack of the insulating layers 814 to 816 includes a region that serves as a gate insulating layer on the back gate electrode side. The insulating layer 818 serves as an interlayer insulating layer. The insulating layer 819 serves as a barrier layer.

The metal oxide films 821 to 824 are collectively referred to as an oxide layer 830. As illustrated in FIGS. 18B and 18C, the oxide layer 830 includes a region where the metal oxide film 821, the metal oxide film 822, and the metal oxide film 824 are stacked in this order. In addition, a pair of the metal oxide films 823 are positioned over the conductive layer 851 and the conductive layer 852. When the transistor 801 is on, a channel formation region is mainly formed in the metal oxide film 822 of the oxide layer 830.

The metal oxide film 824 covers the metal oxide films 821 to 823, the conductive layer 851, and the conductive layer 852. The insulating layer 817 is positioned between the metal oxide film 823 and the conductive layer 850. The conductive layers 851 and 852 each include a region that overlaps with the conductive layer 850 with the metal oxide film 823, the metal oxide film 824, and the insulating layer 817 positioned therebetween.

The conductive layers 851 and 852 are formed from a hard mask that is used in the formation of the metal oxide films 821 and 822. Thus, the conductive layers 851 and 852 do not include a region that is in contact with the side surfaces of the metal oxide films 821 and 822. For example, the metal oxide films 821 and 822 and the conductive layers 851 and 852 can be formed through the following steps. First, a conductive film is formed over a metal oxide film including a stack of two layers. The conductive film is processed (etched) into a desired shape so that a hard mask is formed. The hard mask is used to process the shape of the two-layered metal oxide film, forming the metal oxide films 821 and 822 that are stacked. Next, the hard mask is processed into a desired shape, forming the conductive layers 851 and 852.

Examples of insulating materials used for the insulating layers 811 to 818 include aluminum nitride, aluminum oxide, aluminum nitride oxide, aluminum oxynitride, magnesium oxide, silicon nitride, silicon oxide, silicon nitride oxide, silicon oxynitride, gallium oxide, germanium oxide, yttrium oxide, zirconium oxide, lanthanum oxide, neodymium oxide, hafnium oxide, tantalum oxide, and aluminum silicate. The insulating layers 811 to 818 are formed using a single-layer structure or a stacked-layer structure containing any of these insulating materials. The layers used for the insulating layers 811 to 818 may include a plurality of insulating materials.

In this specification and the like, oxynitride refers to a compound in which the oxygen content is higher than the nitrogen content, and nitride oxide refers to a compound in which the nitrogen content is higher than the oxygen content.

In order to suppress an increase in oxygen vacancies in the oxide layer 830, the insulating layers 816 to 818 preferably contain oxygen. More preferably, the insulating layers 816 to 818 are formed using an insulating film from which oxygen is released by heating (hereinafter such an insulating film is also referred to as an insulating film containing excess oxygen). When oxygen is supplied from the insulating film containing excess oxygen to the oxide layer 830, the oxygen vacancies in the oxide layer 830 can be compensated for. Thus, the reliability and electrical characteristics of the transistor 801 can be improved.

The insulating film containing excess oxygen is a film from which oxygen molecules at more than or equal to $1.0 \times 10^{18}$ molecules/cm$^3$ are released in thermal desorption spectroscopy (TDS) at a surface temperature of the film of higher than or equal to 100° C. and lower than or equal to 700° C., or higher than or equal to 100° C. and lower than or equal to 500° C. The amount of released oxygen molecules is preferably more than or equal to $3.0 \times 10^{20}$ atoms/cm$^3$.

The insulating film containing excess oxygen can be formed by performing treatment for adding oxygen to an insulating film. The treatment for adding oxygen can be performed by heat treatment under an oxygen atmosphere, plasma treatment, or treatment using an ion implantation method, an ion doping method, or a plasma immersion ion implantation method, or the like. As a gas for adding oxygen, an oxygen gas of $^{16}O_2$, $^{18}O_2$, or the like, a nitrous oxide gas, an ozone gas, or the like can be used.

The concentration of hydrogen in the insulating layers 812 to 819 is preferably low in order to prevent an increase in the concentration of hydrogen in the oxide layer 830. In particular, the concentration of hydrogen in the insulating layers 813 to 818 is preferably low. Specifically, the concentration of hydrogen is lower than or equal to $2 \times 10^{20}$ atoms/cm$^3$, preferably lower than or equal to $5 \times 10^{19}$ atoms/cm$^3$, further preferably lower than or equal to $1 \times 10^{19}$ atoms/cm$^3$, still further preferably lower than or equal to $5 \times 10^{18}$ atoms/cm$^3$.

The hydrogen concentration is measured by secondary ion mass spectrometry (SIMS).

In the transistor 801, the oxide layer 830 is preferably surrounded by an insulating layer with oxygen and hydrogen barrier properties (hereinafter such an insulating layer is also referred to as a barrier layer). The use of such a structure prevents release of oxygen from the oxide layer 830 and entry of hydrogen into the oxide layer 830. Thus, the reliability and electrical characteristics of the transistor 801 can be improved.

For example, the insulating layer 819 serves as a barrier layer and at least one of the insulating layers 811, 812, and 814 serves as a barrier layer. The barrier layer can be formed using a material such as aluminum oxide, aluminum oxynitride, gallium oxide, gallium oxynitride, yttrium oxide, yttrium oxynitride, hafnium oxide, hafnium oxynitride, or silicon nitride.

A structure example of the insulating layers 811 to 818 is described. In this example, each of the insulating layers 811, 812, 815, and 819 serves as a barrier layer. The insulating layers 816 to 818 are oxide layers containing excess oxygen. The insulating layer 811 is formed using silicon nitride. The insulating layer 812 is formed using aluminum oxide. The insulating layer 813 is formed using silicon oxynitride. The insulating layers 814 to 816 serving as the gate insulating layers on the back gate electrode side are formed using a stack including silicon oxide, aluminum oxide, and silicon oxide. The insulating layer 817 serving as the gate insulating layer on the front gate side is formed using silicon oxynitride. The insulating layer 818 serving as the interlayer insulating layer is formed using silicon oxide. The insulating layer 819 is formed using aluminum oxide.

Examples of a conductive material used for the conductive layers 850 to 853 include a metal such as molybdenum, titanium, tantalum, tungsten, aluminum, copper, chromium, neodymium, or scandium; and a metal nitride containing any of the above metals as its component (e.g., tantalum nitride, titanium nitride, molybdenum nitride, or tungsten nitride). A conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added can be used.

A structure example of the conductive layers 850 to 853 is described. The conductive layer 850 is a single layer of tantalum nitride or tungsten. Alternatively, the conductive layer 850 is a stack including tantalum nitride, tantalum, and tantalum nitride. The conductive layer 851 is a single layer of tantalum nitride or a stack including tantalum nitride and tungsten. The structure of the conductive layer 852 is the same as that of the conductive layer 851. The conductive layer 853 is a single layer of tantalum nitride or a stack including tantalum nitride and tungsten.

In order to reduce the off-state current of the transistor 801, for example, the energy gap of the metal oxide film 822 is preferably large. The energy gap of the metal oxide film 822 is greater than or equal to 2.5 eV and less than or equal to 4.2 eV, preferably greater than or equal to 2.8 eV and less than or equal to 3.8 eV, further preferably greater than or equal to 3 eV and less than or equal to 3.5 eV.

The oxide layer 830 preferably exhibits crystallinity. At least the metal oxide film 822 preferably exhibits crystallinity. With the structure described above, the transistor 801 can have high reliability and favorable electrical characteristics.

As the oxide that can be used for the metal oxide film 822, for example, an In—Ga oxide, an In—Zn oxide, or an In-M-Zn oxide (M is Al, Ga, Y, or Sn) can be used. The metal oxide film 822 is not limited to the oxide layer containing indium. The metal oxide film 822 can be formed using a Zn—Sn oxide, a Ga—Sn oxide, or a Zn—Mg oxide, for example. The metal oxide films 821, 823, and 824 can be formed using an oxide that is similar to the oxide of the metal oxide film 822. In particular, each of the metal oxide films 821, 823 and 824 can be formed using a Ga oxide.

When an interface state is formed at the interface between the metal oxide film 822 and the metal oxide film 821, a channel formation region is formed also in the vicinity of the interface, which causes a change in the threshold voltage of the transistor 801. It is preferable that the metal oxide film 821 contain at least one of the metal elements contained in the metal oxide film 822 as its component. Accordingly, an interface state is unlikely to be formed at the interface between the metal oxide film 822 and the metal oxide film 821, and variations in the electrical characteristics of the transistor 801, such as the threshold voltage, can be reduced.

The metal oxide film 824 preferably contains at least one of the metal elements contained in the metal oxide film 822 as its component because interface scattering is unlikely to occur at the interface between the metal oxide film 822 and the metal oxide film 824, and carrier transfer is not inhibited. Thus, the field-effect mobility of the transistor 801 can be increased.

It is preferable that the metal oxide film 822 have the highest carrier mobility among the metal oxide films 821 to 824. Accordingly, a channel can be formed in the metal oxide film 822 that is apart from the insulating layers 816 and 817.

For example, in a metal oxide containing In such as an In-M-Zn oxide, carrier mobility can be increased by an increase in the In content. In the In-M-Zn oxide, the s orbital of heavy metal mainly contributes to carrier transfer, and when the indium content is increased, overlaps of the s orbitals of In atoms are increased; therefore, an oxide having a high content of indium has higher mobility than an oxide having a low content of indium. Therefore, an oxide having a high content of indium is used as the metal oxide film, so that carrier mobility can be increased.

Thus, for example, the metal oxide film 822 is formed using an In—Ga—Zn oxide, and the metal oxide films 821 and 823 are formed using a Ga oxide. For example, when the metal oxide films 821 to 823 are formed using an In-M-Zn oxide, the In content of the metal oxide film 822 is made higher than the In content of the metal oxide films 821 and 823. In the case where the In-M-Zn oxide is formed by a sputtering method, the In content can be changed by a change in the atomic ratio of metal elements of a target.

For example, it is preferable that the atomic ratio of metal elements of a target used for depositing the metal oxide film 822 be In:M:Zn=1:1:1, 3:1:2, or 4:2:4.1. For example, it is preferable that the atomic ratio of metal elements of a target used for depositing the metal oxide films 821 and 823 be In:M:Zn=1:3:2, or 1:3:4. The atomic ratio of an In-M-Zn oxide deposited using a target of In:M:Zn=4:2:4.1 is approximately In:M:Zn=4:2:3.

In order that the transistor 801 can have stable electrical characteristics, it is preferable to reduce the concentration of impurities in the oxide layer 830. In the metal oxide, hydrogen, nitrogen, carbon, silicon, and a metal element other than a main component are impurities. For example, hydrogen and nitrogen form donor states to increase the carrier density. In addition, silicon and carbon form impurity states in the metal oxide. The impurity states serve as traps and might cause the electrical characteristics of the transistor to deteriorate.

For example, the oxide layer 830 includes a region where the concentration of silicon is lower than or equal to $2\times10^{18}$ atoms/cm$^3$, preferably lower than or equal to $2\times10^{17}$ atoms/cm$^3$. The same applies to the concentration of carbon in the oxide layer 830.

The oxide layer 830 includes a region where the concentration of an alkali metal is lower than or equal to $1\times10^{18}$ atoms/cm$^3$, preferably lower than or equal to $2\times10^{16}$ atoms/cm$^3$. The same applies to the concentration of an alkaline earth metal in the oxide layer 830.

The oxide layer 830 includes a region where the concentration of hydrogen is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

The above concentrations of the impurities in the oxide layer 830 are measured by SIMS.

In the case where the metal oxide film 822 contains oxygen vacancies, donor states are formed by entry of hydrogen into sites of oxygen vacancies in some cases. The oxygen vacancy is a factor in decreasing the on-state current of the transistor 801. Note that sites of oxygen vacancies become more stable by entry of oxygen than by entry of hydrogen. Thus, by reducing oxygen vacancies in the metal oxide film 822, the on-state current of the transistor 801 can be increased in some cases. Consequently, preventing entry of hydrogen into sites of oxygen vacancies by a reduction in hydrogen in the metal oxide film 822 is effective in improving on-state current characteristics.

Hydrogen contained in a metal oxide reacts with oxygen bonded to a metal atom to be water, and thus causes an oxygen vacancy, in some cases. Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, the transistor 801 is likely to be normally-on when the metal oxide film 822 contains hydrogen because the metal oxide film 822 includes a channel formation region. Accordingly, it is preferable that hydrogen in the metal oxide film 822 be reduced as much as possible.

Note that the metal oxide film 822 may have an n-type region 822n in a region in contact with the conductive layer 851 or the conductive layer 852. The region 822n is formed by a phenomenon in which oxygen in the metal oxide film 822 is extracted by the conductive layer 851 or 852, a phenomenon in which a conductive material in the conductive layer 851 or 852 is combined with an element in the metal oxide film 822, or the like. When the region 822n is formed, the contact resistance between the conductive layer 851 or 852 and the metal oxide film 822 can be reduced.

FIGS. 18A to 18C illustrate an example in which the oxide layer 830 has a four-layer structure; however, one embodiment of the present invention is not limited thereto. For example, the oxide layer 830 can have a three-layer structure without the metal oxide film 821 or without the metal oxide film 823. Alternatively, the oxide layer 830 may include one or more metal oxide films that are similar to the metal oxide films 821 to 824 at two or more of the following positions: between given layers in the oxide layer 830, over the oxide layer 830, and below the oxide layer 830.

Figure 19:
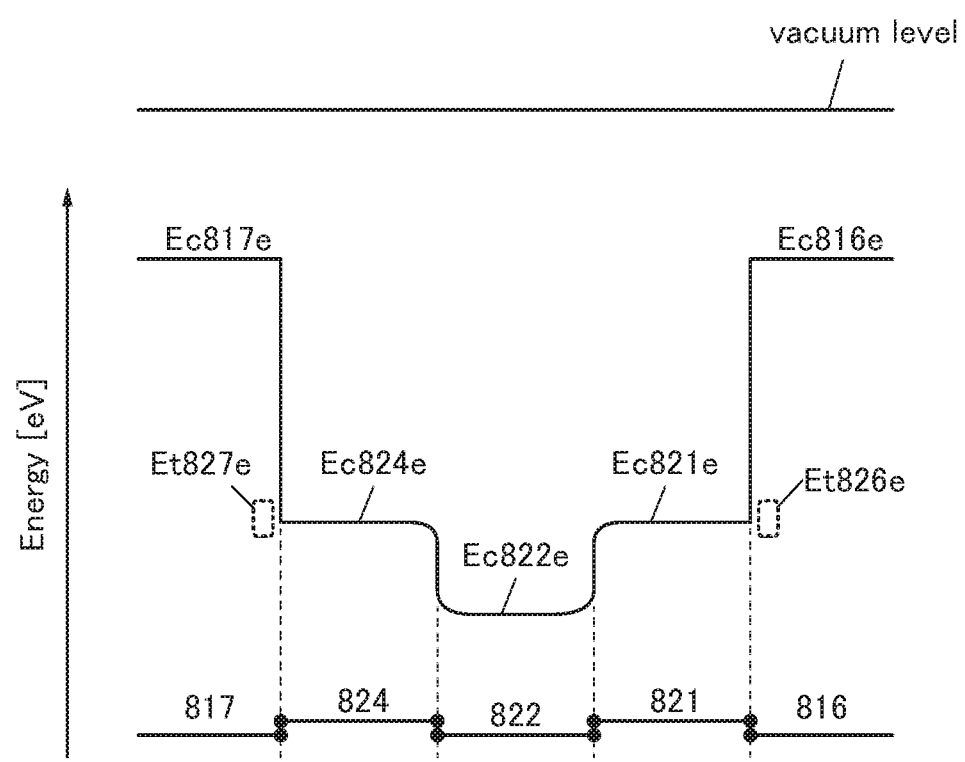
FIG. 19 is an energy band diagram.

Effects of the stack including the metal oxide films 821, 822, and 824 are described with reference to FIG. 19. FIG. 19 is a schematic diagram showing the energy band structure of a channel formation region of the transistor 801.

In FIG. 19, Ec816e, Ec821e, Ec822e, Ec824e, and Ec817e indicate the energy of the conduction band minimums of the insulating layer 816, the metal oxide film 821, the metal oxide film 822, the metal oxide film 824, and the insulating layer 817, respectively.

Here, the energy difference between the vacuum level and the conduction band minimum (the difference is also referred to as electron affinity) corresponds to a value obtained by subtracting an energy gap from the energy difference between the vacuum level and the valence band maximum (the difference is also referred to as an ionization potential). The energy gap can be measured using a spectroscopic ellipsometer (UT-300 manufactured by HORIBA JOBIN YVON S.A.S.). The energy difference between the vacuum level and the valence band maximum can be measured using an ultraviolet photoelectron spectroscopy (UPS) device (VersaProbe manufactured by ULVAC-PHI, Inc.).

Since the insulating layers 816 and 817 are insulators, Ec816e and Ec817e are closer to the vacuum level than Ec821e, Ec822e, and Ec824e (i.e., the insulating layers 816 and 817 have lower electron affinities than the metal oxide films 821, 822, and 824).

The metal oxide film 822 has a higher electron affinity than the metal oxide films 821 and 824. For example, the difference in electron affinity between the metal oxide films 822 and 821 and the difference in electron affinity between the metal oxide films 822 and 824 are each greater than or equal to 0.07 eV and less than or equal to 1.3 eV, preferably greater than or equal to 0.1 eV and less than or equal to 0.7 eV, further preferably greater than or equal to 0.15 eV and less than or equal to 0.4 eV. Note that the electron affinity refers to an energy difference between the vacuum level and the conduction band minimum.

When voltage is applied to the gate electrode (the conductive layer 850) of the transistor 801, a channel is mainly formed in the metal oxide film 822 having the highest electron affinity among the metal oxide films 821, 822, and 824.

An indium gallium oxide has a small electron affinity and a high oxygen-blocking property. Therefore, the metal oxide film 824 preferably includes an indium gallium oxide. The gallium atomic ratio [Ga/(In+Ga)] is, for example, higher than or equal to 70%, preferably higher than or equal to 80%, further preferably higher than or equal to 90%.

In some cases, there is a mixed region of the metal oxide films 821 and 822 between the metal oxide films 821 and 822. Furthermore, in some cases, there is a mixed region of the metal oxide films 824 and 822 between the metal oxide films 824 and 822. Because the mixed region has a low interface state density, a region with a stack including the metal oxide films 821, 822, and 824 has a band structure where energy at each interface and in the vicinity of the interface is changed continuously (continuous junction).

Electrons transfer mainly through the metal oxide film 822 in the oxide layer 830 having such an energy band structure. Therefore, even when an interface state exists at the interface between the metal oxide film 821 and the insulating layer 816 or the interface between the metal oxide film 824 and the insulating layer 817, electron transfer in the oxide layer 830 is less likely to be inhibited and the on-state current of the transistor 801 can be increased.

Although trap states Et826e and Et827e due to impurities or defects might be formed in the vicinity of the interface between the metal oxide film 821 and the insulating layer 816 and the vicinity of the interface between the metal oxide film 824 and the insulating layer 817 as illustrated in FIG. 19, the metal oxide film 822 and the trap states Et826e and Et827e can be separated from each other owing to the existence of the metal oxide films 821 and 824.

Note that when a difference between Ec821e and Ec822e is small, an electron in the metal oxide film 822 might reach the trap state Et826e by passing over the difference in energy. Since the electron is trapped at the trap state Et826e, negative fixed charge is generated at the interface with the insulating film, causing the threshold voltage of the transistor to be shifted in a positive direction. The same applies to the case where a difference in energy between Ec822e and Ec824e is small.

Each of the difference in energy between Ec821e and Ec822e and the difference in energy between Ec824e and Ec822e is preferably greater than or equal to 0.1 eV, further preferably greater than or equal to 0.15 eV so that a change in the threshold voltage of the transistor 801 can be reduced and the transistor 801 can have favorable electrical characteristics.

Note that the transistor 801 does not necessarily include a back gate electrode.

<Example of Stacked-Layer Structure>

Next, a structure of a semiconductor device in which an OS transistor and another transistor are stacked will be described.

Figure 20:
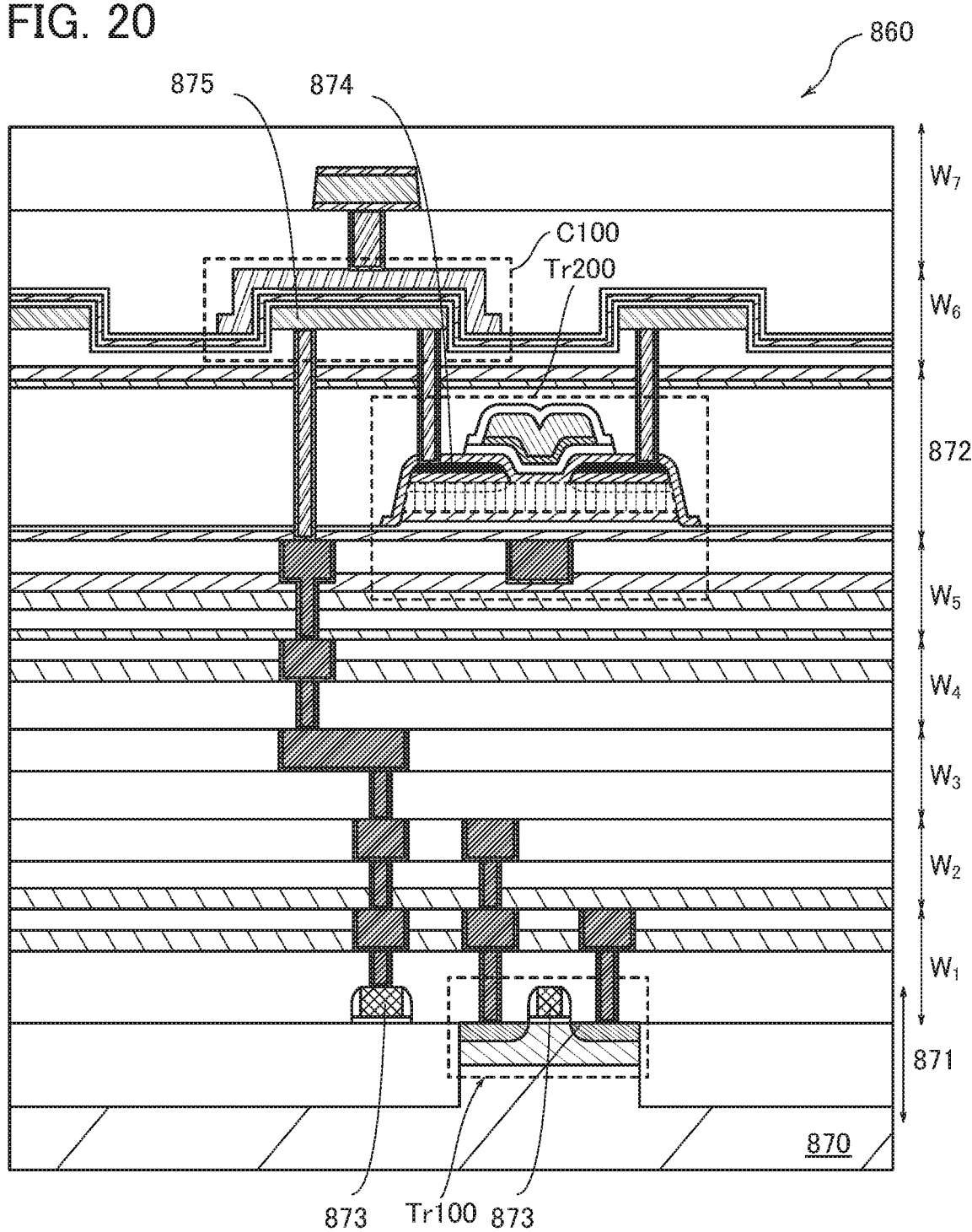
FIG. 20 illustrates a structure example of a semiconductor device.

FIG. 20 illustrates an example of a stacked-layer structure of a semiconductor device 860 in which a transistor Tr100 that is a Si Transistor, a transistor Tr200 that is an OS transistor, and a capacitor C100 are stacked.

The semiconductor device 860 includes a stack including a CMOS layer 871, wiring layers $W_1$ to $W_5$, a transistor layer 872, and wiring layers $W_6$ and $W_7$.

The transistor Tr100 is provided in the CMOS layer 871. A channel formation region of the transistor Tr100 is provided in a single crystal silicon wafer 870. A gate electrode 873 of the transistor Tr100 is connected to one electrode 875 of the capacitor C100 through the wiring layers $W_1$ to $W_5$.

The transistor Tr200 is provided in the transistor layer 872. In FIG. 20, the transistor Tr200 has a structure similar to that of the transistor 801 (FIGS. 18A to 18C). An electrode 874 corresponding to one of a source and a drain of the transistor Tr200 is connected to the one electrode 875 of the capacitor C100. Note that in FIG. 20, the transistor Tr200 includes its back gate electrode in the wiring layer $W_5$. The capacitor C100 is formed in the wiring layer $W_6$.

The OS transistor and other components are stacked in this manner, whereby the area of the circuit can be reduced.

The above-described structure can be used for the semiconductor device 200 described in Embodiment 3 or the like. For example, the transistor Tr100, the transistor Tr200, and the capacitor C100 can be used as the transistor Tr11, the transistor Tr12, and the capacitor C11 in FIGS. 15A and 15B, respectively. It is also possible to use the transistor Tr100, the transistor Tr200, and the capacitor C100 as the transistor Tr21 or Tr24, the transistor Tr22, Tr23, Tr25, or Tr26, and the capacitor C21 or C22 in FIG. 16, respectively.

This embodiment can be combined with any of the other embodiments as appropriate.

Embodiment 6

Described in this embodiment is a metal oxide that can be used in an OS transistor described in the above embodiment. In particular, the details of a metal oxide and a cloud-aligned composite oxide semiconductor (CAC-OS) will be described below.

A CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in a channel formation region of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or CAC metal oxide, separation of the functions can maximize each function.

The CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are observed to be coupled in a cloud-like manner with their boundaries blurred, in some cases.

Furthermore, in the CAC-OS or the CAC metal oxide, the conductive regions and the insulating regions each have a size of more than or equal to 0.5 nm and less than or equal to 10 nm, preferably more than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. With such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or the CAC metal oxide is used in a channel formation region of a transistor, high current drive capability in the on state of the transistor, that is, a high on-state current and high field-effect mobility, can be obtained.

In other words, a CAC-OS or a CAC metal oxide can be called a matrix composite or a metal matrix composite.

The CAC-OS has, for example, a composition in which elements included in a metal oxide are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of a metal oxide, a state in which one or more metal elements are unevenly distributed and regions including the metal element(s) are mixed is referred to as a mosaic pattern or a patch-like pattern. The regions each have a size of greater than or equal to 0.5 nm and less than or equal to 10 nm, preferably greater than or equal to 1 nm and less than or equal to 2 nm, or a similar size.

Note that a metal oxide preferably contains at least indium. In particular, indium and zinc are preferably contained. In addition, one or more selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0), gallium zinc oxide ($Ga_{X4}Zn_{Y4}O_{Z4}$, where X4, Y4, and Z4 are real numbers greater than 0), or the like, and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite metal oxide with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ (−1≤x0≤1; m0 is a given number).

The above crystalline compounds have a single crystal structure, a polycrystalline structure, or a c-axis-aligned crystal (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of a metal oxide. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where a substrate is not heated intentionally, for example. In the case where the CAC-OS is formed by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility (μ) can be achieved.

A semiconductor element including a CAC-OS has high reliability. Thus, the CAC-OS is suitably used in a variety of semiconductor devices.

This embodiment can be combined with any of the other embodiments as appropriate.

Embodiment 7

In this embodiment, structure examples of an electronic device that can be used for the power receiving portion described in the above embodiments are described.

FIGS. 21A to 21F illustrate electronic devices. These electronic devices can include a housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 21A:
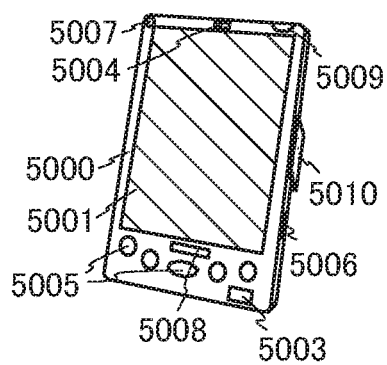
FIGS. 21A, 21B, 21C. 21D. 21E, and 21F illustrate structure examples of electronic devices.
Figure 21B:
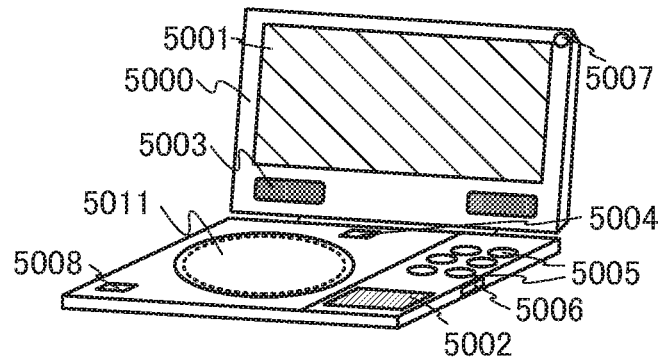
Figure 21C:
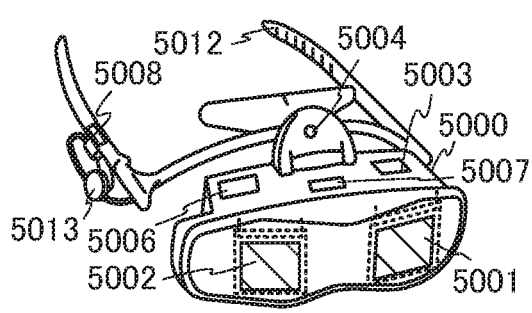
Figure 21D:
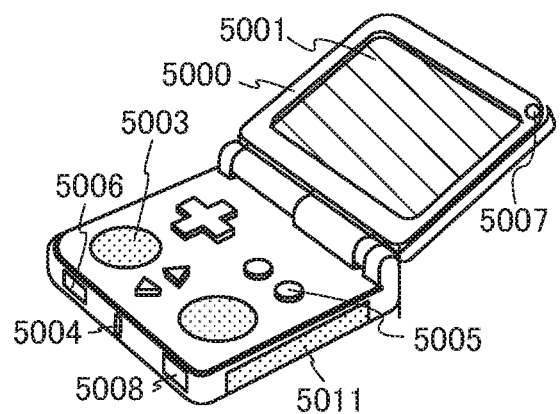
Figure 21E:
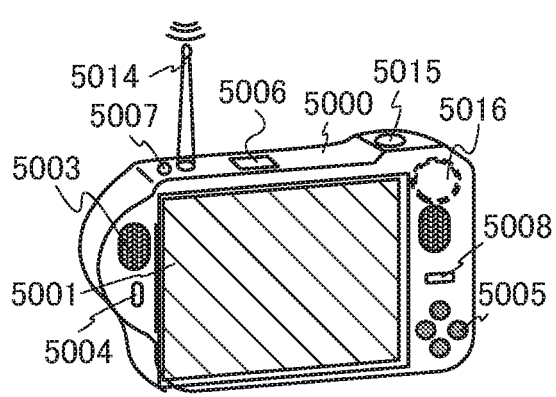
Figure 21F:
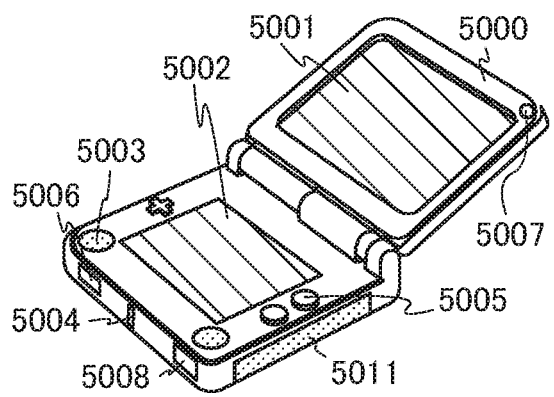

FIG. 21A illustrates a mobile computer that can include a switch 5009, an infrared port 5010, and the like in addition to the above components. FIG. 21B illustrates a portable image reproducing device (e.g., a DVD reproducing device) provided with a memory medium, and the image reproducing device can include a second display portion 5002, a memory medium reading portion 5011, and the like in addition to the above components. FIG. 21C illustrates a goggle-type display that can include a second display portion 5002, a support portion 5012, an earphone 5013, and the like in addition to the above components. FIG. 21D illustrates a portable game machine that can include a memory medium reading portion 5011 and the like in addition to the above components. FIG. 21E illustrates a digital camera having a television receiving function, and the digital camera can include an antenna 5014, a shutter button 5015, an image receiving portion 5016, and the like in addition to the above objects. FIG. 21F illustrates a portable game machine that can include a second display portion 5002, a memory medium reading portion 5011, and the like in addition to the above components.

The electronic devices illustrated in FIGS. 21A to 21F can have a variety of functions. For example, a function of displaying a variety of data (a still image, a moving image, a text image, and the like) on a display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on a display portion, and the like can be given. Furthermore, an electronic device including a plurality of display portions can have a function of displaying image data mainly on one display portion while displaying text data on another display portion, a function of displaying a three-dimensional image by displaying images on a plurality of display portions with a parallax taken into account, or the like. Furthermore, the electronic device including an image receiving portion can have a function of taking a still image, a function of taking a moving image, a function of automatically or manually correcting a taken image, a function of storing a taken image in a recording medium (an external recording medium or a recording medium incorporated in the camera), a function of displaying a taken image on the display portion, or the like. Note that functions which can be provided for the electronic devices illustrated in FIGS. 21A to 21F are not limited to those described above, and the electronic devices can have a variety of functions.

The electronic device described in this embodiment includes a battery and can perform wireless power feeding as described in the above embodiment.

Figure 22A:
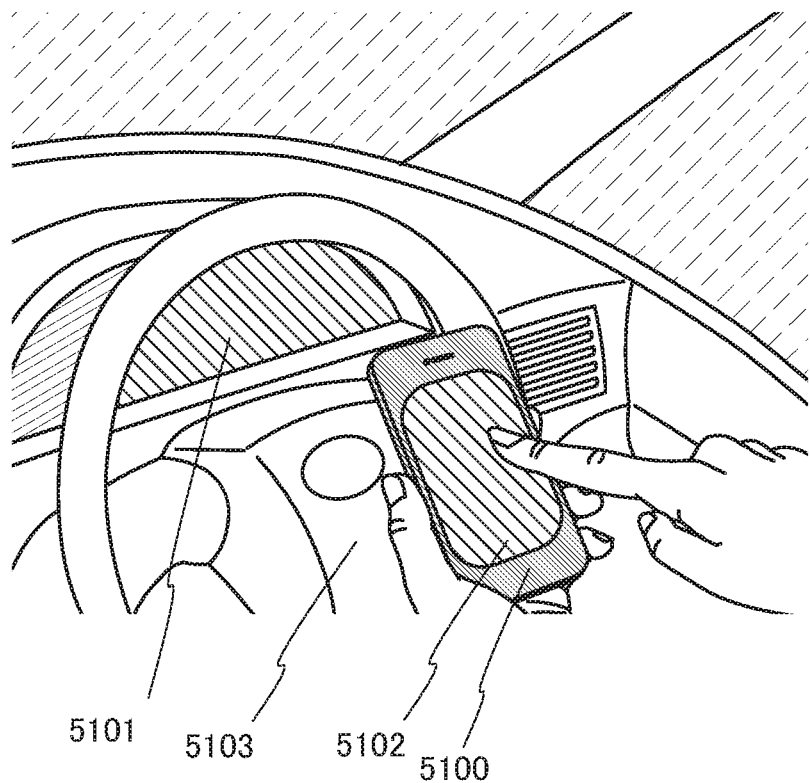
FIGS. 22A and 22B illustrate structure examples of electronic devices.
Figure 22B:
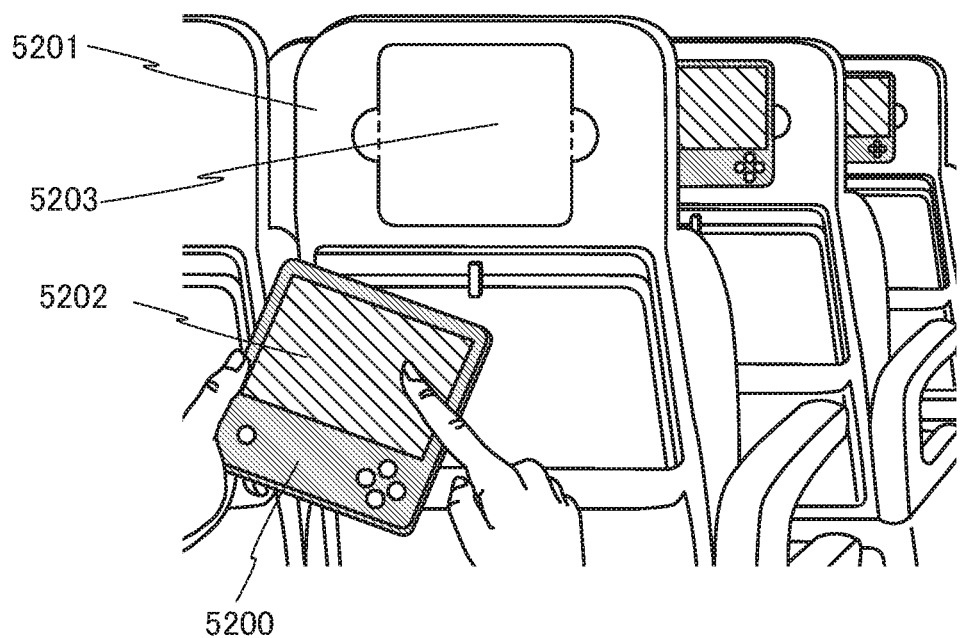

Examples showing the use of the electronic device are illustrated in FIGS. 22A and 22B.

FIG. 22A shows an example where an information terminal is operated in a moving object such as a car.

The numeral 5103 indicates a steering wheel, which includes an antenna inside. The antenna in the steering wheel 5103 can supply power to an electronic device 5100. The electronic device 5100 includes a battery that is charged by wireless power feeding. The steering wheel 5103 may be provided with a jig that can fix the electronic device 5100. If the electronic device 5100 is fixed on the steering wheel 5103, the user can make a phone call or a video-phone call without using his/her hands. Furthermore, through voice authentication with the use of a microphone provided in the electronic device 5100, the car can be driven by a voice of the driver.

For example, by operating the electronic device 5100 while the car is parked, the positional information can be displayed on a display portion 5102. Furthermore, information not displayed on a display portion 5101 of the car, such as engine speed, steering wheel angle, temperature, and tire pressure may be displayed on the display portion 5102. The display portion 5102 has a touch input function. Furthermore, one or more cameras to image the outside of the car can be used to display the outside image on the display portion 5102. That is, the display portion 5102 can be used as a back monitor, for example. Furthermore, for preventing drowsy driving, the electronic device 5100 may operate as follows, for example: while wirelessly receiving information such as the driving speed from the car to monitor the driving speed, the electronic device 5100 images the driver at the time of driving and when a period for which the driver closes his/her eyes is long, it vibrates, beeps, or plays music (depending on the setting that can be selected by the driver as appropriate). Furthermore, by stopping imaging the driver while the car is parked, power consumption can be reduced. In addition, the batteries of the electronic device 5100 may be wirelessly charged while the car is parked.

The electronic device 5100 is expected to be used in a variety of ways in a moving object such as a car, as described above, and is desired to incorporate a number of sensors and a plurality of antennas that enable various functions thereof. Although a moving object such as a car has a power supply, the power supply is limited. In view of the power to drive the moving object, it is preferable that the power used for the electronic device 5100 be as low as possible. For an electric vehicle, in particular, power consumed by the electronic device 5100 may decrease the travel distance. Even if the electronic device 5100 has a variety of functions, it is not often that all the functions are used at a time, and only one or two functions are usually used as necessary. In the case where the electronic device 5100 including a plurality of batteries, each of which is prepared for a different function, has a variety of functions, only the function to be used is turned on and power is supplied thereto from a battery corresponding to that function; whereby, power consumption can be reduced. Furthermore, batteries corresponding to the functions not in use, among the plurality of batteries, can be wirelessly charged from an antenna provided in the car.

FIG. 22B illustrates an example in which an information terminal is operated in an airplane or the like. Since a period in which an individual can use his/her own information terminal is limited in an airplane or the like, the airplane is desired to be equipped with information terminals that the passengers can use when the flight is long.

An electronic device 5200, having a display portion 5202 that displays images such as a movie, a game, and a commercial, is an information terminal with which the current flying location and the remaining flight time can be obtained in real time, owing to its communication function. The display portion 5202 has a touch input function.

The electronic device 5200 can be fit into a depressed portion in a seat 5201, and an antenna installation portion 5203 is provided in a position that overlaps with the electronic device 5200 so that wireless power feeding is achieved while it is fit into the depressed portion. The electronic device 5200 can function as a telephone or communication tool when the user is sick and wants to contact a flight attendant, for example. If the electronic device 5200 has a translation function, the user can communicate with a flight attendant by using the display portion 5202 of the electronic device 5200 even when the user and the flight attendant speak different languages. Furthermore, passengers seated next to one another who speak different languages can communicate by using the display portion 5202 of the electronic device 5200. In addition, the electronic device 5200 can function as a message board, displaying a message in English such as "please do not disturb" on the display portion 5202 while the user is asleep, for example.

The electronic device 5200 may have a plurality of batteries each of which is for a different function, and only the function to be used is turned on while the other functions not in use are in an off state, whereby power consumption can be reduced. Furthermore, among the plurality of batteries, batteries corresponding to the functions not in operation can perform wireless power feeding from the antenna installation portion 5203.

The batteries of the electronic devices 5200 for the plurality of seats may be designed so as to be used in emergency when the airplane has an electrical problem. Since all the electronic devices 5200 for the plurality of seats are the same products having the same design, the system may be constructed such that the electronic devices 5200 can be connected in series as an emergency power supply.

As the plurality of small-sized batteries of the electronic device 5200, one or more kinds selected from the following can be used: a lithium ion secondary battery such as a lithium polymer battery, a lithium ion capacitor, an electric double layer capacitor, and a redox capacitor.

Figure 23:
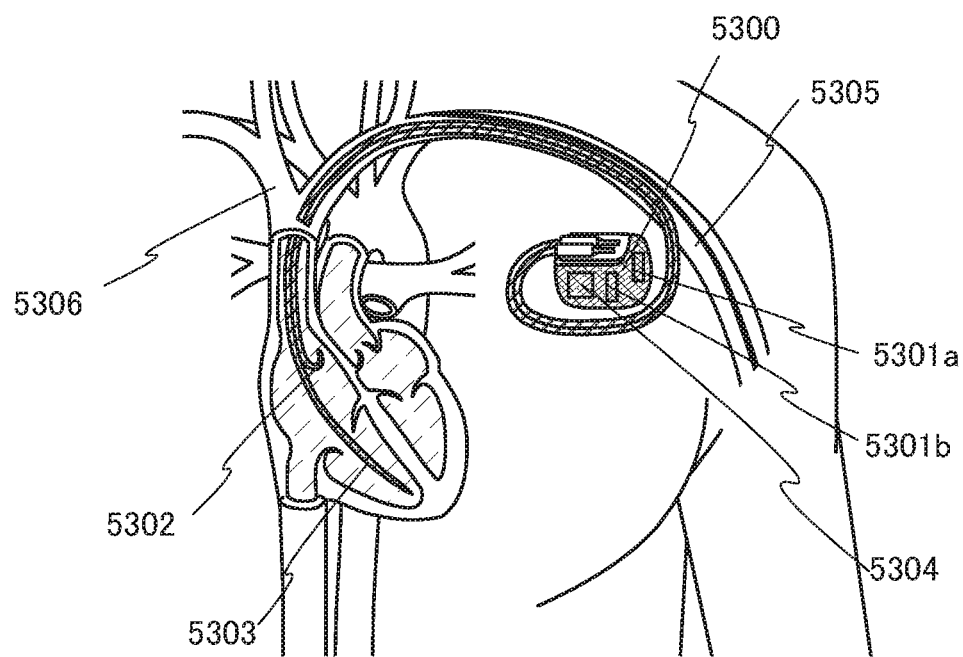
FIG. 23 illustrates a structure example of an electronic device.

Next, another example of an electronic device that can be used for the power receiving portion described in the above embodiment is described. FIG. 23 is a cross-sectional schematic view of an example of a pacemaker.

A pacemaker body 5300 includes at least batteries 5301*a* and 5301*b*, a regulator, a control circuit, an antenna 5304, a wire 5302 reaching a right atrium, and a wire 5303 reaching a right ventricle.

The pacemaker body 5300 is implanted in the body by surgery, and the two wires pass through a subclavian vein 5305 and a superior vena cava 5306 of the human body, with the end of one of them placed in the right ventricle and the end of the other of them placed in the right atrium.

The antenna 5304 can receive electric power, and the batteries 5301*a* and 5301*b* are charged with the electric power, which can reduce the frequency of replacing the pacemaker. Since the pacemaker body 5300 has a plurality of batteries, the safety is high, and even when one of the batteries fails, the other can function. In this manner, the plurality of batteries function as auxiliary power supplies. If the battery to be provided in the pacemaker is further divided into a plurality of thin batteries to be mounted on a printed board where control circuits including a CPU and the like are provided, the pacemaker body 5300 can be smaller in size and thickness.

In addition to the antenna 5304 that can receive electric power, an antenna that can transmit a physiological signal may be provided for the pacemaker. For example, a system that monitors the cardiac activity, capable of monitoring physiological signals such as pulses, respiratory rate, heart rate, and body temperature with an external monitoring device may be constructed.

Note that how the pacemaker is placed here is just an example, and it can be changed in various ways depending on the heart disease.

This embodiment is not limited to the pacemaker. An artificial ear is an artificial organ that is more widely used than the pacemaker. An artificial ear converts a sound into an electric signal and directly stimulates the auditory nerve with a stimulus device in the cochlea.

An artificial ear includes a first device implanted deep in the ear by surgery and a second device that picks up sounds with a microphone and sends them to the implanted first device. The first device and the second device are not electrically connected to each other, and transmitting and receiving between the two are conducted wirelessly. The first device includes at least an antenna that receives an electric signal converted from a sound and a wire that reaches the cochlea. The second device includes at least a sound processing portion for converting a sound into an electric signal and a transmitting circuit that transmits the electric signal to the first device.

This embodiment can be combined with any of the other embodiments as appropriate.

REFERENCE NUMERALS

10: power feeding system, 11: power feeding portion, 12: power receiving portion, 20: transmitting and receiving circuit, 21: antenna circuit, 22: rectifier circuit, 23: charging circuit, 24: control circuit, 25: switch circuit, 26: delay circuit, 27: antenna circuit, 30: battery, 40: sensor, 50: timer, 101: receiving circuit, 102: transmitting circuit, 111: antenna coil, 112: capacitor, 113: antenna coil, 114: capacitor, 121: diode, 122: capacitor, 123: diode, 131: regulator, 132: switch, 141: determination circuit, 142: signal generation circuit, 143: switch circuit, 150: buffer circuit, 151: transistor, 152: transistor, 153: transistor, 154: transistor, 155: transistor, 156: transistor, 157: inverter, 161: inverter, 171: antenna coil, 172: capacitor, 200: semiconductor device, 210: memory circuit, 220: reference memory circuit, 230: circuit, 240: circuit, 250: current source circuit, 801: transistor, 811: insulating layer, 812: insulating layer, 813: insulating layer, 814: insulating layer, 815: insulating layer, 816: insulating layer, 817: insulating layer, 818: insulating layer, 819: insulating layer, 820: insulating layer, 821: metal oxide film, 822: metal oxide film, 822*n*: region, 823: metal oxide film, 824: metal oxide film, 830: oxide layer, 850: conductive layer, 851: conductive layer, 852: conductive layer, 853: conductive layer, 860: semiconductor device, 870: single crystal silicon wafer, 871: CMOS layer, 872: transistor layer, 873: gate electrode, 874: electrode, 875: electrode, 5000: housing, 5001: display portion, 5002: display portion, 5003: speaker, 5004: LED lamp, 5005: operation key, 5006: connection terminal, 5007: sensor, 5008: microphone, 5009: switch, 5010: infrared port, 5011: memory medium reading portion, 5012: support portion, 5013: earphone, 5014: antenna. 5015: shutter button, 5016: image receiving portion, 5100: electronic device, 5101: display portion, 5102: display portion, 5103: handle, 5200: electronic device, 5201: seat, 5202: display portion. 5203: antenna installation portion. 5300: pacemaker body, 5301*a*: battery, 5301*b*: battery, 5302: wire, 5303: wire, 5304: antenna, 5305: subclavian vein, 5306: superior vena cava This application is based on Japanese Patent Application serial No. 2017-092025 filed with Japan Patent Office on May 3, 2017, the entire contents of which are hereby incorporated by reference.

What is claimed is:

1. A power feeding system comprising:
   a power feeding portion; and
   a plurality of power receiving portions each comprising a battery,
   wherein the power feeding portion is configured to supply a first electromagnetic wave to one or more of the plurality of power receiving portions to charge the battery,
   wherein a second electromagnetic wave is generated to cancel the first electromagnetic wave supplied to one or more of the plurality of power receiving portions in which charging of the battery is completed, and
   wherein the second electromagnetic wave is generated using power of a battery whose charging is completed.

2. The power feeding system according to claim 1, each of the plurality of power receiving portions further comprising a neural network,
   wherein the neural network determines whether to generate the second electromagnetic wave on a basis of information on overcharging.

3. The power feeding system according to claim 2, wherein the basis information on overcharging includes information on temperature measured by a sensor or information on receiving time of the first electromagnetic wave.

4. A power feeding system comprising:
   a power feeding portion; and
   a plurality of power receiving portions each comprising a battery,
   wherein the power feeding portion is configured to supply a first electromagnetic wave to one or more of the plurality of power receiving portions to charge the battery,
   wherein a second electromagnetic wave is generated to strengthen the first electromagnetic wave when charging of the battery is completed in one or more of the plurality of power receiving portions, and
   wherein the second electromagnetic wave is generated using power of a battery whose charging is completed.

5. The power feeding system according to claim 4, each of the plurality of power receiving portions further comprising a neural network,
   wherein the neural network determines whether to generate the second electromagnetic wave on a basis of information on overcharging.

6. The power feeding system according to claim 5, wherein the basis information on overcharging includes information on temperature measured by a sensor or information on receiving time of the first electromagnetic wave.

7. The power feeding system according to claim 4, wherein the second electromagnetic wave is supplied to one or more of the plurality of power receiving portions in which charging of the battery is not completed.

8. A charging method of semiconductor devices, comprising the steps of:
   generating power in one or more power receiving portions using a first electromagnetic wave received from a power feeding portion;
   using generated power to charge a battery included in each of the one or more power receiving portions; and
   generating a second electromagnetic wave to cancel the first electromagnetic wave,
   wherein the second electromagnetic wave cancels the first electromagnetic wave supplied to one or more of the power receiving portions in which charging of the battery is completed, and
   wherein the second electromagnetic wave is generated using power of a battery whose charging is completed.

9. The charging method of semiconductor devices according to claim 8, each of the one or more power receiving portions further comprising a neural network,
   wherein the neural network determines whether to generate the second electromagnetic wave on a basis of information on overcharging.

10. The charging method of semiconductor devices according to claim 9, wherein the basis information on overcharging includes information on temperature measured by a sensor or information on receiving time of the first electromagnetic wave.

* * * * *